US012637741B2

(12) United States Patent
Kawamura et al.

(10) Patent No.: US 12,637,741 B2
(45) Date of Patent: May 26, 2026

(54) MAGNESIUM ALLOY AND PRODUCTION METHOD THEREOF

(71) Applicant: MG Port Inc., Kumamoto (JP)

(72) Inventors: Yoshihito Kawamura, Kumamoto (JP); Shinichi Inoue, Kumamoto (JP)

(73) Assignee: MG PORT INC., Kumamoto (JP)

( * ) Notice: Subject to any disclaimer, the term of this patent is extended or adjusted under 35 U.S.C. 154(b) by 85 days.

(21) Appl. No.: 17/797,620

(22) PCT Filed: Feb. 5, 2021

(86) PCT No.: PCT/JP2021/005388
§ 371 (c)(1),
(2) Date: Aug. 4, 2022

(87) PCT Pub. No.: WO2021/157748
PCT Pub. Date: Aug. 12, 2021

(65) Prior Publication Data
US 2023/0054126 A1 Feb. 23, 2023

(30) Foreign Application Priority Data

Feb. 7, 2020 (JP) ................................. 2020-019807

(51) Int. Cl.
*C22C 23/02* (2006.01)
*B22D 21/00* (2006.01)
(Continued)

(52) U.S. Cl.
CPC ............ *C22C 23/02* (2013.01); *B22D 21/007* (2013.01); *C22C 1/0408* (2013.01); *C22C 1/10* (2013.01); *C22F 1/06* (2013.01); *B33Y 80/00* (2014.12)

(58) Field of Classification Search
CPC ........... C22C 23/02; C22C 23/00; C22F 1/06
See application file for complete search history.

(56) References Cited

U.S. PATENT DOCUMENTS

2016/0369378 A1* 12/2016 Kawamura ............. C22C 23/02
2017/0283915 A1* 10/2017 Oishi ..................... B22D 11/06

FOREIGN PATENT DOCUMENTS

CN 105779834 7/2016
EP 2 369 025 9/2011
(Continued)

OTHER PUBLICATIONS

English Translation of CN105779834A obtained from EPO espacenet Feb. 21, 2026 (Year: 2026).*
(Continued)

*Primary Examiner* — Adam Krupicka
(74) *Attorney, Agent, or Firm* — Wenderoth, Lind & Ponack, L.L.P.

(57) ABSTRACT

Provided is a magnesium alloy having a thermal conductivity of 75 W/m·K or more and a high specific strength. One aspect of the present invention is a magnesium alloy containing a at. % of Al, b at. % of Ca, c at. % of Mn, and d at. % of D, with the remainder comprising Mg and unavoidable impurities. D has at least one of a rare-earth element (RE), Sn, Li, Zn, Ag, Be and Sc. The magnesium alloy does not contain Si and Sr. C mentioned above satisfies expression 1 below, d satisfies expression 2 below, and a and b are within a range enclosed by the solid line shown in FIG. 1. The thermal conductivity is 75 W/m·K or greater. (Expression 1) $0 \leq c \leq 0.1$; (Expression 2) $0 \leq d \leq 1$.

2 Claims, 17 Drawing Sheets

Thermal conductivity of Mg-Al-Ca alloys
Cast and extruded

(51) Int. Cl.
   C22C 1/04 (2023.01)
   C22C 1/10 (2023.01)
   C22F 1/06 (2006.01)
   B33Y 80/00 (2015.01)

(56) References Cited

FOREIGN PATENT DOCUMENTS

| | | |
|---|---|---|
| JP | 2007-291438 | 11/2007 |
| JP | 2011-045928 | 3/2011 |
| JP | 2011-089161 | 5/2011 |
| JP | 2012-197490 | 10/2012 |
| JP | 2014-051688 | 3/2014 |
| JP | 2016-222946 | 12/2016 |
| JP | 2019-056140 | 4/2019 |

OTHER PUBLICATIONS

International Search Report issued May 18, 2021, in International (PCT) Application No. PCT/JP2021/005388, with English.
Extended European Search Report issued Jan. 25, 2024 in corresponding European Patent Application No. 21751041.1.

* cited by examiner

[ Figure 1 ]
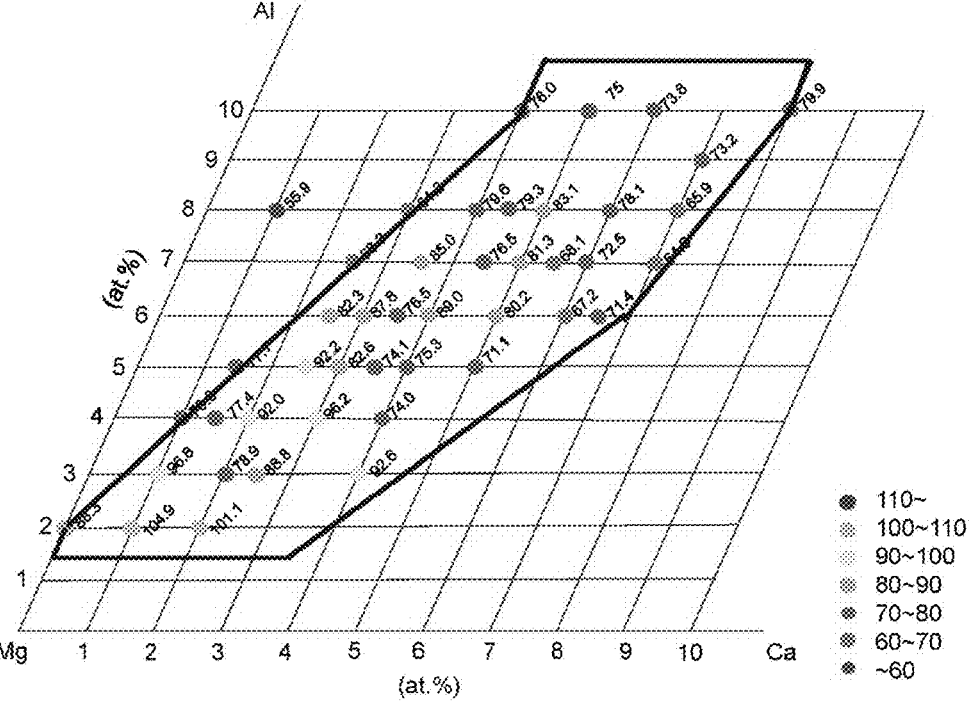
[ Figure 2 ]
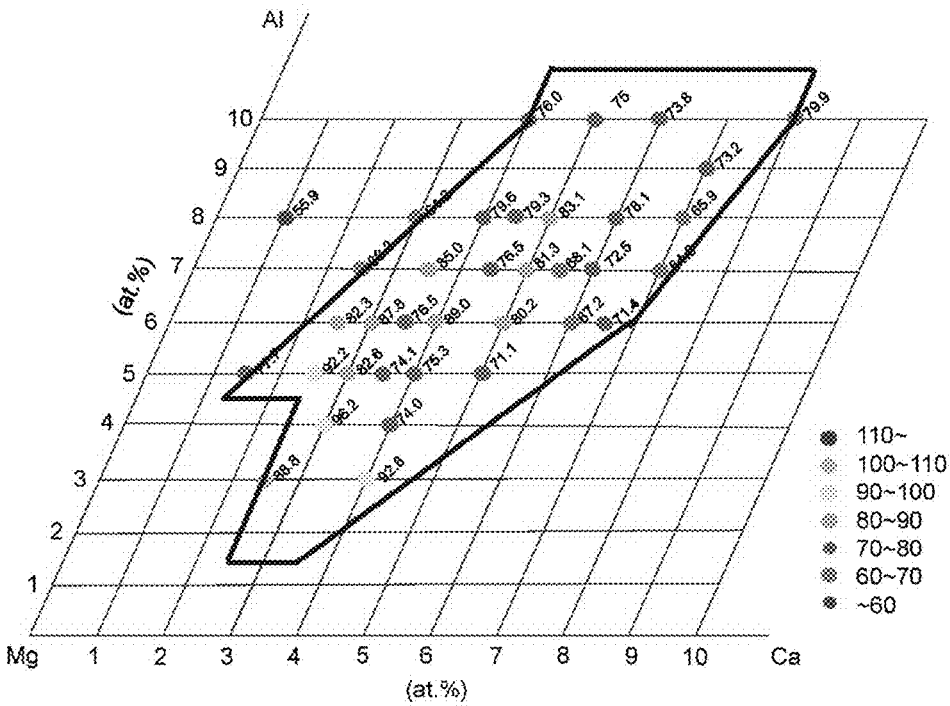

[ Figure 3 ]
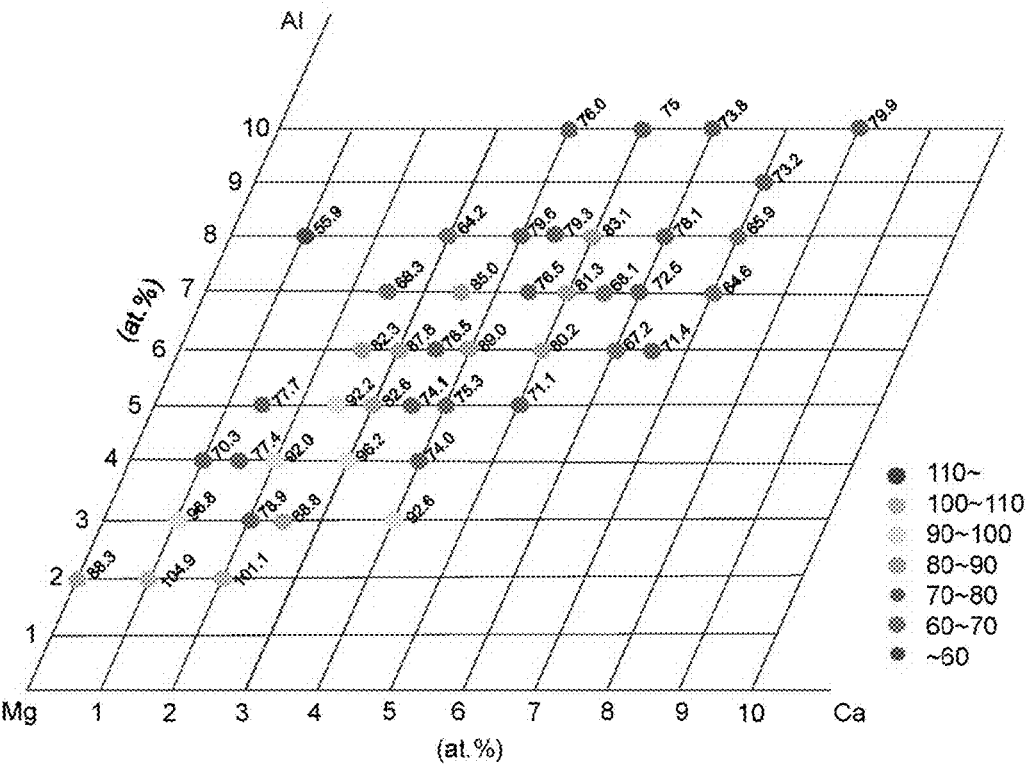
Thermal conductivity of cast Mn-Al-Ca alloys
[ Figure 4 ]
IPF maps of $\alpha$-Mg, C36 and C14 phases in the $Mg_{85}Al_{10}Ca_5$ cast alloy
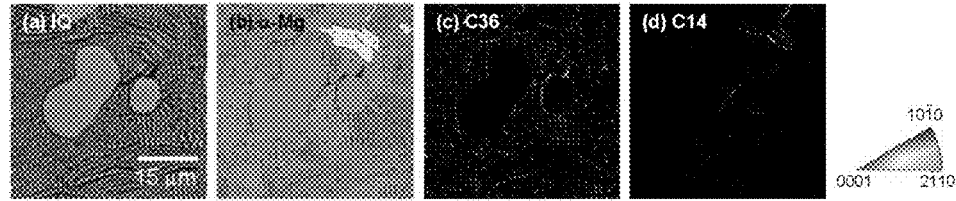

[ Figure 5 ]
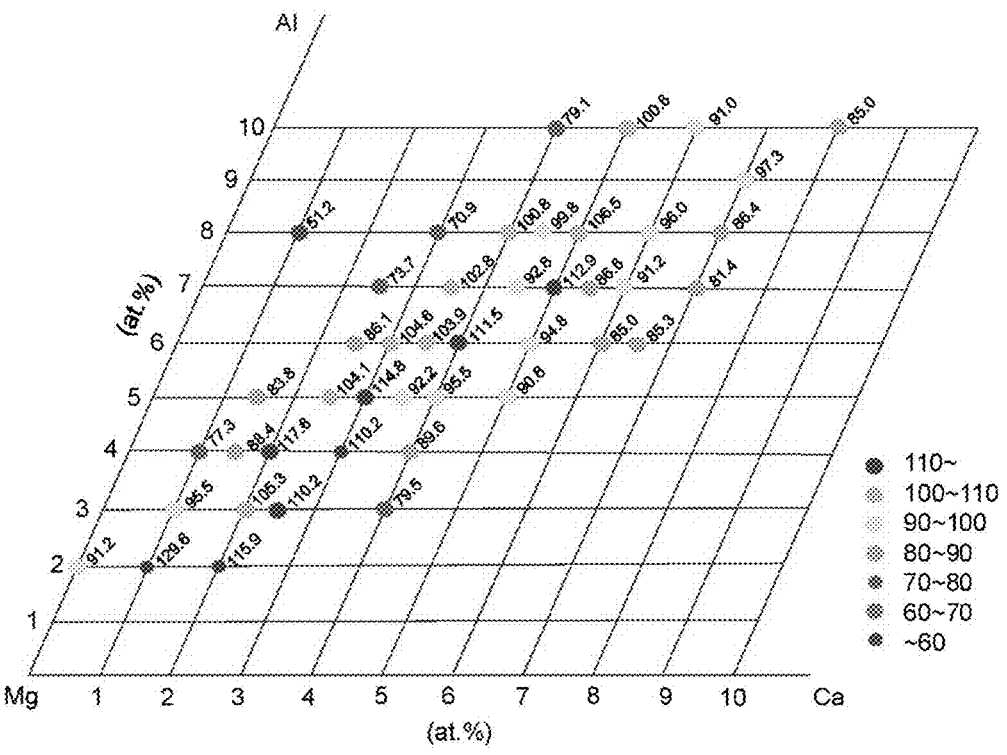
Thermal conductivity of cast and heat-treated alloys (673 K x 2.5 h)
[ Figure 6 ]
TEM image and SEAD image of $Mg_{85}Al_{10}Ca_5$ cast alloy
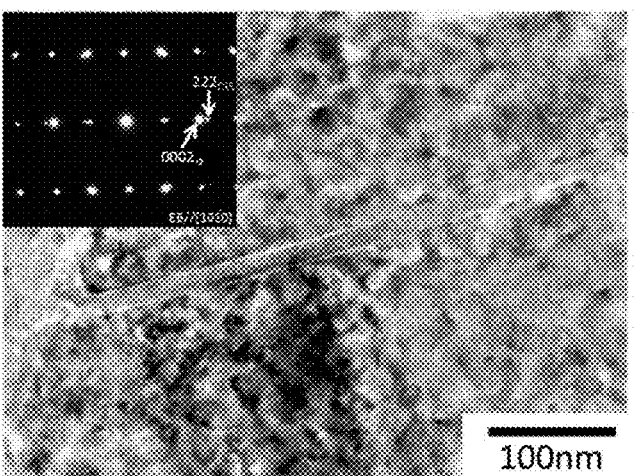

[ Figure 7 ]
Networking of α-Mg grains and eutectic lamellar phase
of α-Mg and C36 type compounds
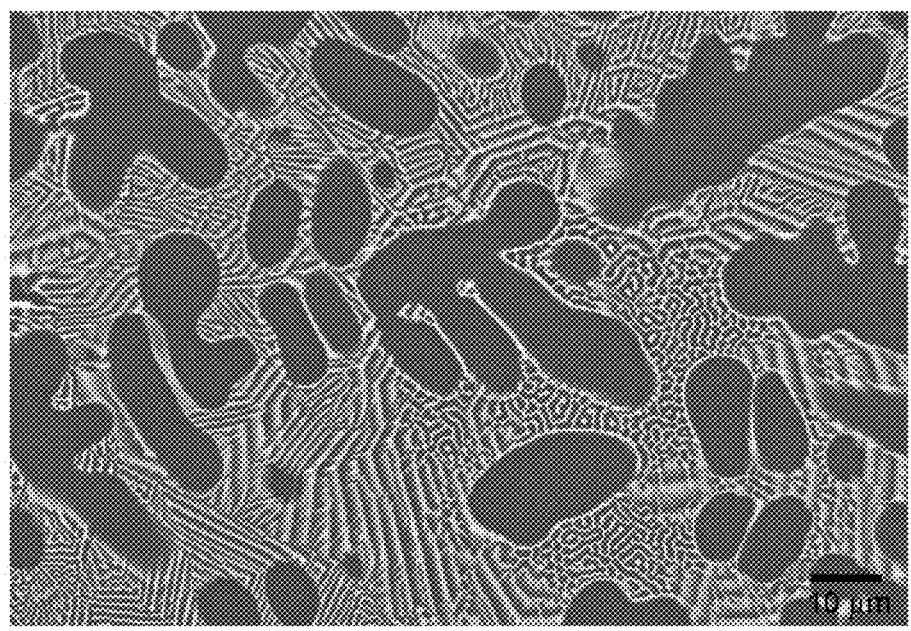
[ Figure 8 ]
C15 compounds precipitated in α-Mg phase with heat-treatment
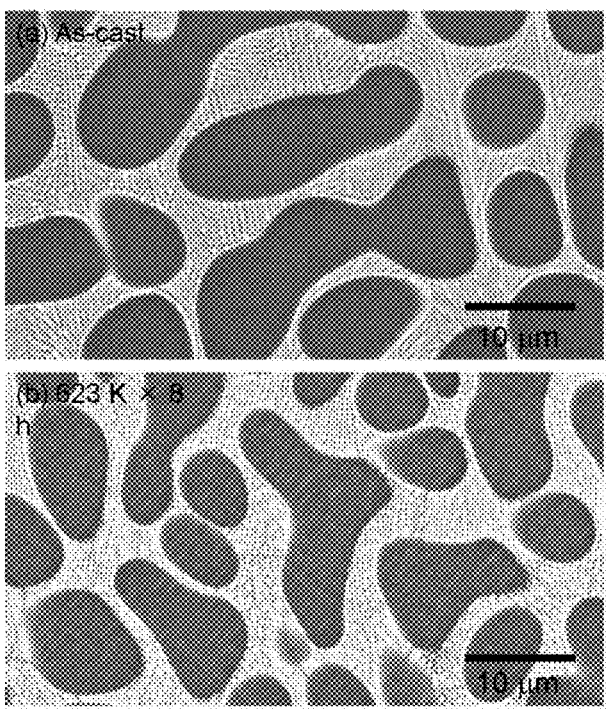

[ Figure 9 ]
**Effect of heat treatment time on the solute concentration
in the α-Mg matrix phase within the α-Mg grains.**
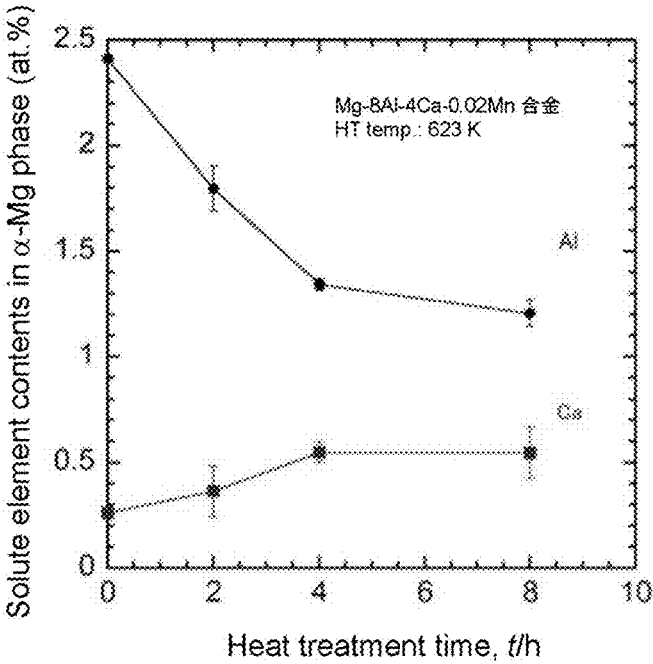
[ Figure 10 ]
Difference in FWHM of XRD peaks of Mg
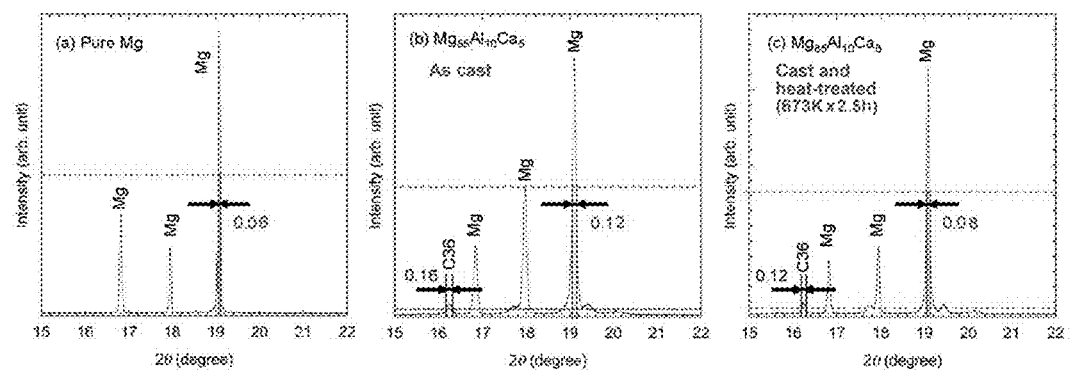

[ Figure 11 ]
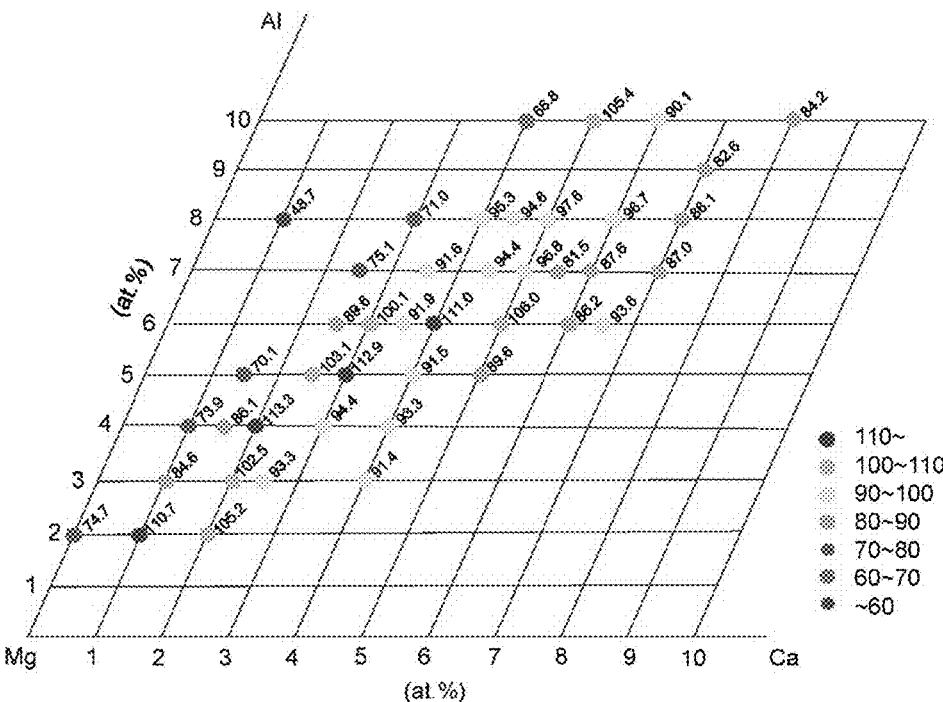
[ Figure 12 ]
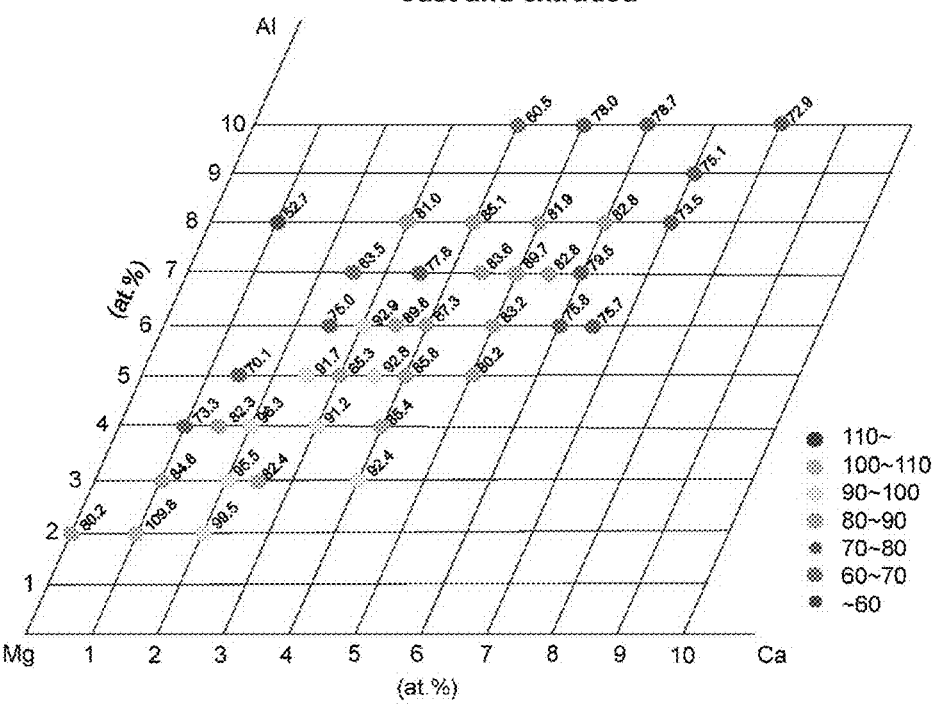

[ Figure 13 ]
Mechanical properties of Mg-Al-Ca alloys
Cast and extruded
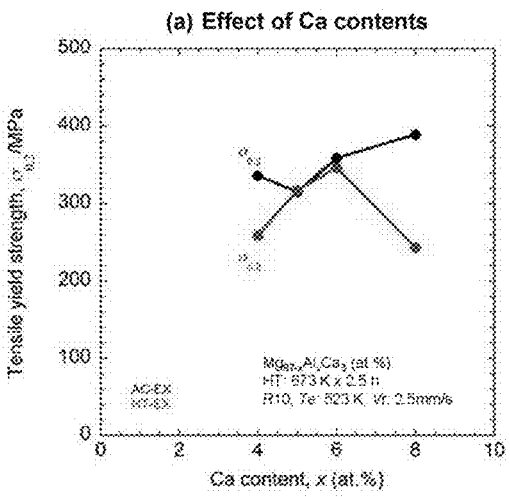
(a) Effect of Ca contents
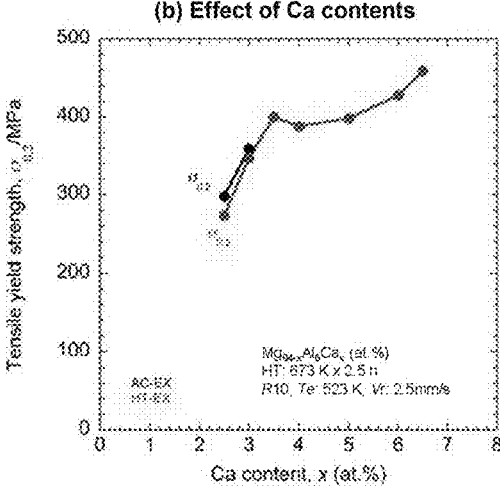
(b) Effect of Ca contents
[ Figure 14 ]
Mechanical properties of Mg-Al-Ca alloys
Cast and extruded
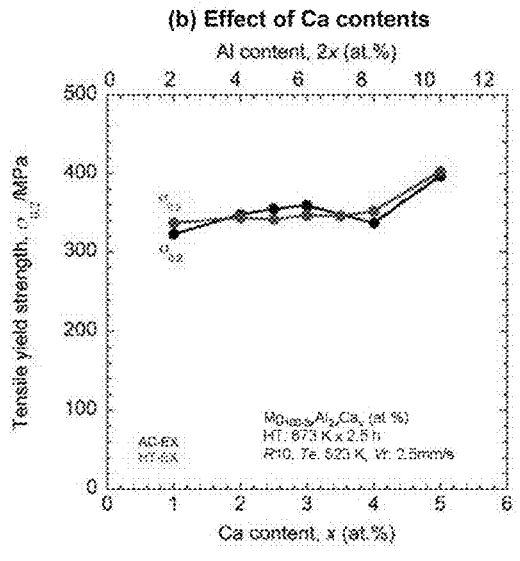
(b) Effect of Ca contents
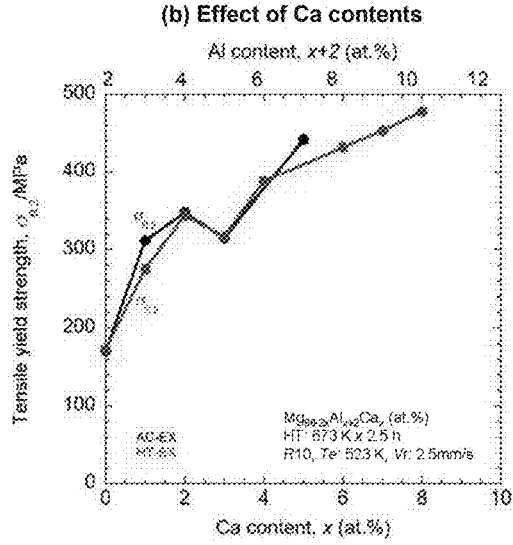
(b) Effect of Ca contents

[ Figure 15 ].
Thermal conductivity and yield strength of the chip-solidified material of $Mg_{99.98-3x}Al_{2x}Ca_{x}Mn_{0.02}$ alloys
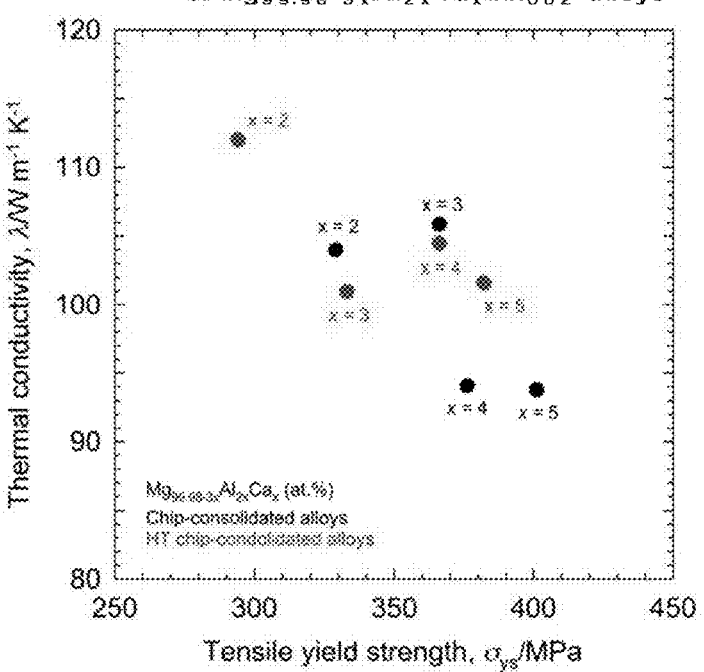
[ Figure 16 ].
Thermal conductivity and yield strength of the chip-solidified material of $Mg_{99.98-3x}Al_{2x}Ca_{x}Mn_{0.02}$ alloys
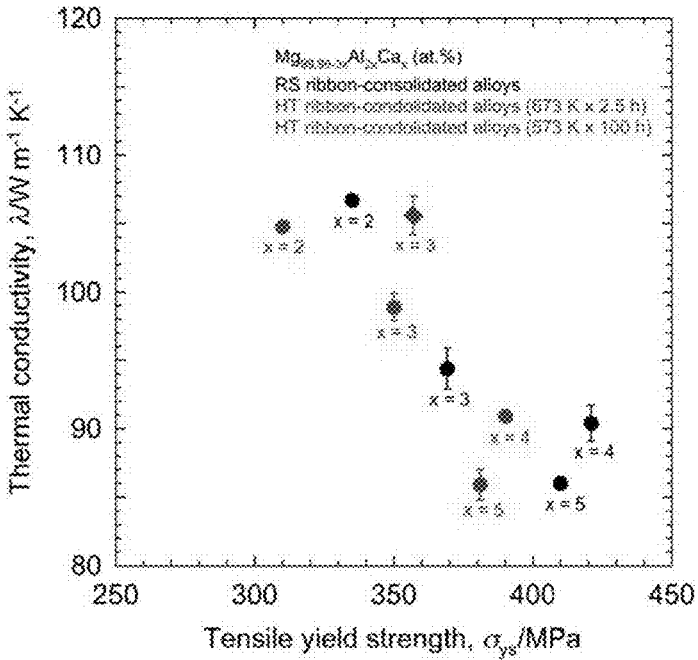

[ Figure 17 ].
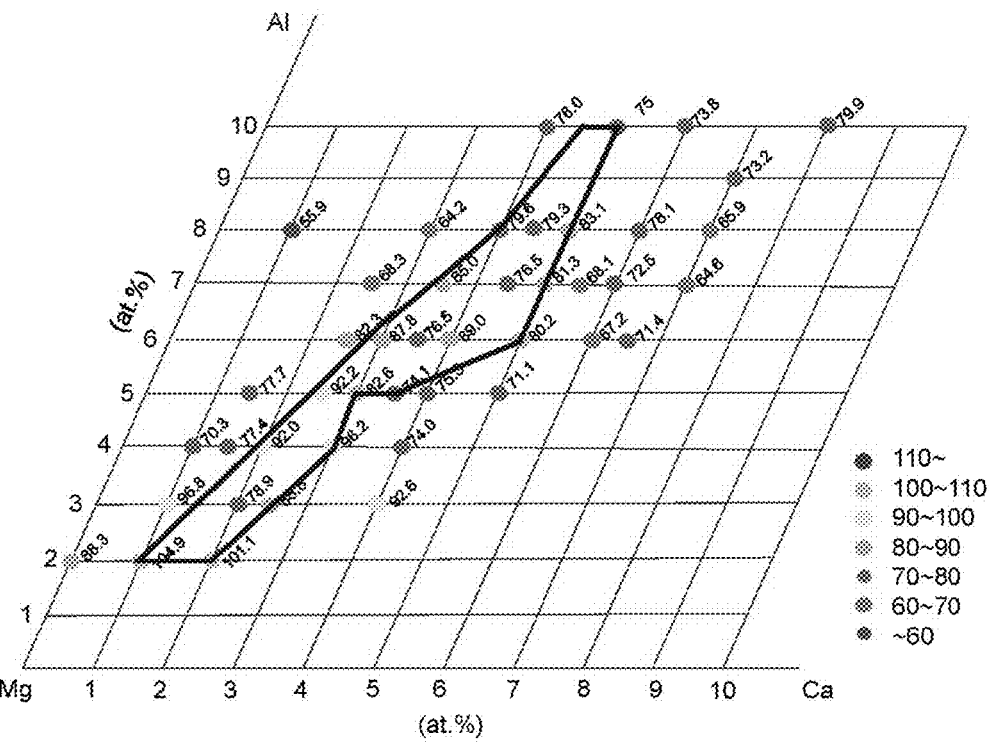
[ Figure 18 ].
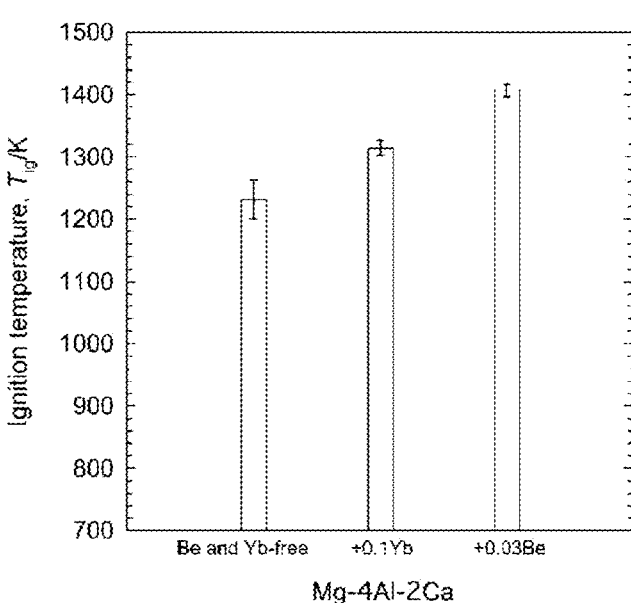

[ Figure 19 ].
Photographs of the structures $Mg_{87.98}Al_8Ca_4Mn_{0.02}$ alloy heat-treated and extruded
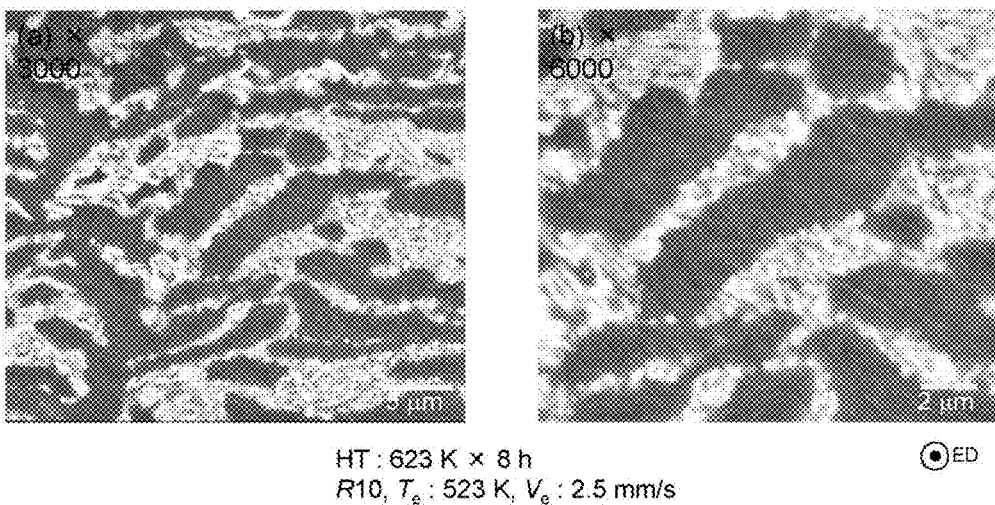
HT : 623 K × 8 h
$R10$, $T_e$ : 523 K, $V_e$ : 2.5 mm/s
⊙ED
[ Figure 20 ]
Anisotropy of thermal conductivity of $Mg_{99.98-3x}Al_{2x}Ca_xMn_{0.02}$ alloy heat-treated and extruded
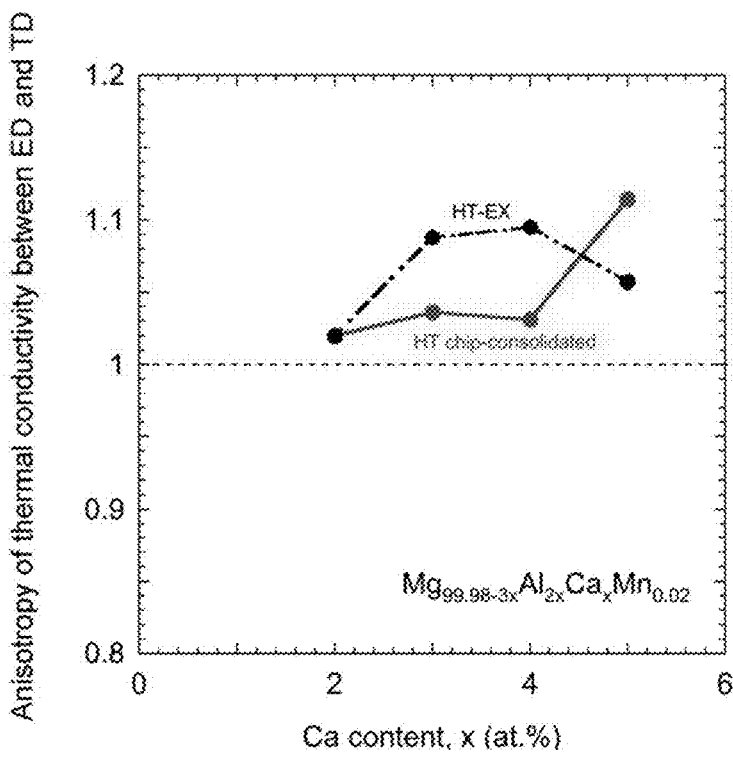

[ Figure 21 ]
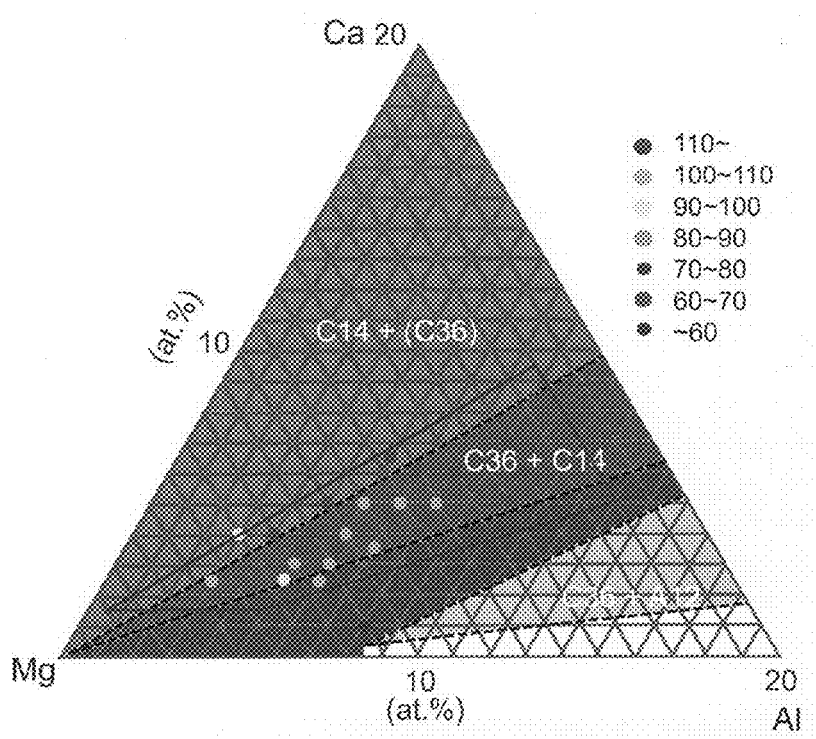
[ Figure 22 ]
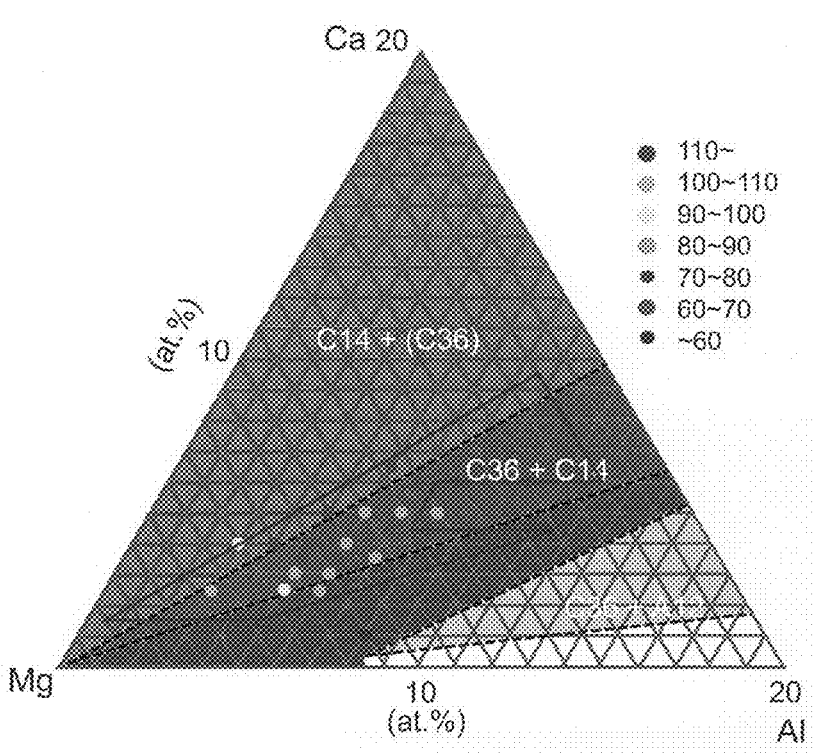

[ Figure 23 ]
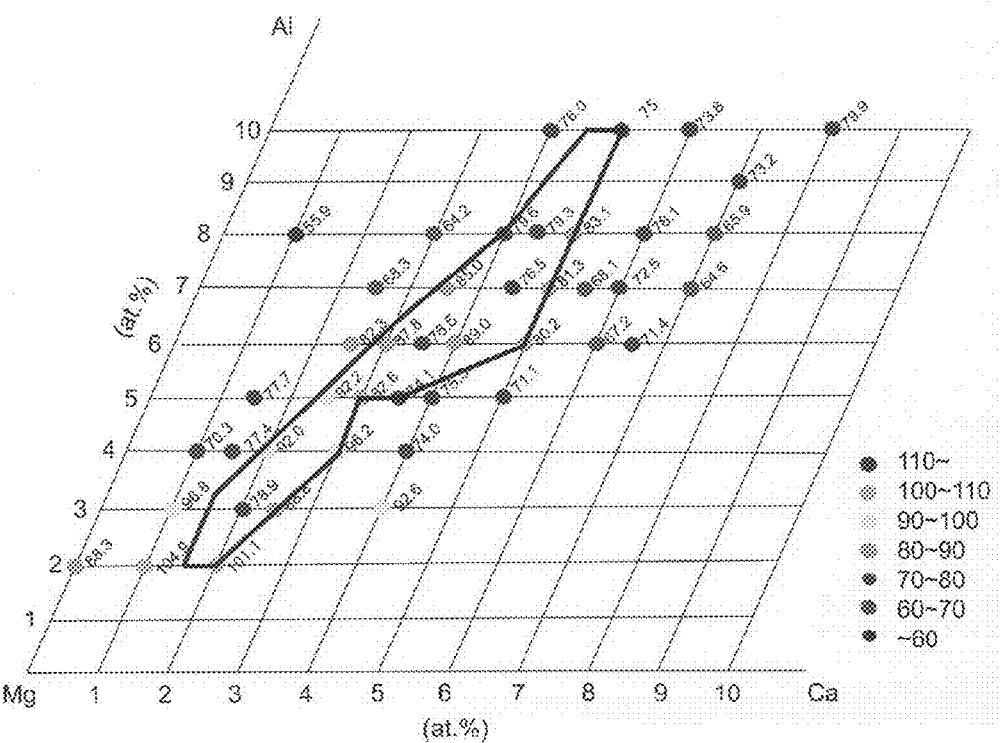
Composition range of Al and Ca in Mg-Al-Ca alloys
[ Figure 24 ]
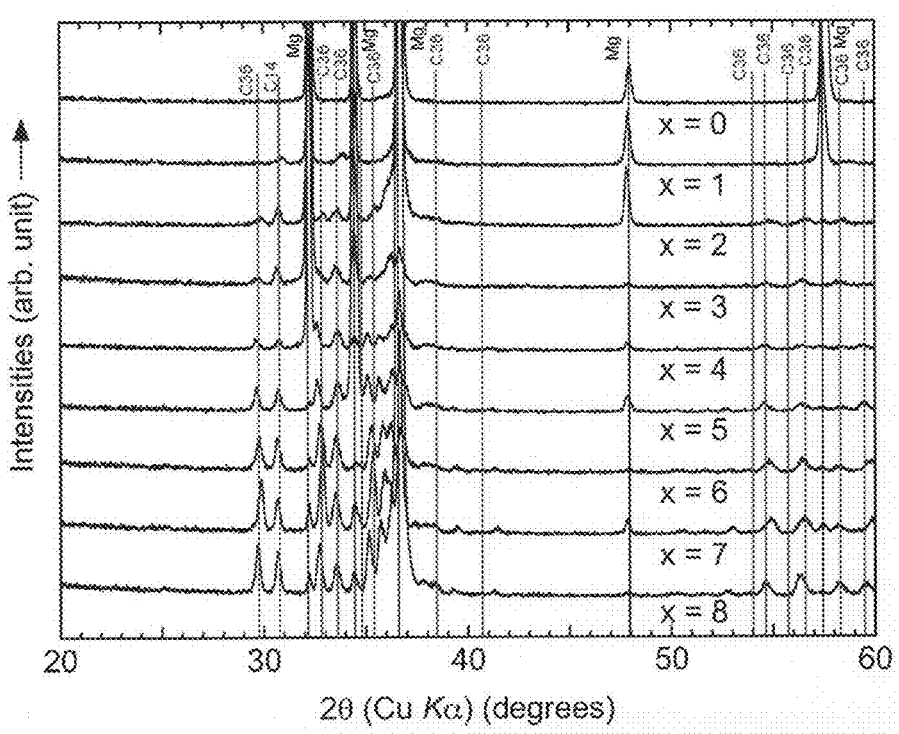
XRD analysis of $Mg_{98-2x}Al_{x+2}Ca_x$ cast alloys

[ Figure 25 ]
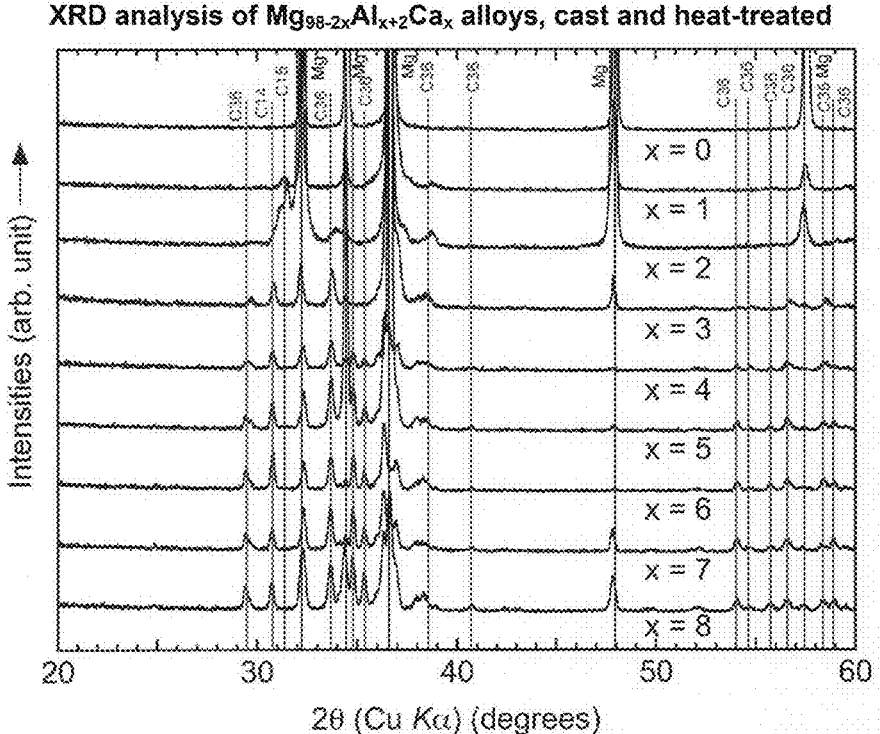
XRD analysis of $Mg_{98-2x}Al_{x+2}Ca_x$ alloys, cast and heat-treated
[ Figure 26 ]
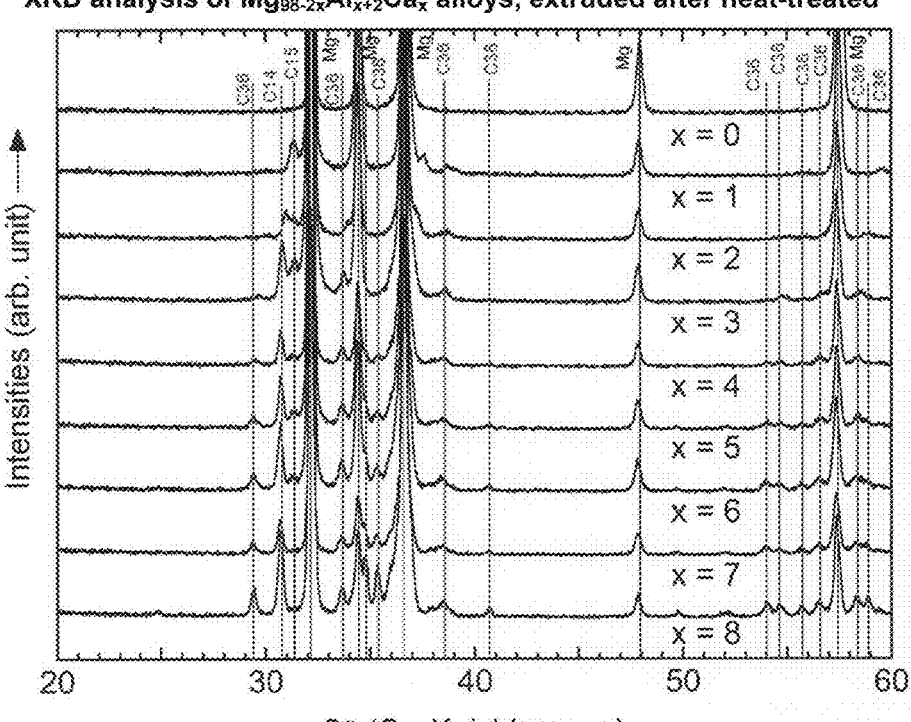
XRD analysis of $Mg_{98-2x}Al_{x+2}Ca_x$ alloys, extruded after heat-treated

[ Figure 27 ]
Relationship between the solute concentration in the α-Mg phase and the thermal conductivity of Mg-Al-Ca alloys
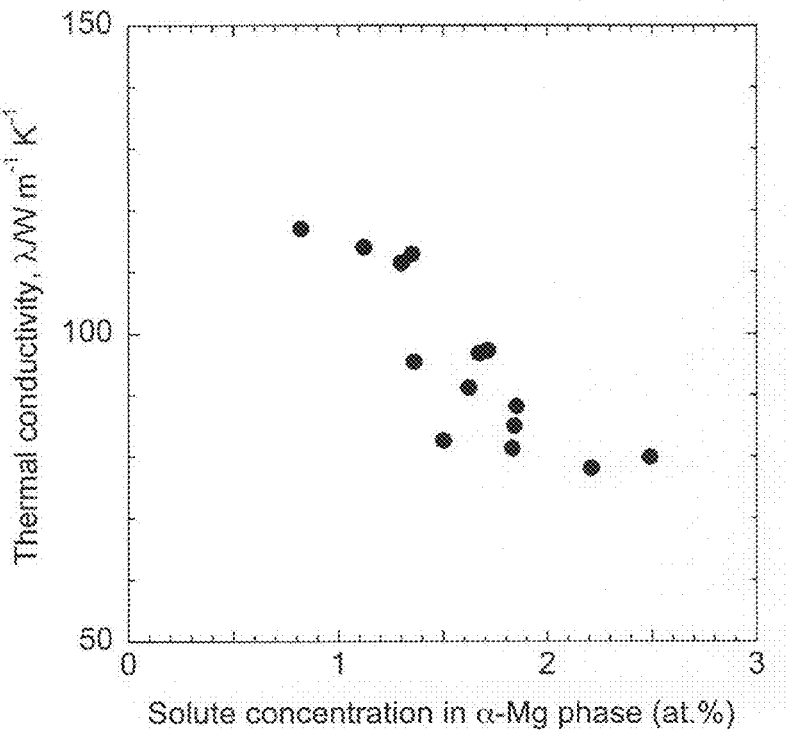
[ Figure 28 ]
Mechanical properties of Mg-Al-Ca alloys
Cast, heat-treated and extruded
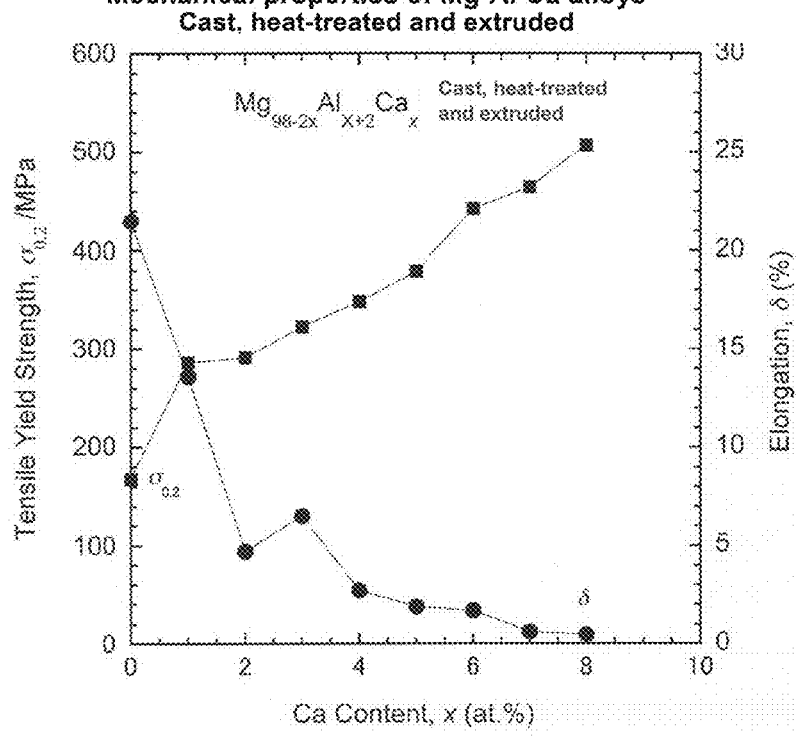

[ Figure 29 ]
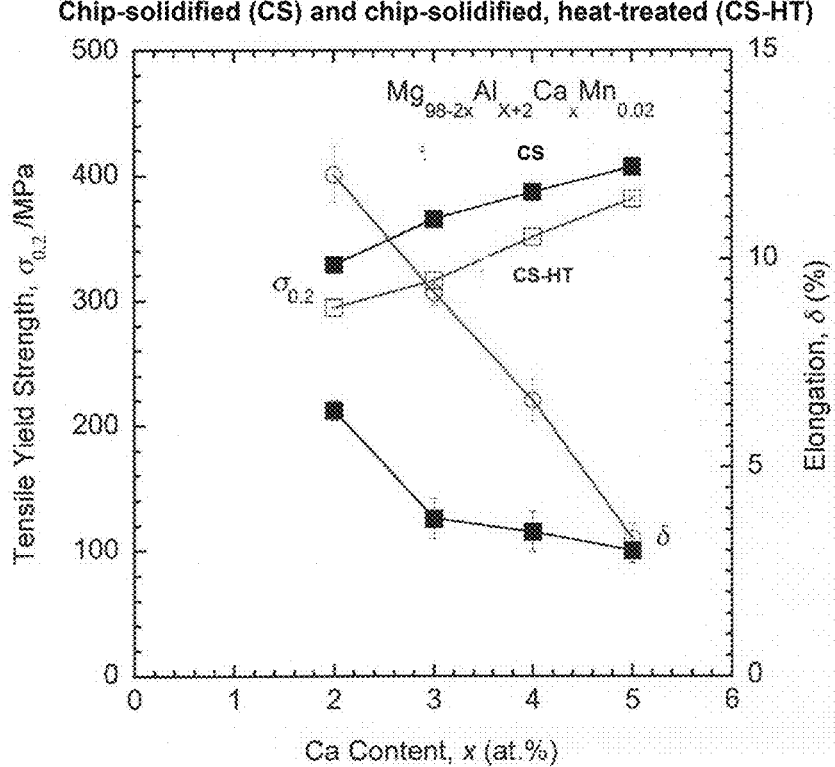
Mechanical properties of Mg-Al-Ca-Mn alloys
Chip-solidified (CS) and chip-solidified, heat-treated (CS-HT)
[ Figure 30 ]
Mechanical properties of Mg-Al-Ca-Mn alloys
Rapidly solidified(RS) and rapidly solidified and heat-treated (RS-HT)

[ Figure 31 ]
Corrosion resistivity of rapidly solidified Mg-Al-Ca-Mn alloys
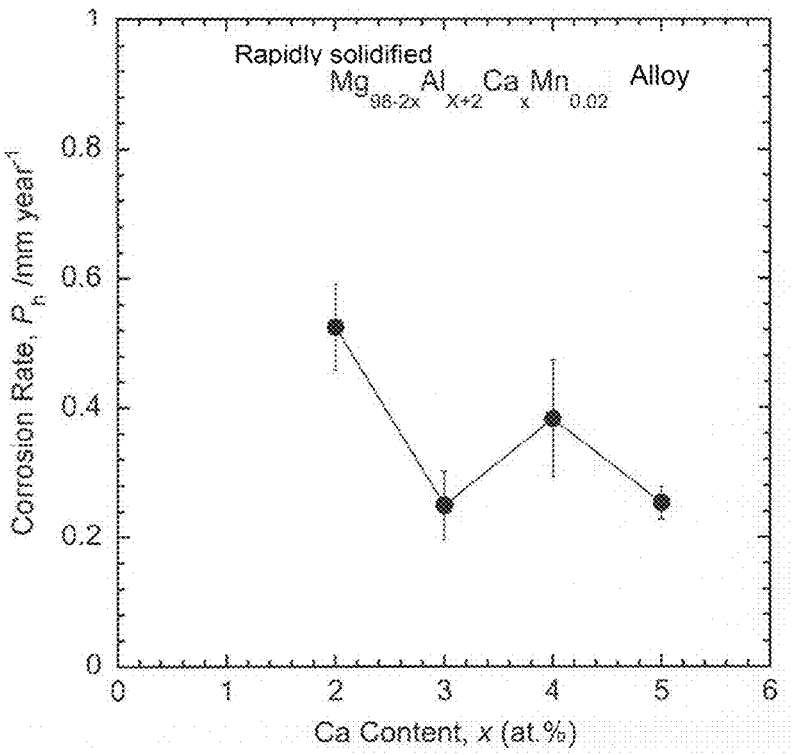
[ Figure 32]
Effect of heat treatment conditions on the thermal conductivity
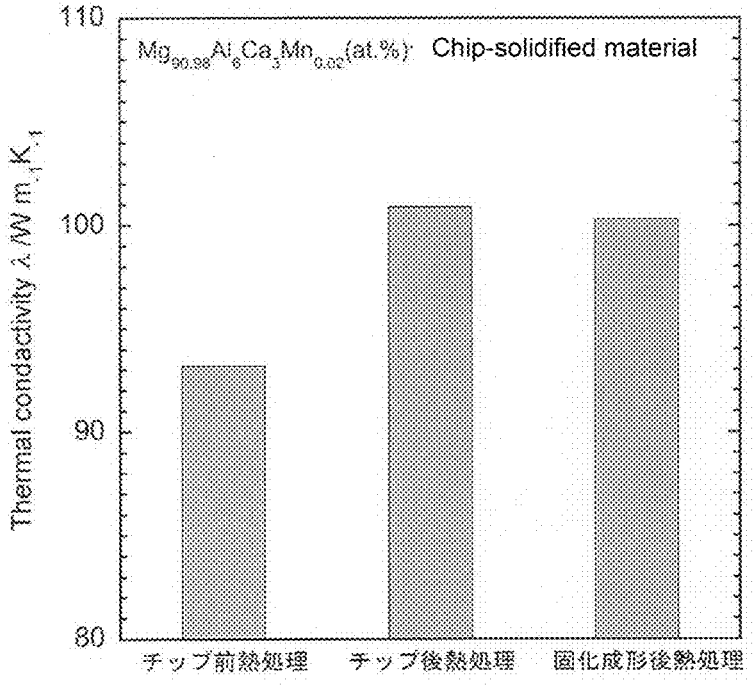

[ Figure 33 ]
Effect of heat treatment conditions on the thermal conductivity
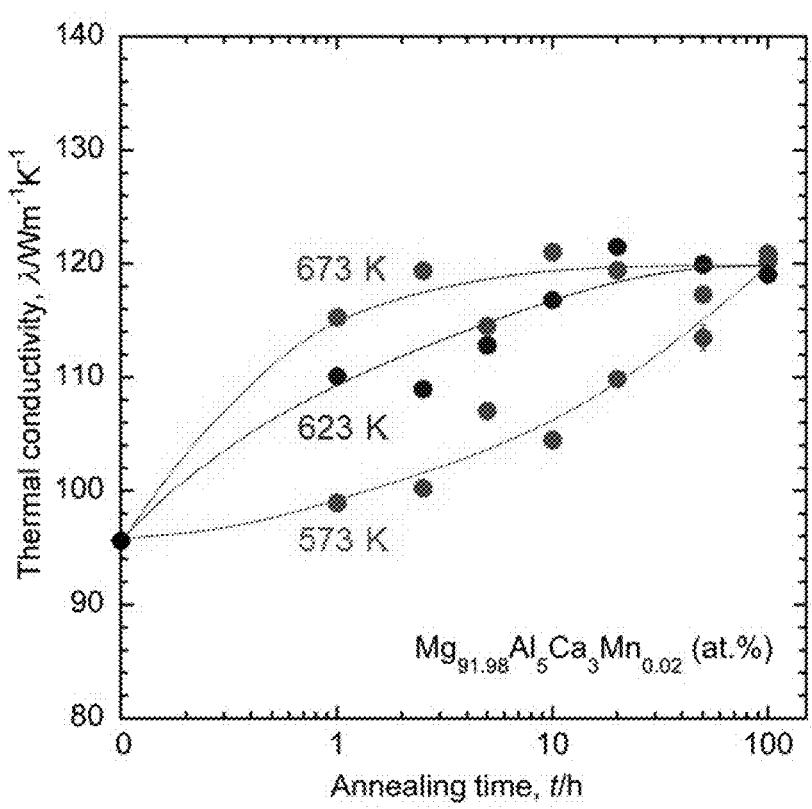

MAGNESIUM ALLOY AND PRODUCTION METHOD THEREOF

TECHNICAL FIELD

This invention relates to a magnesium alloy and a method for producing the same.

BACKGROUND ART

Magnesium alloys are expected to be a key technology for weight reduction in transportation equipment due to their high specific strength. Some components in transportation equipment require high thermal conductivity.

However, the thermal conductivity of a common magnesium alloy: AZ91D (ASTM symbol), a common magnesium alloy, has a thermal conductivity of about 60 W/m-K Therefore, if it is used in a high-temperature environment or for parts that generate heat during use, heat dissipation may not be good and the parts may be thermally deformed (see, for example, paragraph [0003] in Patent Literature 1).

PRIOR ART LITERATURE

Patent Literatures

Patent Literature 1: Patent Publication JP2012-197490A (published unexamined patent application)

DISCLOSURE OF INVENTION

Technical Problem

One aspect of the present invention is to provide a magnesium alloy having a thermal conductivity of 75 W/m-K or higher or a method for producing the same.

Also, an aspect of the present invention is to provide a magnesium alloy having a thermal conductivity of 75 W/m-K or higher and a high specific strength, or a method for producing the same. The subject matter of this invention is to provide a magnesium alloy having a thermal conductivity of 75 W/m K or higher and a high specific strength.

Solution to Problem

Hereinafter, various aspects of the present invention will be described.

[1] A magnesium alloy:

comprising A element in an amount of "a" atomic %, B element in an amount of "b" atomic %, C element in an amount of "c" atomic %, 0 element in an amount of "d" atomic %, and a residue of Mg and unavoidable impurities, wherein "a" and "b" are within the range bounded by the straight lines represented by (1) to (4) below, in the coordinates (a, b) with "a" on the horizontal axis and "b" on the vertical axis wherein "c" satisfies Equation 34 below, and "d" satisfies Equation 35 below, wherein the A element and the B Element satisfy Conditions 1 to 3 below, wherein C Element satisfies Condition 4 below, wherein D element satisfies Condition 5 below, containing α-Mg phase, containing area fraction X % of a compound comprising the A element and the B element, the X satisfying Equation 41 below, containing area fraction Y % of a compound comprising Mg and the A element in terms of area fraction, wherein Y satisfies Equation 42 below, containing area fraction Z % of a compound comprising Mg and the B element wherein Z satisfies Equation 43 below, containing area fraction W % of a compound comprising Mg, the A element, and the element B wherein W satisfies Equation 44 below, wherein the total content of X, Y, Z, and W satisfies Equation 45 below, and having the thermal conductivity of 75 W/m-K or higher.

(1) If "a" is in the range of Equation 1a below, the straight line of Equation 1b below.

$$0.5 \leq a \leq 4.83 \tag{Equation 1a}$$

$$b=1.5 \tag{Equation 1b}$$

(2) If "b" is in the range of Equation 2a below, the straight line of Equation 2b below.

$$1.5 \leq b \leq 5 \tag{Equation 2a}$$

$$a=7/3b+4/3 \tag{Equation 2b}$$

(3) If "b" is in the range of Equation 3a below, the straight line in Equation 3b below.

$$5 \leq b \leq 9.5 \tag{Equation 3a}$$

$$a=-b+18 \tag{Equation 3b}$$

(4) If "b" is in the range of Equation 4a below, the straight line of Equation 4b below.

$$1.5 \leq b \leq 9.5 \tag{Equation 4a}$$

$$a=b-1 \tag{Equation 4b}$$

$$0 \leq c \leq 0.1 \tag{Equation 34}$$

$$0 \leq d \leq 1 \tag{Equation 35}$$

(Condition 1) When the mixing enthalpy of Mg and A element is $\Delta H_{Mg-A}$, the following equation is satisfied.

$$-4.5 \text{ (kJ/mol)} < \Delta H_{Mg-A} < 0 \text{ (kJ/mol)}$$

(Condition 2) When the mixing enthalpy of Mg and B elements is $\Delta H_{Mg-B}$, the following equation is satisfied.

$$-7.5 \text{ (kJ/mol)} < \Delta H_{Mg-B} < -5.5 \text{ (kJ/mol)}$$

(Condition 3) When the mixing enthalpy of elements A and B is $\Delta H_{A-B}$, the following equation is satisfied.

$$\Delta H_{A-B} < -11 \text{ (kJ/mol)} \text{ and } \Delta H_{A-B}/\Delta H_{Mg-B} \geq 2.0$$

(Condition 4) A When the mixing enthalpy of A element and C element is $\Delta H_{A-C}$ and the mixing enthalpy of B element and C element is $\Delta H_{B-C}$, the following equation is satisfied.

$$\Delta H_{A-B} < \Delta H_{A-C} \text{ and } \Delta H_{A-B} < \Delta H_{B-C}$$

(Condition 5) C When the enthalpy of mixing of elements C and D is set as $\Delta H_{C-D}$, the following equation is satisfied.

$$\Delta H_{A-B} < \Delta H_{C-D}$$

$$0 < X \leq 10 \tag{Equation 41}$$

$$Y=0 \tag{Equation 42}$$

$$0 < Z \leq 5 \tag{Equation 43}$$

$$5 \leq W \leq 40 \qquad \text{(Equation 44)}$$

$$5 \leq X+Y+Z+W \leq 45 \qquad \text{(Equation 45)}$$

[2-1] The magnesium alloy according to [1] above:

containing a compound comprising Mg and the B elements, or, an eutectic phase comprising the compound comprising said $\alpha$-Mg, the A elements and the B elements, and said $\alpha$-Mg phase, and $\alpha$-Mg grains containing said compound comprising the A elements and the B elements.

[2] The magnesium alloy according to [1] above:

wherein the A element content of said "a" atomic % and the B element content of said "b" atomic % are within the range bounded by the straight lines represented by (5)~(9) below with the coordinates (a, b) wherein said "a" is taken on the horizontal axis and said "b" is taken on the vertical axis.

(5) If "b" is in the range of Equation 5a below, the straight line of Equation 5b below.

$$1.5 \leq b \leq 4.5 \qquad \text{(Equation 5a)}$$

$$7b/3+4/3 \qquad \text{(Equation 1b)}$$

(6) If "a" is in the range of Equation 6a below, the straight line of Equation 6b below.

$$7.5 < a < 11.5 \qquad \text{(Equation 6a)}$$

$$b=4.5 \qquad \text{(Equation 6b)}$$

(7) If "b" is in the range of Equation 7a below, the straight line of Equation 7b below.

$$4.5 < b < 6 \qquad \text{(Equation 7a)}$$

$$a=7.5 \qquad \text{(Equation 7b)}$$

(8) If "a" is in the range of Equation 8a below, the straight line in Equation 8b below.

$$4.5 < a < 12 \qquad \text{(Equation 8a)}$$

$$b=6 \qquad \text{(Equation 8b)}$$

(9) If "b" is in the range of Equation 9a below, the straight line of Equation 9 b is a straight line.

$$6 \leq b \leq 9.5 \qquad \text{(Equation 9a)}$$

$$a=-b+18 \qquad \text{(Equation 9b)}$$

[3] The magnesium alloy according to [1] or [2] above:

wherein the A element is Al or Zn, wherein the B element is Ca, Ce and Y, wherein the C element is Mn or Zr, and wherein the D element is one or more of RE (rare earth element), Sr, Sn, Li, or Zr. Sr, Sn, Li, Zn, Ag, Be, and Sc.

[4] The magnesium alloy according to [3] above:

Wherein the RE content satisfies Equation 51 below.

$$0 \leq RE \leq 0.4 \text{ wt \%} \qquad \text{(Equation 51)}$$

[5] The magnesium alloy according to any one of the above [1] to [4]:

wherein the compound comprising the A element and the B element is a C15-type intermetallic compound phase ($Al_2Ca$ phase), and the compound comprising Mg and the A element is a $\beta$ phase ($Mg_{17}Al_{12}$ compound), etc., and the compound comprising Mg and the above B elements is a C14 type intermetallic compound phase (Mg2Ca phase), and the compound comprising Mg and the A and B elements is a C36-type intermetallic compound phase (($Mg$, $Al$)$_2Ca$ phase), if the A element is Al and the B element is Ca,

[6] The magnesium alloy according to any one of [1] to [5] above:

wherein the A element is Al, wherein the B element is Ca, wherein the C element is Mn, and wherein the D element is one or more of RE (rare earth elements), Sn, Li, Zn, Ag, Be and Mn. Zn, Ag, Be and Sc, and not containing Si and Sr, wherein Al content of "a" atomic % and Ca content of "b" atomic % are within the range bounded by the straight lines represented by the following (1)~(8) in the coordinate (b, a) with "b" on the horizontal axis and "a" on the vertical axis.

(1) If "b" is in the range of Equation 1a below, the straight line of Equation 1b below.

$$0 \leq b \leq 3.5 \qquad \text{(Equation 1a)}$$

$$a=1.5 \qquad \text{(Equation 1b)}$$

(2) If "b" is in the range of Equation 2a below, the straight line of Equation 2b below.

$$3.5 \leq b \leq 7 \qquad \text{(Equation 2a)}$$

$$a=9b/7-3 \qquad \text{(Equation 2b)}$$

(3) If "b" is in the range of Equation 3a below, the straight line of Equation 3b below.

$$7 \leq b \leq 8 \qquad \text{(Equation 3a)}$$

$$a=4b-22 \qquad \text{(Equation 3b)}$$

(4) If "a" is in the range of Equation 4a below the straight line of Equation 4b below.

$$10 \leq a \leq 12 \qquad \text{(Equation 4a)}$$

$$(b)b=8 \qquad \text{(Equation 4b)}$$

(5) If "b" is in the range of Equation 5a below, the straight line of Equation 5b below.

$$4 \leq b \leq 8 \qquad \text{(Equation 5a)}$$

$$a=12 \qquad \text{(Equation 5b)}$$

(6) If "a" is in the range of Equation 6a below, the straight line in Equation 6b below.

$$10 \leq a \leq 12 \qquad \text{(Equation 6a)}$$

$$b=4 \qquad \text{(Equation 6b)}$$

(7) If "b" is in the range of Equation 7a below, the straight line of Equation 7b below.

$$0 \leq b \leq 4 \qquad \text{(Equation 7a)}$$

$$a=2b+2 \qquad \text{(Equation 7b)}$$

(8) If "a" is in the range of Equation 8a below, the straight line of Equation 8b below.

$$1.5 \leq a \leq 2 \qquad \text{(Equation 8a)}$$

$$b=0 \qquad \text{(Equation 8b)}$$

[7] The magnesium alloy according to any one of the above [1] to [5]:

wherein the A element is Al, wherein the B element is Ca, wherein the C element is Mn, wherein the D element is one or more of RE (rare earth elements) other than Yb, Sr, Sn, Li, Zn, Ag and Sc, and containing at least one of Yb and Be, wherein the content of Yb is "e" atomic %, the content of Be is "f", and

5

6 wherein "e" satisfies Equation 18 below,
wherein "f" satisfies Equation 19 below,
wherein Al content of "a" atomic % and Ca content of "b" atomic % are within the range bounded by the straight lines represented by the following (1)~(8) in the coordinate (b, a) with "b" on the horizontal axis and "a" on the vertical axis.

$$0.01 \le e \le 1 \qquad \text{(Equation 18)}$$

$$5 \text{ ppm} \le f \le 100 \text{ ppm} \qquad \text{(Equation 19)}$$

(1) If "b" is in the range of Equation 1a below, straight line of Equation 1b below.

$$0 \le b \le 3.5 \qquad \text{(Equation 1a)}$$

$$a=1.5 \qquad \text{(Equation 1b)}$$

(2) If "b" is in the range of Equation 2a below, the straight line of Equation 2b below.

$$3.5 \le b \le 7 \qquad \text{(Equation 2a)}$$

$$a=9b/7-3 \qquad \text{(Equation 2b)}$$

(3) If "b" is in the range of Equation 3a below, the straight line of Equation 3b below.

$$7.5 \le b \le 8 \qquad \text{(Equation 3a)}$$

$$a=4b-22 \qquad \text{(Equation 3b)}$$

(4) If "a" is in the range of Equation 4a below the straight line of Equation 4b below.

$$10 \le a \le 12 \qquad \text{(Equation 4a)}$$

$$b=8 \qquad \text{(Equation 4b)}$$

(5) If "b" is in the range of Equation 5a below, the straight line of Equation 5b below.

$$4 \le b \le 8 \qquad \text{(Equation 5a)}$$

$$a=12 \qquad \text{(Equation 5b)}$$

(6) If "a" is in the range of Equation 6a below, the straight line in Equation 6b below.

$$10 \le a \le 12 \qquad \text{(Equation 6a)}$$

$$b=4 \qquad \text{(Equation 6b)}$$

(7) If "b" is in the range of Equation 7a below, the straight line of Equation 7b below.

$$0 \le \le 4 \qquad \text{(Equation 7a)}$$

$$a=2b+2 \qquad \text{(Equation 7b)}$$

(8) If "a" is in the range of Equation 8a below, the straight line of Equation 8b below.

$$1.5 \le a \le 2 \qquad \text{(Equation 8a)}$$

$$b=0 \qquad \text{(Equation 8b)}$$

[8] The magnesium alloy according to [6] or [7] above:
having the thermal conductivity of 100 W/m-K or higher,
wherein Al content of "a" atomic % and Ca content of "b" atomic % are within the range bounded by the straight lines represented by (1)~(10) below in the coordinates (b, a) with "b" on the horizontal axis and "a" on the vertical axis
(1) If "b" is in the range of Equation 1a below, the straight line of Equation 1b below.

$$1 \le b \le 2 \qquad \text{(Equation 1a)}$$

$$a=2 \qquad \text{(Equation 1b)}$$

(2) If "b" is in the range of Equation 2a below, the straight line of Equation 2b below.

$$2 \le b \le 3 \qquad \text{(Equation 2a)}$$

$$a=2b-2 \qquad \text{(Equation 2b)}$$

(3) If "a" is in the range of Equation 3a below, the straight line of Equation 3b below.

$$4 \le a \le 5 \qquad \text{(Equation 3a)}$$

$$b=3 \qquad \text{(Equation 3b)}$$

(4) If "b" is in the range of Equation 4a below, the straight line of Equation 4b below.

$$3 \le b \le 3.5 \qquad \text{(Equation 4a)}$$

$$a=5 \qquad \text{(Equation 4b)}$$

(5) If "b" is in the range of Equation 5a below, the straight line of Equation 5b below.

$$3.5 \le b \le 5 \qquad \text{(Equation 5a)}$$

$$a=2b/3+8/3 \qquad \text{(Equation 5b)}$$

(6) If "a" is in the range of Equation 6a below, the straight line of Equation 6b below.

$$6 \le a \le 10 \qquad \text{(Equation 6a)}$$

$$b=5 \qquad \text{(Equation 6b)}$$

(7) If "b" is in the range of Equation 7a below, the straight line of Equation 7b below.

$$4.5 \le b \le 5 \qquad \text{(Equation 7a)}$$

$$a=10 \qquad \text{(Equation 7b)}$$

(8) If "b" is in the range of Equation 8a below, the straight line of Equation 8b below $$4 \le b \le 5 \qquad \text{(Equation 8a)}$$

$$a=4b-8 \qquad \text{(Equation 8b)}$$

(9) If "b" is in the range of Equation 9a below, the straight line of Equation 9b below.

$$3 \le b \le 4 \qquad \text{(Equation 9a)}$$

$$a=3b/2+2 \qquad \text{(Equation 9b)}$$

(10) If "b" is in the range of Equation 10a below, the straight line of Equation 10b below.

$$1 \le b \le 3 \qquad \text{(Equation 10a)}$$

$$a=9b/4-1/4 \qquad \text{(Equation 10b)}$$

[9] The magnesium alloy according to any of the above [1] to [5]:
wherein the A element is Al,
wherein the B element is Ca,
wherein the C element is Mn, and
wherein the D elements is one or more of RE (rare earth elements), Sr, Sn, Li, Zn, Ag, Be and Sc,
wherein the Al content of "a" atomic % and the Ca content of "b" atomic % are within the range bounded by the straight lines represented by (1)~(8) below,
wherein the first thermal conductivity in the first direction is 75 W/m-K or higher and the second thermal conductivity in the second direction is less than or equal to the first thermal conductivity, wherein, when the first thermal conductivity is $\lambda_1$ and the second thermal conductivity is $\lambda_2$, $\lambda$, and $\lambda_2$ satisfy Equation 20 below, and wherein the 0.2% proof stress of the magnesium alloy is not less than 200 MPa.

$$1 \leq \lambda_1/\lambda_2 \leq 1.3 \quad \text{(Equation 20)}$$

(1) if "b" is in the range of Equation 1a below, the straight line in Equation 1b below.

$$0 \leq b \leq 3.5 \quad \text{(Equation 1a)}$$

$$a=1.5 \quad \text{(Equation 1b)}$$

(2) If "b" is in the range of Equation 2a below, the straight line in Equation 2b below.

$$3.5 \leq b \leq 7 \quad \text{(Equation 2a)}$$

$$a=9b/7-3 \quad \text{(Equation 2b)}$$

(3) if "b" is in the range of Equation 3a below, the straight line of Equation 3b below.

$$7 \leq b \leq 8 \quad \text{(Equation 3a)}$$

$$a=4b-22 \quad \text{(Equation 3b)}$$

(4) If "a" is in the range of Equation 4a below, the straight line of Equation 4b below.

$$10 \leq a \leq 12 \quad \text{(Equation 4a)}$$

$$b=8 \quad \text{(Equation 4b)}$$

(5) If "b" is in the range of Equation 5a below, the straight line of Equation 5b below.

$$4 \leq b \leq 8 \quad \text{(Equation 5a)}$$

$$a=12 \quad \text{(Equation 5b)}$$

(6) If "a" is in the range of Equation 6a below, the straight line in Equation 6b below.

$$10 \leq a \leq 12 \quad \text{(Equation 6a)}$$

$$b=4 \quad \text{(Equation 6b)}$$

(7) If "b" is in the range of Equation 7a below, the straight line of Equation 7b below.

$$0 \leq b \leq 4 \quad \text{(Equation 7a)}$$

$$a=2b+2 \quad \text{(Equation 7b)}$$

(8) If "a" is in the range of Equation 8a below, the straight line of Equation 8b below.

$$1.5 \leq a \leq 2 \quad \text{(Equation 8a)}$$

$$b=0 \quad \text{(Equation 8b)}$$

[10] The magnesium alloy according to the above [9]:

having the first thermal conductivity of 100 W/m·K or higher, wherein the A element content of "a" atomic % and the B element content of "b" atomic % are within the range bounded by the straight lines represented by (1)~(10) below with the coordinates (b, a) with "b" on the horizontal axis and "a" is taken on the vertical axis.

(1) If "b" is in the range of Equation 1a below, the straight line of Equation 1b below.

$$1 \leq b \leq 2 \quad \text{(Equation 1a)}$$

$$a=2 \quad \text{(Equation 1b)}$$

(2) if "b" is in the range of Equation 2a below, the straight line of Equation 2b below.

$$2 \leq b \leq 3 \quad \text{(Equation 2a)}$$

$$a=2b-2 \quad \text{(Equation 2b)}$$

(3) If "a" is in the range of Equation 3a below, the straight line of Equation 3b below.

$$4 \leq a \leq 5 \quad \text{(Equation 3a)}$$

$$b=3 \quad \text{(Equation 3b)}$$

(4) If "b" is in the range of Equation 4a below, the straight line of Equation 4b below.

$$3 \leq b \leq 3.5 \quad \text{(Equation 4a)}$$

$$a=5 \quad \text{(Equation 4b)}$$

(5) If "b" is in the range of Equation 5a below, the straight line of Equation 5b below.

$$3.5 \leq b \leq 5 \quad \text{(Equation 5a)}$$

$$a=2b/3+8/3 \quad \text{(Equation 5b)}$$

(6) If "b" is in the range of Equation 6a below, the straight line of Equation 6b below.

$$6 \leq a \leq 10 \quad \text{(Equation 6a)}$$

$$b=5 \quad \text{(Equation 6b)}$$

(7) If "b" is in the range of Equation 7a below, the straight line of Equation 7b below.

$$4.5 \leq b \leq 5 \quad \text{(Equation 7a)}$$

$$a=10 \quad \text{(Equation 7b)}$$

(8) If "b" is in the range of Equation 8a below, the straight line of Equation 8b below.

$$4 \leq b \leq 5 \quad \text{(Equation 8a)}$$

$$a=4b-8 \quad \text{(Equation 8b)}$$

(9) If "b" is in the range of Equation 9a below, the straight line of Equation 9b below.

$$3 \leq b \leq 4 \quad \text{(Equation 9a)}$$

$$a=3b/2+2 \quad \text{(Equation 9b)}$$

(10) If "b" is in the range of Equation 10a below, the straight line of Equation 10b below.

$$1 \leq b \leq 3 \quad \text{(Equation 10a)}$$

$$a=9b/4-1/4 \quad \text{(Equation 10b)}$$

[11] The magnesium alloy according to any one of the above [1] to [5]:

wherein the A element is Al, wherein the B element is Ca, wherein the C element is Mn, wherein the D elements is one or more of RE (rare earth elements), Sr, Sn Li, Zn, Ag, Be and Sc, wherein the A element content of "a" atomic % and the B element content of "b" atomic % are within the range bounded by the straight lines represented by (1)~(9) below with the coordinates (b, a) with "b" on the horizontal axis and "a" is taken on the vertical axis.

(1) If "b" is in the range of Equation 1a below, the straight line of Equation 1b below.

$$2.5 \leq b \leq 3.5 \qquad \text{(Equation 1a)}$$

$$a=1.5 \qquad \text{(Equation 1b)}$$

(2) if "b" is in the range of Equation 2a below, the straight line of Equation 2b below.

$$3.5 \leq b \leq 7 \qquad \text{(Equation 2a)}$$

$$a=9b/7-3 \qquad \text{(Equation 2b)}$$

(3) If "b" is in the range of Equation 3a below, the straight line of Equation 3b below.

$$7 \leq b \leq 8 \qquad \text{(Equation 3a)}$$

$$a=4b-22 \qquad \text{(Equation 3b)}$$

(4) If "a" is in the range of Equation 4a below, the straight line of Equation 4b below.

$$10 \leq a \leq 12 \qquad \text{(Equation 4a)}$$

$$b=8 \qquad \text{(Equation 4b)}$$

(5) If "b" is in the range of Equation 5a below, the straight line of Equation 5b below.

$$4 \leq b \leq 8 \qquad \text{(Equation 5a)}$$

$$a=12 \qquad \text{(Equation 5b)}$$

(6) If "a" is in the range of Equation 6a below, the straight line of Equation 6b below.

$$10 \leq a \leq 12 \qquad \text{(Equation 6a)}$$

$$b=4 \qquad \text{(Equation 6b)}$$

(7) If "b" is in the range of Equation 7a below, the straight line of Equation 7b below.

$$1.25 \leq b \leq 4 \qquad \text{(Equation 7a)}$$

$$a=2b+2 \qquad \text{(Equation 7b)}$$

(8) If "a" is in the range of Equation 8a below, the straight line of Equation 8b below.

$$1.25 \leq a \leq 2.5 \qquad \text{(Equation 8a)}$$

$$a=4.5 \qquad \text{(Equation 8b)}$$

(9) If "a" is in the range of Equation 9a below, the straight line of Equation 9b below.

$$1.5 \leq a \leq 4.5 \qquad \text{(Equation 9a)}$$

$$b=2.5 \qquad \text{(Equation 9b)}$$

[12] The magnesium alloy according to the above [11]:
containing at least one of Yb and Be with the Yb content being "e" atomic % and the Be content being "f",
wherein "e" satisfies the following Equation 18, and 1' satisfies the following Equation 19.

$$0.01 \leq e \leq 1 \qquad \text{(Equation 18)}$$

$$5 \text{ ppm} \leq f \leq 100 \text{ ppm} \qquad \text{(Equation 19)}$$

[13] The magnesium alloy according to the above [11]:
wherein the first thermal conductivity in the first direction is 75 W/m-K or higher and the second thermal conductivity in the second direction is less than or equal to the first thermal conductivity,
wherein, when the first thermal conductivity is λ1 and the second thermal conductivity is λ2, λ1 and λ2 satisfy Equation 20 below, and

wherein the 0.2% proof stress of the magnesium alloy is not less than 200 MPa.

$$1 \leq \lambda_1/\lambda_2 \leq 1.3 \qquad \text{(Equation 20)}$$

[14] The magnesium alloy according to the above [11] or [12]:
having the first thermal conductivity of 100 W/m-K or higher,
wherein the A element content of "a" atomic % and the B element content of "b" atomic % are within the range bounded by the straight lines represented by (1)~(10) below with the coordinates (b, a) with "b" on the horizontal axis and "a" is taken on the vertical axis.

(1) If "b" is in the range of Equation 1a below, the straight line of Equation 1b below.

$$1 \leq b \leq 2 \qquad \text{(Equation 1a)}$$

$$a=2 \qquad \text{(Equation 1b)}$$

(2) If "b" is in the range of Equation 2a below, the straight line of Equation 2b below.

$$2 \leq b \leq 3 \qquad \text{(Equation 2a)}$$

$$a=2b-2 \qquad \text{(Equation 2b)}$$

(3) If "a" is in the range of Equation 3a below, the straight line of Equation 3b below.

$$4 \leq a \leq 5 \qquad \text{(Equation 3a)}$$

$$b=3 \qquad \text{(Equation 3b)}$$

(4) If "b" is in the range of Equation 4a below, the straight line of Equation 4b below.

$$3 \leq b \leq 3.5 \qquad \text{(Equation 4a)}$$

$$a=5 \qquad \text{(Equation 4b)}$$

(5) If "b" is in the range of Equation 5a below, the straight line of Equation 5b below.

$$3.5 \leq b \leq 5 \qquad \text{(Equation 5a)}$$

$$a=2b/3+8/3 \qquad \text{(Equation 5b)}$$

(6) If "a" is in the range of Equation 6a below, the straight line of Equation 6b below.

$$6 \leq a \leq 10 \qquad \text{(Equation 6a)}$$

$$b=5 \qquad \text{(Equation 6b)}$$

(7) If "b" is in the range of Equation 7a below, the straight line of Equation 7b below.

$$4.5 \leq b \leq 5 \qquad \text{(Equation 7a)}$$

$$a=10 \qquad \text{(Equation 7b)}$$

(8) If "b" is in the range of Equation 8a below, the straight line of Equation 8 b below $$4 \leq b \leq 5 \qquad \text{(Equation 8a)}$$

$$a=4b-8 \qquad \text{(Equation 8b)}$$

(9) If "b" is in the range of Equation 9a below, the straight line of Equation 9b below.

$$3 \leq b \leq 4 \qquad \text{(Equation 9a)}$$

$$a=3b/2+2 \qquad \text{(Equation 9b)}$$

(10) If "b" is in the range of Equation 10a below, the straight line of Equation 10b below.

$$1 \leq b \leq 3 \qquad \text{(Equation 10a)}$$

$$a=9b/4-1/4 \qquad \text{(Equation 10b)}$$

[15] The magnesium alloy according to the above [13]:

having the first thermal conductivity of 100 W/m-K or higher, wherein the A element content of "a" atomic % and the B element content of "b" atomic % are within the range bounded by the straight lines represented by (1)~(10) below with the coordinates (b, a) with "b" on the horizontal axis and "a" is taken on the vertical axis.

(1) If "b" is in the range of Equation 1a below, the straight line of Equation 1b below $$1 \leq b \leq 2 \qquad \text{(Equation 1a)}$$

$$a=2 \qquad \text{(Equation 1b)}$$

(2) If "b" is in the range of Equation 2a below, the straight line of Equation 2b below.

$$2 \leq b \leq 3 \qquad \text{(Equation 2a)}$$

$$a=2b-2 \qquad \text{(Equation 2b)}$$

(3) If "a" is in the range of Equation 3a below, the straight line of Equation 3b below.

$$4 \leq a \leq 5 \qquad \text{(Equation 3a)}$$

$$b=3 \qquad \text{(Equation 3b)}$$

(4) If "b" is in the range of Equation 4a below, the straight line of Equation 4b below.

$$3 \leq b \leq 3.5 \qquad \text{(Equation 4a)}$$

$$a=5 \qquad \text{(Equation 4b)}$$

(5) If "b" is in the range of Equation 5a below, the straight line of Equation 5b below.

$$3.5 \leq b \leq 5 \qquad \text{(Equation 5a)}$$

$$a=2b/3+8/3 \qquad \text{(Equation 5b)}$$

(6) If "a" is in the range of Equation 6a below, the straight line of Equation 6b below.

$$6 \leq a \leq 0 \qquad \text{(Equation 6a)}$$

$$b=5 \qquad \text{(Equation 6b)}$$

(7) If "b" is in the range of Equation 7a below, the straight line of Equation 7b below.

$$4.5 \leq b \leq 5 \qquad \text{(Equation 7a)}$$

$$a=10 \qquad \text{(Equation 7b)}$$

(8) If "b" is in the range of Equation 8a below, the straight line of Equation 8b below $$4 \leq b \leq 5 \qquad \text{(Equation 8a)}$$

$$a=4b-8 \qquad \text{(Equation 8b)}$$

(9) If "b" is in the range of Equation 9a below, the straight line of Equation 9b below.

$$3 \leq b \leq 4 \qquad \text{(Equation 9a)}$$

$$a=3b/2+2 \qquad \text{(Equation 9b)}$$

(10) If "b" is in the range of Equation 10a below, the straight line of Equation 10b below.

$$1 \leq b \leq 3 \qquad \text{(Equation 10a)}$$

$$a=9b/4-1/4 \qquad \text{(Equation 10b)}$$

[16] The magnesium alloy according to any one of the above [6] to [15]:

comprising an α-Mg phase and a C36-type intermetallic compound phase ((Mg, Al)2Ca), or an α-Mg phase, a C36 type intermetallic compound phase and a C15-type intermetallic compound phase (Al2Ca phase), wherein the C36-type intermetallic compound phase is contained by not less than 5 volume % and not more than 40 volume %.

[17] The magnesium alloy according to any one of the above [6] to [16]:

containing a C14-type intermetallic compound phase (Mg$_2$Ca phase) by 5 volume %.

[18] The magnesium alloy according to any one of the above [6] to [17]:

containing a plurality of α-Mg grains and a eutectic lamellar structure of the α-Mg phase and said C36 type intermetallic compound phase.

Wherein the plurality of α-Mg grains are connected to each other by said eutectic lamellar structure, and said α-Mg grains are connected to each other by said eutectic lamellar structure, and are networked with each other through said α-Mg phase of said eutectic lamellar microstructure.

[19] The magnesium alloy according to the above [18];

containing 0.5 atomic % to 2.5 atomic % of Al and 0 atomic % to 1.0 atomic % of Ca in the α-Mg matrix phase in said α-Mg grains.

[20] The magnesium alloy according to the above [18] or [19];

containing linear or plate-like compounds precipitated in the α-Mg matrix in said α-Mg grains.

[21] The magnesium alloy according to the above [20]:

wherein said linear or plate-like compounds are C15-type intermetallic compound phase.

[22] The magnesium alloy according to any one of the above [6] to [21]

wherein the full width at half maximum of the X-ray diffraction peak of the α-Mg phase is less than 1.5 times of that of pure Mg.

[23] The magnesium alloy according to any one of the above [6] to [22];

wherein the full width at half maximum of the X-ray diffraction peak of the α-Mg phase is reduced by 10% or more with respect to that of the α-Mg phase of the cast material immediately after being produced by the casting method with the alloy composition as described in Section [6] above.

[24] The magnesium alloy according to any one of the above [6] to [23];

wherein the full width at half maximum of the X-ray diffraction peak of the C36-type intermetallic compound is reduced by 10% or more with respect to that of the C36-type intermetallic compound of a cast material immediately after being produced by the casting method with the alloy composition as described in Section [6] above.

[25] The magnesium alloy according to any one of the above [6] to [24];

wherein "a" and "b" satisfy one of the sets of, Equations 5 and 6, Equations 7 and 8, Equations 9 and 10, and, Equations 11 and 12, below.

$$2.0 \leq a \leq 12.5 \qquad \text{(Equation 5)}$$

$$1.0 \leq b < 3 \qquad \text{(Equation 6)}$$

$$2.0 \leq a \leq 12.5 \qquad \text{(Equation 7)}$$

$$7 < b \leq 7.5 \qquad \text{(Equation 8)}$$

$$2.0 \leq a < 4.5 \qquad \text{(Equation 9)}$$

$$1.0 \leq b \leq 7.5 \qquad \text{(Equation 10)}$$

$$12.0 \leq a \leq 12.5 \qquad \text{(Equation 11)}$$

$$1.05 \leq b \leq 7.5 \qquad \text{(Equation 12)}$$

[26] The magnesium alloy according to any one of the above [6] to [24]:

wherein "a" and "b" satisfy Equations 13 and 14, and also satisfy Equation 15 or Equation 16 below.

$$2.0 \leq a \leq 12.5 \qquad \text{(Equation 13)}$$

$$3.0 \leq b \leq 7.0 \qquad \text{(Equation 14)}$$

$$a/b < 1.2 \qquad \text{(Equation 15)}$$

$$3.0 < a/b \qquad \text{(Equation 16)}$$

[27] The magnesium alloy according to any one of the above [6] to [26]:

a cast and plastic-deformed material with ribbons, wires rods, and powders of said magnesium ally and a 3D layered molding material using rapidly solidified material of said magnesium alloy with an electron beam or a laser beam.

[28] The magnesium alloy according to any one of the above [6] to [26]:

a composite material in which at least one of particles and fibers is composited into the magnesium alloy. The particles are at least one of carbon particles, ceramic particles, metal particles, and intermetallic compound particles, and the fiber is at least one of carbon fiber, ceramic fiber, and metal fiber.

[29] A production method of a magnesium alloy:

comprising process (a1) or process (a2), wherein said process (a1) is a process for forming a cast material by casting a magnesium alloy at a solidification rate of less than 1000 K/sec, wherein the process (a2) is a process for forming cast material by casting the magnesium alloy at a solidification rate of 1,000 K/sec to 1,000,000 K/sec.

wherein said magnesium alloy comprises A element in an amount of "a" atomic %, B element in an amount of "b" atomic %, C element in an amount of "c" atomic %, D element in an amount of "d" atomic %, and a residue of Mg and unavoidable impurities, wherein "a" and "b" are within the range bounded by the straight lines represented by (1) to (4) below, in the coordinates (a, b) with "a" on the horizontal axis and "b" on the vertical axis wherein "c" satisfies Equation 34 below, and "d" satisfies Equation 35 below, wherein the A element and the B Element satisfy Conditions 1 to 3 below, wherein C Element satisfies Condition 4 below, wherein D element satisfies Condition 5 below, containing $\alpha$-Mg phase, containing area fraction X % of a compound comprising the A element and the B element, the X satisfying Equation 41 below, containing area fraction Y % of a compound comprising Mg and the A element in terms of area fraction, wherein Y satisfies Equation 42 below, containing area fraction Z % of a compound comprising Mg and the B element wherein Z satisfies Equation 43 below, containing area fraction W % of a compound comprising Mg, the A element, and the element B wherein W satisfies Equation 44 below, wherein the total content of X, Y, Z, and W satisfies Equation 45 below, and having the thermal conductivity of 75 W/m-K or higher.

(1) If "a" is in the range of Equation 1a below, the straight line of Equation 1b below.

$$0.5 \leq a \leq 4.83 \qquad \text{(Equation 1a)}$$

$$b = 1.5 \qquad \text{(Equation 1b)}$$

(2) If "b" is in the range of Equation 2a below, the straight line of Equation 2b below.

$$1.5 \leq b \leq 5 \qquad \text{(Equation 2a)}$$

$$a = 7/3b + 4/3 \qquad \text{(Equation 2b)}$$

(3) If "b" is in the range of Equation 3a below, the straight line of Equation 3b below.

$$5 \leq b \leq 9.5 \qquad \text{(Equation 3a)}$$

$$a = -b + 18 \qquad \text{(Equation 3b)}$$

(4) If "b" is in the range of Equation 4a below, the straight line of Equation 4b below.

$$1.5 \leq b \leq 9.5 \qquad \text{(Equation 4a)}$$

$$a = b - 1 \qquad \text{(Equation 4b)}$$

$$0 \leq c \leq 0.1 \qquad \text{(Equation 34)}$$

$$0 \leq d \leq 1 \qquad \text{(Equation 35)}$$

(Condition 1) When the mixing enthalpy of Mg and A element is $\Delta H_{Mg\text{-}A}$, the following equation is satisfied.

$$-4.5 \text{ (kJ/mol)} < \Delta H_{Mg\text{-}A} < 0 \text{ (kJ/mol)}$$

(Condition 2) When the mixing enthalpy of Mg and B elements is $\Delta H_{Mg\text{-}A}$, the following equation is satisfied.

$$-7.5 \text{ (kJ/mol)} < \Delta H_{Mg\text{-}B} < -5.5 \text{ (kJ/mol)}$$

(Condition 3) When the mixing enthalpy of elements A and B is $\Delta H_{A\text{-}B}$, the following equation is satisfied.

$$\Delta H_{A\text{-}B} < -11 \text{ (kJ/mol) and } \Delta H_{A\text{-}B} \text{ and } \Delta H_{Mg\text{-}B} \geq 2.0$$

(Condition 4) When the mixing enthalpy of elements C and A is $\Delta H_{A\text{-}C}$, and the mixing enthalpy of element C and element B is $\Delta H_{B\text{-}C}$, the following equation is satisfied.

$$\Delta H_{A\text{-}B} < \Delta H_{A\text{-}C} \text{ and } \Delta H_{A\text{-}B} < \Delta H_{B\text{-}C}$$

(Condition 5) When the mixing enthalpy of elements D and C ss $\Delta H_{C\text{-}D}$, the following equation is satisfied.

$$\Delta H_{A\text{-}B} < \Delta H_{C\text{-}D}$$

$$0 < X \leq 10 \qquad \text{(Equation 41)}$$

$$Y = 0 \qquad \text{(Equation 42)}$$

$$0 < Z \leq 5 \qquad \text{(Equation 43)}$$

$$5 \leq W \leq 40 \qquad \text{(Equation 44)}$$

$$5 \leq X + Y + Z + W \leq 45 \qquad \text{(Equation 45)}$$

[30] The production method of a magnesium alloy according to the above [29]:

wherein the A element content of said "a" atomic % and the B element content of said "b" atomic % are within the range bounded by the straight lines represented by (5)~(9)

below with the coordinates (a, b) wherein said "a" is taken on the horizontal axis and said "b" is taken on the vertical axis.

(5) If "b" is in the range of Equation 5a below, the straight line of Equation 5b below.

$$1.5 \leq b \leq 4.5 \tag{Equation 5a}$$

$$7b/3+4/3 \tag{Equation 5b}$$

(6) If "b" is in the range of Equation 6a below, the straight line of Equation 6b below.

$$7.5 < a < 11.5 \tag{Equation 6a}$$

$$b=4.5 \tag{Equation 6b}$$

(7) If "b" is in the range of Equation 7a below, the straight line of Equation 7a below, $$4.5 < b < 6 \tag{Equation 7a}$$

$$a=7.5 \tag{Equation 7b}$$

(8) If "b" is in the range of Equation 8a below, the straight line of Equation 8b below.

$$4.5 < a < 12 \tag{Equation 8a}$$

$$b=6 \tag{Equation 8b}$$

(9) If "b" is in the range of Equation 9a below, the straight line of Equation 9 b below.

$$6 \leq b \leq 9.5 \tag{Equation 9a}$$

$$a=-b+18 \tag{Equation 9b}$$

[31] The production method of a magnesium alloy according to the above [29] or [30]:

wherein the cast material after said process (a1) or the rapidly solidified material after said process (a2) heat-treated at a temperature of not less than 200° C. and not more than 510° C. for not less than 0 hour and not more than 200 hours (preferably 100 hours or less) before plastic working on said cast material or before solidification molding on said rapidly solidified material, wherein the heat-treated material has a higher thermal conductivity than the cast or rapidly solidified material.

[32] The magnesium alloy according to any one of [29] to [31] above, wherein the A element is Al or Zn, and wherein the B element is one of Ca, Ce, and Y, wherein the C element is Mn or Zr, and wherein the D element is one or more of RE (rare earth elements), Sr, Sn, Li, Zn Ag, Be and Sc.

[33] The magnesium alloy according to the above [32] with the RE content satisfying Equation 51 below.

$$0 \leq RE \leq 1.4 \text{ wt \%} \tag{Equation 51}$$

[34] The magnesium alloy according to In any one of [29] to [33] above, wherein the compound comprising the A element and the B element is a C15-type intermetallic compound phase (Al2Ca phase), and wherein the compound comprising Mg and the A element is a β phase (Mg17Al12 compound), etc., and wherein the compound comprising Mg and the above B elements is a C14 type intermetallic compound phase (Mg2Ca phase), and wherein the compound comprising Mg and the A and B elements is a C36-type intermetallic compound phase ((Mg, Al)2Ca phase), if the A element is Al and the B element is Ca.

[35] The production method of a magnesium alloy according to any one of [29] to [34] above, wherein the A element is Al, wherein the B element is Ca, wherein the C element is Mn, wherein the D element is one or more of RE (rare earth elements), Sn, Li, Zn, Ag, Be and Mn. Zn, Ag, Be and Sc, not containing Si and Sr, wherein Al content of "a" atomic % and Ca content of "b" atomic % are within the range bounded by the straight lines represented by the following (1)~(8) in the coordinate (b, a) with "b" on the horizontal axis and "a" on the vertical axis.

$$0 \leq c \leq 0.1 \tag{Equation 1}$$

$$0 \leq d \leq 0.11 \tag{Equation 2}$$

(1) If "b" is in the range of Equation 1a below, the straight line of Equation 1b below.

$$0 \leq b \leq 3.5 \tag{Equation 1a}$$

$$a=1.5 \tag{Equation 1b}$$

(2) if "b" is in the range of Equation 2a below, the straight line in Equation 2b below.

$$3.5 \leq b \leq 7 \tag{Equation 2a}$$

$$a=9b/7-3 \tag{Equation 2b}$$

(3) if "b" is in the range of Equation 3a below, the straight line of Equation 3b below.

$$7 \leq b \leq 8 \tag{Equation 3a}$$

$$a=4b-22 \tag{Equation 3b}$$

(4) If "a" is in the range of Equation 4a below, the straight line of Equation 4b below.

$$10 \leq a \leq 12 \tag{Equation 4a}$$

$$b=8 \tag{Equation 4b}$$

(5) If "b" is in the range of Equation 5a below, the straight line of Equation 5b below.

$$4 \leq b \leq 8 \tag{Equation 5a}$$

$$a=12 \tag{Equation 5b}$$

(6) If "a" is in the range of Equation 6a below, the straight line in Equation 6b below.

$$10 \leq a \leq 12 \tag{Equation 6a}$$

$$b=4 \tag{Equation 6b}$$

(7) If "b" is in the range of Equation 7a below, the straight line of Equation 7b below.

$$0 \leq b \leq 4 \tag{Equation 7a}$$

$$a=2b+2 \tag{Equation 7b}$$

(8) If "a" is in the range of Equation 8a below, the straight line of Equation 8b.

$$1.5 \leq a \leq 2 \tag{Equation 8a}$$

$$b=0 \tag{Equation 8b}$$

[36] The production method of a magnesium alloy according to any one of [29] to [34] above wherein the A element is Al, wherein the B element is Ca, wherein the C element is Mn, wherein the D element is one or more of a rare earth element (RE) other than Yb, Sr, Sn, Li, Zn, Ag, Be and Sc. containing at least one of Yb and Be, wherein the content of Yb is "e" atomic %, the content of Be is 'f', and wherein "e" satisfies Equation 18 below, wherein "f" satisfies Equation 19 below.

$$0.01 \leq e \leq 1 \tag{Equation 18}$$

$$5\ \text{ppm} \leq f \leq 100\ \text{ppm} \tag{Equation 19}$$

(1) If "b" is in the range of Equation 1a below, the straight line of Equation 1b below.

$$0 \leq b \leq 3.5 \tag{Equation 1a}$$

$$a = 1.5 \tag{Equation 1b}$$

(2) If "b" is in the range of Equation 2a below, the straight line of Equation 2b below.

$$3.5 \leq b \leq 7 \tag{Equation 2a}$$

$$a = 9b/3 - 7 - 3 \tag{Equation 2b}$$

(3) If "b" is in the range of Equation 3a below, the straight line of Equation 3b below.

$$7 \leq b \leq 8 \tag{Equation 3a}$$

$$a = 4b - 22 \tag{Equation 3b}$$

(4) If "a" is in the range of Equation 4a below, the straight line of Equation 4b below.

$$10 \leq a \leq 12 \tag{Equation 4a}$$

$$b = 8 \tag{Equation 4b}$$

(5) If "b" is in the range of Equation 5a below, the straight line of Equation 5b below.

$$4 \leq b \leq 8 \tag{Equation 5a}$$

$$a = 12 \tag{Equation 5b}$$

(6) If "a" is in the range of Equation 6a below, the straight line in Equation 6b below.

$$10 \leq a \leq 12 \tag{Equation 6a}$$

$$b = 4 \tag{Equation 6b}$$

(7) If "b" is in the range of Equation 7a below, the straight line of Equation 7b below.

$$0 \leq b \leq 4 \tag{Equation 7a}$$

$$a = 2b + 2 \tag{Equation 7b}$$

(8) If "a" is in the range of Equation 8a below, the straight line of Equation 8b below.

$$1.5 \leq a \leq 2 \tag{Equation 8a}$$

$$b = 0 \tag{Equation 8b}$$

[37] The production method of a magnesium alloy according to [35] or [36] above, wherein Al content of "a" atomic % and Ca content of "b" atomic % are within the range bounded by the straight lines represented by (1)~(10) below in the coordinates (b, a) with "b" on the horizontal axis and "a" on the vertical axis.

(1) If "b" is in the range of Equation 1a below, the straight line of Equation 1b below.

$$1 \leq b \leq 2 \tag{Equation 1a}$$

$$a = 2 \tag{Equation 1b}$$

(2) If "b" is in the range of Equation 2a below, the straight line of Equation 2b below.

$$2 \leq b \leq 3 \tag{Equation 2a}$$

$$a = 2b - 2 \tag{Equation 2b}$$

(3) If "a" is in the range of Equation 3a below, the straight line of Equation 3b below.

$$4 \leq a \leq 5 \tag{Equation 3a}$$

$$b = 3 \tag{Equation 3b}$$

(4) If "b" is in the range of Equation 4a below, the straight line of Equation 4b below.

$$3 \leq b \leq 3.5 \tag{Equation 4a}$$

$$a = 5 \tag{Equation 4b}$$

(5) If "b" is in the range of Equation 5a below, the straight line of Equation 5b below.

$$3.5 \leq b \leq 5 \tag{Equation 5a}$$

$$a = 2b/3 + 8/3 \tag{Equation 5b}$$

(6) If "a" is in the range of Equation 6a below, the straight line of Equation 6b below.

$$6 \leq a \leq 10 \tag{Equation 6a}$$

$$b = 5 \tag{Equation 6b}$$

(7) If "b" is in the range of Equation 7a below, the straight line of Equation 7b below.

$$4.5 \leq b \leq 5 \tag{Equation 7a}$$

$$a = 10 \tag{Equation 7b}$$

(8) If "b" is in the range of Equation 8a below, the straight line of Equation 8b below.

$$4 \leq b \leq 5 \tag{Equation 8a}$$

$$a = 4b - 8 \tag{Equation 8b}$$

(9) If "b" is in the range of Equation 9a below, the straight line of Equation 9b below.

$$3 \leq b \leq 4 \tag{Equation 9a}$$

$$a = 3b/2 + 2 \tag{Equation 9b}$$

(10) If "b" is in the range of Equation 10a below, the straight line of Equation 10b below.

$$1 \leq b \leq 3 \tag{Equation 10a}$$

$$a = 9b/4 - 1/4 \tag{Equation 10b}$$

[38] The production method of a magnesium alloy according to any one of the above [29] to [34], wherein the A element is Al, wherein the B element is Ca, wherein the C element is Mn, wherein the D element is one or more of RE (rare earth elements), Sr, Sn, Li, Zn, Ag, Be and Sc, wherein the Al content of "a" atomic % and the Ca content of "b" atomic % are within the range bounded by the straight lines represented by (1)~(8) below in the coordinates (b, a) with "b" on the horizontal axis and "a" on the vertical axis.

(1) If "b" is in the range of Equation 1a below, the straight line of Equation 1b below.

$$2.5 \leq b \leq 3.5 \tag{Equation 1a}$$

$$a = 1.5 \tag{Equation 1b}$$

(2) If "b" is in the range of Equation 2a below, the straight line of Equation 2b below.

$$3.5 \leq b \leq 7 \qquad \text{(Equation 2a)}$$

$$a=9b/7-3 \qquad \text{(Equation 2b)}$$

(3) If "b" is in the range of Equation 3a below, the straight line of Equation 3b below.

$$7 \leq b \leq 8 \qquad \text{(Equation 3a)}$$

$$a=4b-22 \qquad \text{(Equation 3b)}$$

(4) If "a" is in the range of Equation 4a below, the straight line of Equation 4b below.

$$10 \leq a \leq 12 \qquad \text{(Equation 4a)}$$

$$b=8 \qquad \text{(Equation 4b)}$$

(5) If "b" is in the range of Equation 5a below, the straight line of Equation 5b below.

$$4 \leq b \leq 8 \qquad \text{(Equation 5a)}$$

$$a=12 \qquad \text{(Equation 5b)}$$

(6) If "a" is in the range of Equation 6a below, the straight line of Equation 6b below.

$$10 \leq a \leq 12 \qquad \text{(Equation 6a)}$$

$$b=4 \qquad \text{(Equation 6b)}$$

(7) If "b" is in the range of Equation 7a below, the straight line of Equation 7b below.

$$1.25 \leq b \leq 4 \qquad \text{(Equation 7a)}$$

$$a=2b+2 \qquad \text{(Equation 7b)}$$

(8) If "a" is in the range of Equation 8a below, the straight line of Equation 8b below.

$$1.25 \leq a \leq 2.5 \qquad \text{(Equation 8a)}$$

$$a=4.5 \qquad \text{(Equation 8b)}$$

(9) If "a" is in the range of Equation 9a below, the straight line of Equation 9b below.

$$1.5 \leq a \leq 4.5 \qquad \text{(Equation 9a)}$$

$$b=2.5 \qquad \text{(Equation 9b)}$$

[39] The production method of a magnesium alloy according to the above [38]

wherein the magnesium alloy contains at least one of Yb and Be with the Yb content being "e" atomic % and the Be content being "f", wherein "e" satisfies the following Equation 18, and "f" satisfies the following Equation 19.

$$0.01 \leq e \leq 1 \qquad \text{(Equation 18)}$$

$$5 \text{ ppm} \leq f \leq 100 \text{ ppm.} \qquad \text{(Equation 19)}$$

[40] The production method of a magnesium alloy according to [38] or [39] above, wherein the A element content of "a" atomic % and the B element content of "b" atomic % are within the range bounded by the straight lines represented by (1)~(10) below with the coordinates (b, a) with "b" on the horizontal axis and "a" is taken on the vertical axis.

(1) If "b" is in the range of Equation 1a below, the straight line of Equation 1b below.

$$1 \leq b \leq 2 \qquad \text{(Equation 1a)}$$

$$a=2 \qquad \text{(Equation 1b)}$$

(2) If "b" is in the range of Equation 2a below, the straight line of Equation 2b below.

$$2 \leq b \leq 3 \qquad \text{(Equation 2a)}$$

$$a=2b-2 \qquad \text{(Equation 2b)}$$

(3) If "a" is in the range of Equation 3a below, the straight line of Equation 3b below.

$$4 \leq a \leq 5 \qquad \text{(Equation 3a)}$$

$$b=3 \qquad \text{(Equation 3b)}$$

(4) If "b" is in the range of Equation 4a below, the straight line of Equation 4b below.

$$3 \leq b \leq 3.5 \qquad \text{(Equation 4a)}$$

$$a=5 \qquad \text{(Equation 4b)}$$

(5) If "b" is in the range of Equation 5a below, the straight line of Equation 5b below.

$$3.5 \leq b \leq 5 \qquad \text{(Equation 5a)}$$

$$a=2b/3+8/3 \qquad \text{(Equation 5b)}$$

(6) If "a" is in the range of Equation 6a below the straight line of Equation 6b below.

$$6 \leq a \leq 10 \qquad \text{(Equation 6a)}$$

$$b=5 \qquad \text{(Equation 6b)}$$

(7) If "b" is in the range of Equation 7a below, the straight line of Equation 7b below.

$$4.5 \leq b \leq 5 \qquad \text{(Equation 7a)}$$

$$a=10 \qquad \text{(Equation 7b)}$$

(8) If "b" is in the range of Equation 8a below, the straight line of Equation 8b below, $$4 \leq b \leq 5 \qquad \text{(Equation 8a)}$$

$$a=4b-8 \qquad \text{(Equation 8b)}$$

(9) If "b" is in the range of Equation 9a below, the straight line of Equation 9b below.

$$3 \leq b \leq 4 \qquad \text{(Equation 9a)}$$

$$a=3b/2+2 \qquad \text{(Equation 9b)}$$

(10) If "b" is in the range of Equation 9a below, the straight line of Equation 10b below.

$$1 \leq b \leq 3 \qquad \text{(Equation 10a)}$$

$$a=9b/4-1/4 \qquad \text{(Equation 10b)}$$

[41] The production method of a magnesium alloy according to any one of the above [29] to [40]:

characterized in that, after the process (a1), the cast material is subjected to plastic working or giant strain working (c).

[42] The production method of a magnesium alloy according to [41] above;

characterized by the process of forming a heat-treated material by heat-treating the cast material after the process (c) at a temperature of not less than 200° C. and not more than 510° C. for 0 hour to not more than 200 hours.

[43] The production method of a magnesium alloy according to any one of [29] to [42] above:

comprising, followed by the process (a1), said process (d) for forming a chip material by cutting of said cast material and a process (e1) for forming a solid-formed material by molding and forming said chip material.

[44] The production method of a magnesium alloy according to the above [43]:

wherein the chip material is heat-treated at a temperature of between 200° C. and 510° C. for 0 to 200 hours (preferably 100 hours or less) to form heat-treated chip material, wherein the process (e1) is a process of forming a solid-formed material by molding and forming the heat-treated chip material, and wherein the thermal conductivity of the solidified material is 75 W/K-m or higher.

[45] The production method of a magnesium alloy according to any one of [29] to [41] above:

wherein said process (a2) is followed by the process (e2) in which said rapidly solidified material is molded to a solid-formed material.

[45-1] The production method of a magnesium alloy according to [43] to [45] above:

Wherein the heat-treatment is conducted at a temperature of 200° C. to 510° C. for 0 hours to 200 hours or less (preferably 100 hours or less) to form a heat-treated material.

[46] The production method of a magnesium alloy according to any one of [32] to [45] above:

comprising an $\alpha$-Mg phase and a C36-type intermetallic compound phase ((Mg, Al)$_2$Ca), or an $\alpha$-Mg phase, a C36 type intermetallic compound phase and a C15-type intermetallic compound phase (Al$_2$Ca phase), wherein the C36-type intermetallic compound phase is contained by not less than 5 volume % and not more than 40 volume %.

[47] The production method of a magnesium alloy according to any one of [32] to [46] above:

wherein said cast material of the process (a1) contains C15-type intermetallic compound phase (Al$_2$Ca phase).

[48] The production method of a magnesium alloy according to any one of [32] to [47] above:

wherein the cast material after said process (a1) contains C14-type intermetallic compound phase (Mg$_2$Ca phase) for not less than 5 volume %.

[49] The production method of a magnesium alloy according to any one of [32] to [48] above:

wherein the magnesium alloy contains a plurality of $\alpha$-Mg grains and a eutectic lamellar structure of the $\alpha$-Mg phase and said C36 type intermetallic compound phase, and wherein the plurality of $\alpha$-Mg grains are connected to each other by said eutectic lamellar structure, and said $\alpha$-Mg grains are connected to each other by said eutectic lamellar structure, and are networked with each other through said $\alpha$-Mg phase of said eutectic lamellar microstructure.

[50] The production method of a magnesium alloy according to [49] above:

wherein the magnesium alloy contains 0.5 atomic % to 2.5 atomic % of Al and 0 atomic % to 1.0 atomic % of Ca in the $\alpha$-Mg matrix phase in said $\alpha$-Mg grains

[51] The production method of a magnesium alloy according to [49] or [50] above, wherein the magnesium alloy contains linear or plate-like compounds precipitated in the $\alpha$-Mg matrix in said $\alpha$-Mg grains.

[52] The production method of a magnesium alloy according to [51] above, wherein said linear or plate-like compounds are C15-type intermetallic compound phase.

[53] The production method of a magnesium alloy according to any one of [32] to [52] above, wherein the full width at half maximum of the X-ray diffraction peak of the $\alpha$-Mg phase in the cast material after process (a1) is less than 1.5 times of that of pure Mg.

[54] The production method of a magnesium alloy according to [41] above, wherein the full width at half maximum of the X-ray diffraction peak of the $\alpha$-Mg phase in the cast heat-treated material after process (b1) is less than 1.5 times of that of pure Mg.

[55] The production method of a magnesium alloy according to any one of [41] to [54] above:

wherein the full width at half maximum of the X-ray diffraction peak of the $\alpha$-Mg phase in the cast and heat-treated material after process (b1) is reduced by 10% or more with respect to that of the $\alpha$-Mg phase of the cast material immediately after the casting process (a1).

[56] The production method of a magnesium alloy according to any one of [41], [43] to [55] above:

wherein the full width at half maximum of the X-ray diffraction peak of a C36-type intermetallic compound of the cast and heat-treated material after process (b1) is reduced by 10% or more with respect to that of the C36-type intermetallic compound of the cast material immediately after the casting process (a1).

According to an embodiment of the present invention, it is possible to provide a magnesium alloy having a thermal conductivity of 75 W/m-K or higher or a method for producing the same.

BRIEF DESCRIPTION OF DRAWINGS

FIG. 1 shows the range of Al and Ca contents of magnesium alloys according to the second embodiment of the present invention.

FIG. 2 shows the range of Al and Ca content of magnesium alloys used in a modified example of the second embodiment of the invention.

FIG. 3 shows the thermal conductivity of cast magnesium alloys of the samples of Example 1.

FIGS. 4(*a*)~4(*d*) show the IPF maps of the Mg$_{85}$Al$_{10}$Ca$_5$ cast alloy of the samples of Example 1

FIG. 5 shows the thermal conductivity of the heat-treated cast materials of magnesium alloys in the samples of Example 1.

FIG. 6 shows TEM photographs and SAED images of the Mg$_{85}$Al$_{10}$Ca$_5$ casti alloy of the samples of Example 1.

FIG. 7 is a SEM photograph of the microstructure of the cast material of the Mg$_{85}$Al$_{10}$Ca$_5$ alloy of the sample of Example 1.

FIG. 8(*a*) shows a SEM photograph of the microstructure of the cast Mg$_{85}$Al$_{10}$Ca$_5$ alloy of the sample of Example 1

FIG. 8(*b*) shows a SEM photograph of the microstructure of the cast and heat-treated Mg$_{85}$Al$_{10}$Ca$_5$ alloy of the sample of Example 1.

FIG. 9 shows the effect of heat treatment time on the solute concentration in the $\alpha$-Mg matrix phase within the $\alpha$-Mg grains.

FIG. 10(*a*) shows the results of XRD analysis of pure Mg, and FIG. 10(*b*) shows the sample of Example 1 Mg$_{85}$Al$_{10}$Ca$_5$ alloy castings, and FIG. 10(*c*) shows the results of XRD analysis of the FIG. 10(*c*) shows the results of XRD analysis of the cast and heat-treated material of the Mg$_{85}$Al$_{10}$Ca$_5$ alloy of the sample of Example 1. FIG. 10(*c*) shows the results of XRD analysis of the cast and heat-treated Mg Al Ca alloy samples of Example 1.

FIG. 11 shows the thermal conductivity of the extruded alloys after cast and heat treatment process of the samples of Example 1.

FIG. 12 shows the thermal conductivity of the extrudate after casting process of the samples of Example 1.

FIGS. 13(*a*) and 13(*b*) show the mechanical properties of the samples used in FIG. 11 (extruded after casting and heat treatment process) and in FIG. 12 (extruded after casting process), respectively.

FIGS. 14(*a*) and 14(*b*) show the mechanical properties of the samples used in FIG. 11 (extruded after casting and heat treatment process) and in FIG. 12 (extruded after casting process), respectively.

FIG. 15 shows the thermal conductivity and yield strength of the chip-solidified material of $Mg_{99.98-3x}Al_{2x}Ca_xMn_{002}$ alloy FIG. 16 shows the thermal conductivity and yield strength of the rapidly solid-formed material of $Mg_{99.98-3x}Al_{2x}Ca_xMn_{002}$ alloy.

FIG. 17 shows the range of Al and Ca contents of the magnesium alloy used in the modified example of the second embodiment.

FIG. 18 shows increase of ignition temperature of Mg-4Al-2C "a" atomic % alloy with Be or Yb addition in Example 4.

FIGS. 19(*a*) and 19(*b*) show the range of ignition temperatures of magnesium alloys containing Be or Yb.

FIGS. 19(*a*) and 19(*b*) show photographs of the structures the $Mg_{8798}Al_8Ca_4Mn_{002}$ alloy extruded at 523K with extrusion ratio of 10 and an extrusion speed of 2.5 mm/s, after heat-treated at 623 K for 8 hours FIG. 20 shows the anisotropy of thermal conductivity in the ED and TD directions of the heat-treated and extruded material and the heat-treated and chip-solidified material of $Mg_{998-3x}Al_{2x}Ca_xMn_{002}$ alloy of Example 2

FIG. 21 shows the range of Al and Ca content n magnesium alloys according to the first embodiment of the invention.

FIG. 22 shows the range of Al and Ca content of magnesium alloys used in a modified example of the first embodiment of the present invention.

FIG. 23 shows the range of Al and Ca content of the magnesium alloy shown in FIG. 17, which is a further modified example of the composition range of the magnesium alloy.

FIG. 24 shows the results of XRD analysis of the $Mg_{98-2x}Al_{x+2}Ca$ cast material of Example 5_x FIG. 25 shows the results of XRD analysis of the $Mg_{98-2x}Al_{x+2}Ca$ cast and heat-treated material of Example 5

FIG. 26 shows the results of XRD analysis of the extruded material after heat-treatment of Example 5.

FIG. 27 shows the relationship between the solute concentration in the α-Mg phase and the thermal conductivity of the sample of Example 6.

FIG. 28 shows the mechanical properties (0.2% proof stress: $\sigma_{02}$, elongation: δ) of the heat-treated and extruded material in FIG. 26 ($Mg_{98-2x}Al_{x+2}Ca_x$)

FIG. 29 shows the mechanical properties of the chip-solidified, molded and heat-treated material and the chip-solid-formed material of the $Mg_{97.98-2x}Al_{x+2}Ca_xMn_{0.02}$ alloy of Example 7_x FIG. 30 shows the mechanical properties of the rapidly-solidified, molded and heat-treated material and the rapidly-solid-formed material of the $Mg_{97.98-2x}Al_{x+2}Ca_xMn_{0.02}$ alloy of Example 8_x FIG. 31 shows the results of the salt water immersion test for the rapidly-solidified material and the rapidly-solidified and heat-treated material of $Mg_{97.98-2x}Al_{x+2}Ca_xMn_{0.0}$ alloy of Example 9.

FIG. 32 shows the effect of the timing of heat treatment on the thermal conductivity of the chip-solid-formed material of the $Mg_{90.98}Al_6Ca_3Mn_{0.02}$ alloy of Example 10.

FIG. 33 shows the effect of heat treatment conditions on the thermal conductivity of the Mg-5 Al-3Ca-0.0.2Mn alloy of Example 11.

DESCRIPTION OF EMBODIMENTS

In the following, the form of the invention will be described in detail using the drawings. However, it is easily understood by those skilled in the art that the invention is not limited to the following description and that the form and details may be changed in various ways without departing from the purpose and scope of the invention. Therefore, the present invention is not to be interpreted as limited to the description of the following embodiments.

Embodiment 1

<Magnesium Alloys>

A magnesium alloy according to an embodiment of the present invention contains "a" atomic % of A element, "b" atomic % of element B, "c" atomic % of element C, "d" atomic % of element D, and a residue of Mg and unavoidable impurities. The C and D elements are elements for improving properties.

The A element content of "a" atomic % and the B element content of "b" atomic % are within the range bounded by the straight lines represented by (1) to (4) below, in the coordinates (a, b) with "a" on the horizontal axis and "b" on the vertical axis.

(1) If "a" is in the range of Equation 1a below, the straight line is Equation 1b below.

$$0.5 \leq a \leq 4.83 \qquad \text{(Equation 1a)}$$

$$b=1.5 \qquad \text{(Equation 1b)}$$

(2) If "b" is in the range of Equation 2a below, the straight line of Equation 2b below.

$$1.5 \leq b \leq 5 \qquad \text{(Equation 2a)}$$

$$a=7/3b+4/3 \qquad \text{(Equation 2b)}$$

(3) If "b" is in the range of Equation 3a below, the straight line in Equation 3b below.

$$5 \leq b \leq 9.5 \qquad \text{(Equation 3a)}$$

$$a=-b+18 \qquad \text{(Equation 3b)}$$

(4) If "b" is in the range of Equation 4a below, the straight line of Equation 4b below.

$$1.5 \leq b \leq 9.5 \qquad \text{(Equation 4a)}$$

$$a=b-1 \qquad \text{(Equation 4b)}$$

The range bounded by the straight lines expressed in (1)~(4) above, when A element is Al and element B is Ca, is the range surrounded by the four straight lines shown in FIG. 21.

The A element content and B element content described above can also be in the range bounded by the straight lines represented by (1), (4), (5)~(9) below.

(1) If "a" is in the range of Equation 1a below, the straight line of Equation 1b below.

$$0.5 \leq a \leq 4.83 \tag{Equation 1a}$$

$$b = 1.5 \tag{Equation 1b}$$

(5) If "b" is in the range of Equation 5a below, the straight line of Equation 5b below.

$$1.5 \leq b \leq 4.5 \tag{Equation 5a}$$

$$7b/3 + 4/3 \tag{Equation 1b}$$

(6) If "a" is in the range of Equation 6a below, the straight line of Equation 6b below.

$$7.5 < a < 11.5 \tag{Equation 6a}$$

$$b = 4.5 \tag{Equation 6b}$$

(7) If "b" is in the range of Equation 7a below, the straight line of Equation 7b below.

$$4.5 < b < 6 \tag{Equation 7a}$$

$$a = 7.5 \tag{Equation 7b}$$

(8) If "a" is in the range of Equation 8a below, the straight line in Equation 8b below.

$$4.5 < a < 12 \tag{Equation 8a}$$

$$b = 6 \tag{Equation 8b}$$

(9) If "b" is in the range of Equation 9a below, the straight line of Equation 9b below.

$$6 \leq b \leq 9.5 \tag{Equation 9a}$$

$$a = -b + 18 \tag{Equation 9b}$$

(4) If "b" is in the range of Equation 4a below, the straight line of Equation 4b below, $$1.5 \leq b \leq 9.5 \tag{Equation 4a}$$

$$(b) a = b - 1 \tag{Equation 4b}$$

The range bounded by the straight lines represented by (1), (4), (5), and (9) above is shown in FIG. 22, when the A element is Al and the B element is Ca.

It is recommended that c, the content (atomic %) of the C element, should satisfy the following Equation 34, and d, the content (atomic %) of the D element, should satisfy the following Equation 35.

$$0 \leq c \leq 0.1 \tag{Equation 34}$$

$$0 \leq d \leq 1 \tag{Equation 35}$$

It is more preferable if the aforementioned c satisfies the following Equation 34'.

$$0 < c \leq 0.1 \tag{Equation 34'}$$

Also, it is preferable if said c It is more preferable if the above c satisfies the following Equation 34".

$$0.01 < c \leq 0.1 \tag{Equation 34''}$$

The above magnesium alloys have an $\alpha$-Mg phase.

The above A element and the above B element satisfy Conditions 1 to 3 below, (Condition 1) When the mixing enthalpy of Mg and A element is $\Delta H_{Mg\text{-}A}$, the following equation is satisfied.

$$-4.5 \text{ (kJ/mol)} < \Delta H_{Mg\text{-}A} < 0 \text{ (kJ/mol)}$$

(Condition 2) When the mixing enthalpy of Mg and B elements is set as $\Delta H_{Mg\text{-}B}$, the following equation is satisfied.

$$-7.5 \text{ (kJ/mol)} < \Delta H_{Mg\text{-}B} < -5.5 \text{ (kJ/mol)}$$

(Condition 3) When the mixing enthalpy of elements A and B is set as $\Delta H_{A\text{-}B}$, the following equation is satisfied.

$$\Delta H_{A\text{-}B} < -11 \text{ (kJ/mol) and } \Delta H_{A\text{-}B}/\Delta H_{Mg\text{-}B} \geq 2.0$$

The C element is an element satisfying the following Condition 4.

(Condition 4) When the mixing enthalpy of element A and element C is $\Delta H_{A\text{-}C}$ and the mixing enthalpy of element B and element C is $\Delta H_{B\text{-}C}$, the following equation is satisfied.

$$\Delta H_{A\text{-}B} < \Delta H_{A\text{-}C} \text{ and } \Delta H_{A\text{-}B} < \Delta H_{B\text{-}C}$$

The D element is an element that satisfies the following condition 5.

(Condition 5) When the mixing enthalpy of C element and D element is $\Delta H_{C\text{-}D}$, the following equation is satisfied.

$$\Delta H_{A\text{-}B} < \Delta H_{C\text{-}D}$$

The above magnesium alloys contain a compound comprising elements A and B (A-B compound) is contained by X % in area fraction, and X should satisfy the following Equation 41.

$$0 < X \leq 10 \tag{Equation 41}$$

The magnesium alloy contains Y % of a compound comprising Mg and the A element (Mg-A compound) in terms of area fraction. Y %, and Y should satisfy the following Equation 42. In other words, the magnesium alloy should not contain any compound comprising Mg and A elements.

$$Y = 0 \tag{Equation 42}$$

The magnesium alloy should contain Z % as an area fraction of a compound comprising Mg and B elements (Mg—B compound), and Z should satisfy the following Equation 43.

$$0 < Z \leq 5 \tag{Equation 43}$$

This magnesium alloy contains W % as an area fraction of a compound comprising Mg, A element and B element (Mg-A compound), and W should satisfy the following Equation 44.

$$5 \leq W \leq 40 \tag{Equation 44}$$

The total content of X, Y, Z and W in the above should satisfy the following Equation 45.

$$5 \leq X + Y + Z + W \leq 45 \tag{Equation 45}$$

The above magnesium alloys should have a thermal conductivity of 75 W/m-K or higher. More specific examples of the above magnesium alloys are described below.

The A element above should be Al or Zn.

The B element should be Ca, Ce, or Y.

The C element should be Mn or Zr, which is an element to improve corrosion resistance.

The D elements should be one or more of RE (rare earth elements), Si, Sr, Sn, Li, Zn Ag, Be and Sc.

The above RE content should satisfy the following Equation 51.

$$0 \leq RE \leq 0.4 \text{ wt \%.} \tag{Equation 51}$$

When the A element is Al and the B element is Ca, the compound comprising the A element and B elements (A-B compound) is a C15-type intermetallic compound phase ($Al_2Ca$ phase), and the compound comprising Mg and the A element (Mg-A compounds) is a beta phases ($Mg_{17}Al_{12}$ compounds), etc., and the compound comprising Mg and B elements (Mg—B compounds) is C14-type intermetallic compound phases ($Mg_2Ca$ phase), and the compound comprising Mg, A elements and B elements (Mg-A-B compound) is a C36-type intermetallic compound phase (($Mg$, $Al)_2Ca$ phase).

The effects of Conditions 1 to 5 above are described below.

A negative enthalpy of mixing means that both elements are more likely to combine. With Condition 1, "$-4.5$ (kJ/mol)$<\Delta H_{Mg-A}<0$ (kJ/mol)" and Condition 2, "$-7.5$ (kJ/mol)$<\Delta H_{Mg—B}\leq-5.5$ (kJ/mol)", we can conclude that elements A and B elements are weakly bound to Mg without repelling Mg, so they tend to form compounds with Mg, but the tendency of this aspect is stronger with the B element than the A element. Therefore, rather than the forming of Mg-A compounds, Mg—B compounds and Mg—B-A compounds are more likely to be formed. As a result, formation of Mg—B compounds and Mg—B-A compounds, which enhance mechanical strength, suppress the formation of Mg-A compounds, which reduce the thermal conductivity. Therefore, conditions 1 and 2 make it possible to improve the thermal conductivity while increasing the mechanical strength.

In addition, Condition 3, "$\Delta H_{A-B}<-11$ (kJ/mol) (kJ/mol)", enhances the A-B compound formation with the A element and B element dissolved in α-Mg crystal grains. As a result, the formation of the A-B compound in the α-Mg crystal grains increases the purity in the α-Mg crystal grains and the thermal conductivity is improved In addition, condition 3, "$H_{A-B}/\Delta H_{Mg—B}\geq2.0$," enhances the formation of A-B compounds rather than Mg—B compounds and Mg—B-A compounds, so the purity in the α-Mg crystal grains is increased and the thermal conductivity is improved.

When adding C or D elements, which are effective for corrosion resistance and high strength, etc., with Conditions 4, "$\Delta H_{A-B}<\Delta H_{A-C}$ and $\Delta H_{A-B}<\Delta H_{B-C}$", and Condition 5, "$\Delta H_{A-B}<\Delta H_{C-D}$", the bonding strength between B element and C element, or that between C element and D element is weaker than that between A element and B element. For this reason, the A-B compounds are enhanced rather than the formation of C-A, C-B, and C-D compounds, so that the thermal conductivity is improved by the purification of α-Mg crystal grains, without losing the effect of the C element addition.

Magnesium alloys satisfying Conditions 1 to 3 include Mg—Zn—Ca alloys, Mg—Zn—Ce alloys, and Mg—Zn—Y alloys in addition to Mg—Al—Ca alloys. Mg—Zn—Ce alloys, and Mg—Zn—Y alloys. The mixing enthalpies for Conditions 1 through 5 above are specifically explained using the Mg—Al—Ca alloy as an example.

Since $\Delta H_{Mg-Al}=-2$ (kJ/mol), Condition 1, "$-4.5$ (kJ/mol)$<\Delta H_{Mg-A}<0$ (kJ/mol)" is satisfied.

Since $\Delta H_{Mg-Ca}=-6$ (kJ/mol), Condition 2, "$-7.5$ (kJ/mol)$<\Delta H_{Mg—B}<-5.5$ (kJ/mol)" is satisfied.

From these facts, the following can be said.

Al and Ca do not repel Mg but bond weakly with Mg, so tend to form compounds with Mg, but this tendency is stronger for the Ca element than for the Al element. Therefore, formation of Mg—Ca compounds (e.g., C14-type $Mg_2Ca$ compounds) and formation of Mg— Ca—Al compounds (e.g. C36-type (($Mg$, $Al)_2Ca$ compounds) is more likely to occur than formation of Mg—Al compounds (e.g., β-phase ($Mg_{17}Al_{12}$ compound)). As a result, Mg—Ca compounds that increase mechanical strength (e.g., C14-type Mg, Ca compounds) and Mg—Ca—Al compounds (e.g., C36-type ($Mg$, $Al)_2Ca$ compounds) while ing Mg—Al compounds that suppress the thermal conductivity (for example, the formation of β-phase ($Mg_{17}Al_{12}$ compounds), etc.) can be restrained. Therefore, Conditions 1 and 2 make it possible to improve thermal conductivity while increasing mechanical strength.

In addition, since $\Delta H_{Al-Ca}=-20$ (10 mol), Condition 3, "$\Delta H_{A-B}-11$ (kJ/mol)", is satisfied. Therefore, Al and Ca solutes in α-Mg crystal grains combine to form Al—Ca compounds (e.g., C15-type $Al_2Ca$ compound) easily. As a result, Al—Ca compounds (e.g., C15-type $Al_2Ca$ compounds) are formed in the α-Mg grains, thereby increasing the purity within the α-Mg crystal grains and improving the thermal conductivity.

In addition, since $\Delta H_{Al-Ca}/\Delta H_{Mg-Ca}=3.67$, Condition 3 "$H_{A-B}/\Delta H_{Mg—B}\geq2.0$" is satisfied. Therefore, Al—Ca compounds (C15-type $Al_2Ca$ compounds) are more easily to be formed than the Mg—Ca compounds (C14-type $Mg_2Ca$ compounds) and Mg—Ca—Al compounds (C36-type ($Mg$, $Al$), Ca compounds) and the purity within the α-Mg crystal grains also increases and the thermal conductivity improves.

In addition, the above magnesium alloys should contain Mg—Ca compounds (C14-type $Mg_2Ca$ compound) or Mg—Al—Ca compound (C36 type ($Mg$, $Al)_2Ca$ compound) and eutectic structure with α-Mg phase, and α-Mg grains including Al—Ca compounds (C15-type $Al_2C$ a compound) within.

When adding Mn or RE elements, etc. to the above Mg—Al—Ca alloy to improve corrosion resistance and mechanical properties, since $\Delta H_{Al-Ca}<\Delta H_{Al-Mn}$, $\Delta H_{Al-Ca}<\Delta H_{Ca-Mn}$, $\Delta H_{Al-Ca}<\Delta H_{Mn-RE}$, Condition 4, "$\Delta H_{A-B}\leq\Delta H_{A-B}$ and $\Delta H_{B-C}$", and Condition 5, "$\Delta H_{A-B}<\Delta H_{C-D}$", are satisfied. For this reason, the bonding strengths between Al and Mn, between Ca and Mn, or between Mn and RE elements, etc., are weaker than the bonding strength of Al and Ca, and formation Al—Ca compounds (C15-type $Al_2Ca$ compounds) is enhanced rather than the formations of Mn—Al compounds, Mn—Ca compounds, Mn-RE compounds; etc. Therefore, without losing the effect of adding Mn and RE elements, the thermal conductivity is improved by increasing the purity in the α-Mg crystal grains without losing the effect of adding Mn and RE elements.

The concept of mixing enthalpy according to the above embodiment is applicable to the magnesium alloy of the second embodiment.

Embodiment 2

<Composition of Magnesium Alloys>

FIG. 1 shows the range of Al and Ca contents of magnesium alloys according to the second embodiment of the invention. The composition range surrounded by the straight lines shown in FIG. 1 is 75 W/m-K or higher for cast material, cast and heat-treated material, cast and plastic-worked material (e.g. extruded material and extruded material after heat treatment), rapidly solidified material, and 3D laminated material. The details of each of the cast material, cast and heat-treated material, cast and plastic-worked material, rapidly solidified material, and 3D laminated material are described in the third embodiment.

In this document, "cast material" refers to material cast at a solidification rate of less than 1,000 K/s, and includes casting methods such as mold casting, sand casting, semi-continuous casting, die casting, and heat treatment. It includes castings made by die casting, sand casting, semi-continuous casting and other casting methods, die casting, injection molding, and twin roll casting.

In this document, "cast and plastic-formed materials" includes materials processed by extrusion, rolling, forging, drawing, wire drawing, and solidification of chips, which follow the cast process at a solidification rate of less than 1,000 K/s.

In this document, "rapidly-solidified material" refers to materials of compacted and molded powder, ribbon and wire processed at a solidification rate of 1,000~1,000,000 K/s. alloys made by extrusion, rolling, forging, wire drawing, and solidification molding of chipping materials. The solidification and forming is done by extrusion, rolling, forging, hot pressing, etc.

In this specification, "3D laminated molding material" is a material made by 3D laminated molding of magnesium alloy powder, ribbon, wire, bar-shaped cast and plastic-deformed material or quenched material using an electron beam or laser beam. The material is made of magnesium alloy powder, ribbon, wire, bar, cast and plastic-deformed material or quenched material.

The magnesium alloys according to this embodiment have the following composition range: comprising Al in "a" atomic %, Ca in "b" atomic %, Mn in "c" atomic %, D element in "d" atomic %, and a residue of Mg and unavoidable impurities. This magnesium alloy does not contain Si and Sr.

The reason for not containing Si is that the alloying elements and Si form compounds, which affect the precision of the alloy composition and mechanical properties.

The content of Mn, "c" atomic %, should satisfy the following Equation 1, and preferably the following Equation 1'.

$$0 \leq c \leq 0.1 \qquad \text{(Equation 1)}$$

$$0.01 \leq c \leq 0.05 \qquad \text{(Equation 1')}$$

The reason for containing Mn is for improving the corrosion resistance of magnesium alloys. The addition of Mn content is less than 0.01 atomic % is not effective for corrosion resistance in Mg Al—Ca alloys. When the Mn content exceeds 0.1 atomic %, the ductility of the Mg—Al—Ca alloy is impaired.

The D element is one or more of RE (rare earth elements), Sn, Li, Zn, Ag, Be, and Cu. Zn, Ag, Be, and Sc. The content of the D element, "d" atomic %, should satisfy the following Equation 2. The rare earth elements should be Sc, Y, La, Ce, Pr, Nd, Pm Pr, Nd, Pm, Sm, Sm Eu, Gd, Tb, Dy, Ho, Er, Tm, Yb, and Lu.

$$0 \leq d \leq 1 \qquad \text{(Equation 2)}$$

The reason for the inclusion of D elements is to improve the ignition temperature and mechanical properties. element content exceeding 1 atomic % results in loss of good thermal conductivity.

As shown in FIG. 1, Al content of "a" atomic % and Ca content of "b" atomic % should be in the range bounded by the straight lines represented by (1)~(8) below. The coordinates "a", the Al content (atomic %), on the vertical axis, and b, the Ca content (atomic %), on the horizontal axis are determined by the coordinates (b, a)

(1) If "b" is in the range of Equation 1a below, the straight line of Equation 1b.

$$0 \leq b \leq 3.5 \qquad \text{(Equation 1a)}$$

$$a = 1.5 \qquad \text{(Equation 1b)}$$

(2) If Y "b" is in the range of Equation 2a below, the straight line of t Equation 2b.

$$3.5 \leq b \leq 7 \qquad \text{(Equation 2a)}$$

$$a = 9b/7 - 3 \qquad \text{(Equation 2b)}$$

(3) If "b" is in the range of Equation 3a below, the straight line of Equation 3b below.

$$7 \leq b \leq 8 \qquad \text{(Equation 3a)}$$

$$a = 4b - 22 \qquad \text{(Equation 3b)}$$

(4) If "a" is in the range of Equation 4a below, the straight line of Equation 4b below.

$$10 \leq a \leq 12 \qquad \text{(Equation 4a)}$$

$$b = 8 \qquad \text{(Equation 4b)}$$

(5) If "b" is in the range of Equation 5a below, the straight line of Equation 5b below.

$$4 \leq b \leq 8 \qquad \text{(Equation 5a)}$$

$$a = 12 \qquad \text{(Equation 5b)}$$

(6) If "a" is in the range of Equation 6a below, the straight line in Equation 6b below.

$$10 \leq a \leq 12 \qquad \text{(Equation 6a)}$$

$$b = 4 \qquad \text{(Equation 6b)}$$

(7) If "b" is in the range of Equation 7a below, the straight line of Equation 7b below.

$$0 \leq b \leq 4 \qquad \text{(Equation 7a)}$$

$$a = 2b + 2 \qquad \text{(Equation 7b)}$$

(8) If "a" is in the range of Equation 8a below, the straight line of Equation 8b below.

$$1.5 \leq a \leq 2 \qquad \text{(Equation 8a)}$$

$$b = 0 \qquad \text{(Equation 8b)}$$

Cast, cast and heat-treated, and, cast and plastic-formed materials (e.g., extruded and heat-treated extruded materials) in the composition range shown in FIG. 1 each have the advantages of higher strength due to grain refinement, dispersion of network-like compounds, and improved ductility.

The composition range of the magnesium alloys in this embodiment may be changed as follows. Only the points different from the composition range of the above magnesium alloys will be explained.

The D elements are at least one of RE (rare earth elements) other than Yb, Sr, Sr Sn, Li, Zn, Ag, Be, and Sc. and at least one of Yb and Be, with the content of Yb is "e" atomic % and the content of Be is "f" atomic %. The e satisfies Equation 18 below and the f satisfies Equation 19 below.

$$0.01 \leq e \leq 1 \text{ (preferably } 0.1 \leq e \leq 0.2) \qquad \text{(Equation 18)}$$

$$5 \text{ ppm} \leq f \leq 100 \ 5 \text{ ppm} \leq f \leq 100 \text{ ppm (Preferably, 20 ppm} \leq f \leq 50 \text{ ppm)} \qquad \text{(Equation 19)}$$

Containing at least one of Yb and Be has the following effects.

(1) The ignition temperature of magnesium alloy can be improved.

(2) The strength and ductility of the magnesium alloy can be improved.

The high-temperature strength of the magnesium alloy can be improved by including Yb.

The composition range of the magnesium alloy may be modified as follows. Only the points that differ from the composition range of the magnesium alloys described above will be explained.

The D elements are at least one of RE (rare earth elements), Sr, Sn, and Li, Zn, Ag, Be and Sc. Cast and plastic-deformed materials, and rapidly solid-formed materials made with this alloy composition exhibit the following anisotropy in thermal conductivity. Therefore, cast and plastic working materials and rapidly solidified molding materials having high thermal conductivity can be fabricated by utilizing this anisotropy.

The magnesium alloys of the cast and plastic-deformed material and the rapidly solidified and formed material have a first thermal conductivity of 75 W/m·K or higher in the first direction and a second thermal conductivity of 75 W/m·K or higher in the second direction. K or higher, and the second thermal conductivity in the second direction is less than or equal to the first thermal conductivity, and when the first thermal conductivity is $\lambda_1$ and the second thermal conductivity is $\lambda_2$, then $\lambda_1$ and $\lambda_2$ satisfy Equation 20 below.

$$1 \leq \lambda_1/\lambda_2 \leq 1.3 \qquad \text{(Equation 20)}$$

The advantage of the above cast and plastic-deformed materials and other materials is that the anisotropy of thermal conductivity can be controlled by controlling the texture. In addition, the 0.2% proof stress of cast and plastic-formed materials, etc., can be 200 MPa or higher (preferably 250 MPa or higher), and higher ductility and corrosion resistance can also be expected.

The composition range of the magnesium alloy according to this embodiment may be changed as follows. Only the points that differ from the composition range of the magnesium alloys described above will be explained.

The range of Al and Ca content is surrounded by the straight line shown in FIG. 17, and the details are as follows. The range shown in FIG. 17 is the range in which the thermal conductivity is 100 W/m-K or higher.

The coordinates "a", the Al content (atomic %), is taken on the vertical axis and b, the Ca content (atomic %), is taken on the horizontal axis. The Al content of "a" atomic %) and Ca content of "b" atomic %) are expressed by the following equations (1)~(10) below.

(1) If "b" is in the range of Equation 1a below, the straight line of Equation 1b below.

$$1 \leq b \leq 2 \qquad \text{(Equation 1a)}$$

$$a=2 \qquad \text{(Equation 1b)}$$

(2) If "b" is in the range of Equation 2a below, the straight line of Equation 2b below.

$$2 \leq b \leq 3 \qquad \text{(Equation 2a)}$$

$$a=2b-2 \qquad \text{(Equation 2b)}$$

(3) If "a" is in the range of Equation 3a below, the straight line of Equation 3b below.

$$4 \leq a \leq 5 \qquad \text{(Equation 3a)}$$

$$b=3 \qquad \text{(Equation 3b)}$$

(4) If "b" is in the range of Equation 4a below, the straight line of Equation 4b below.

$$3 \leq b \leq 3.5 \qquad \text{(Equation 4a)}$$

$$a=5 \qquad \text{(Equation 4b)}$$

(5) If "b" is in the range of Equation 5a below, the straight line of Equation 5b below.

$$3.5 \leq b \leq 5 \qquad \text{(Equation 5a)}$$

$$a=2b/3+8/3 \qquad \text{(Equation 5b)}$$

(6) If "a" is in the range of Equation 6a below, the straight line of Equation 6b below.

$$6 \leq a \leq 10 \qquad \text{(Equation 6a)}$$

$$b=5 \qquad \text{(Equation 6b)}$$

(7) If "b" is in the range of Equation 7a below, the straight line of Equation 7b below.

$$4.5 \leq b \leq 5 \qquad \text{(Equation 7a)}$$

$$a=10 \qquad \text{(Equation 7b)}$$

(8) If "b" is in the range of Equation 8a below, the straight line of Equation 8 b below.

$$4 \leq b \leq 5 \qquad \text{(Equation 8a)}$$

$$a=4b-8 \qquad \text{(Equation 8b)}$$

(9) If "b" is in the range of Equation 9a below, the straight line of Equation 9b below.

$$3 \leq b \leq 4 \qquad \text{(Equation 9a)}$$

$$a=3b/2+2 \qquad \text{(Equation 9b)}$$

(10) If "b" is in the range of Equation 102 below, the straight line of Equation 10b below.

$$1 \leq b \leq 3 \qquad \text{(Equation 10a)}$$

$$a=9b/4-1/4 \qquad \text{(Equation 10b)}$$

The example of modification of the composition range of magnesium alloy shown in 17 may be further modified as follows: The range of Al and Ca content is shown in FIG. 23, the range surrounded by the straight lines shown in FIG. 23, and the details are as follows.

The coordinates "a", the Al content (atomic %), is taken on the vertical axis, and b, the Ca content (atomic %), is taken on the horizontal axis. The Al content of "a" (atomic %) and Ca content of "b" (atomic %) are expressed by the following (1)~(11) below.

(1) If "b" is in the range of Equation 1a below, the straight line of Equation 1b below.

$$1.5 \leq b \leq 2 \qquad \text{(Equation 1a)}$$

$$a=2 \qquad \text{(Equation 1b)}$$

(2) If "b" is in the range of Equation 2a below, the straight line of Equation 2b below.

$$2 \leq b \leq 3 \qquad \text{(Equation 2a)}$$

$$a=2b-2 \qquad \text{(Equation 2b)}$$

(3) If "a" is in the range of Equation 3a below, the straight line of Equation 3b below.

$$4 \leq a \leq 5 \qquad \text{(Equation 3a)}$$

$$b=3 \qquad \text{(Equation 3b)}$$

(4) If "b" is in the range of Equation 4a below, the straight line of Equation 4b below.

$$3 \leq b \leq 3.5 \qquad \text{(Equation 4a)}$$

$$a=5 \qquad \text{(Equation 4b)}$$

(5) If "b" is in the range of Equation 5a below, the straight line of Equation 5b below.

$$3.5 \leq b \leq 5 \tag{Equation 5a}$$

$$a = 2b/3 + 8/3 \tag{Equation 5b}$$

(6) If "a" is in the range of Equation 6a below, the straight line of Equation 6b below.

$$6 \leq a \leq 10 \tag{Equation 6a}$$

$$b = 5 \tag{Equation 6b}$$

(7) If "b" is in the range of Equation 7a below, the straight line of Equation 7b below.

$$4.5 \leq b \leq 5 \tag{Equation 7a}$$

$$a = 10 \tag{Equation 7b}$$

(8) If "b" is in the range of Equation 8a below, the straight line of Equation 8b below.

$$4 \leq b \leq 5 \tag{Equation 8a}$$

$$a = 4b - 8 \tag{Equation 8b}$$

(9) If "b" is in the range of Equation 9a below, the straight line of Equation 9b below.

$$3 \leq b \leq 4 \tag{Equation 9a}$$

$$a = 3b/2 + 2 \tag{Equation 9b}$$

(10) If "b" is in the range of Equation 10a below, the straight line of Equation 10b below.

$$1.5 \leq b \leq 3 \tag{Equation 10a}$$

$$a = 9b/4 - 1/4 \tag{Equation 10b}$$

(11) If "a" is in the range of Equation 11a below, the straight line of Equation 11b below.

$$2 \leq a \leq 3.125 \tag{Equation 11a}$$

$$b = 1.5 \tag{Equation 11b}$$

Cast and plastic-deformed materials and rapid-cooled solidified and formed materials made by the composition of the magnesium alloy above express the following anisotropy in thermal conductivity. Therefore, cast and plastic-deformed materials and rapidly solidified materials with high thermal conductivity can be fabricated by using this anisotropy.

The magnesium alloys of the cast and plastic-deformed material and the rapidly solidified and formed material have a first thermal conductivity in the first direction of 100 W/m·K or higher, and the second thermal conductivity in the second direction is less than or equal to the first thermal conductivity, wherein the first thermal conductivity is $\lambda_1$ and the If the second thermal conductivity is $\lambda_2$, then $\lambda_1$ and $\lambda_2$ satisfy the following equation 20.

$$1 \leq \lambda_1/\lambda_2 \leq 1.3 \tag{Equation 20}$$

The advantage of the above cast and plastic-deformed materials and others is that the anisotropy of thermal conductivity can be controlled by controlling the texture. For example, in the case of extruded materials, the thermal conductivity in the extrusion direction is higher. In addition, the 0.2% proof stress of cast and plastic-formed materials, etc., can be 200 MPa or higher (preferably 250 MPa or higher), and higher ductility and corrosion resistance can also be expected.

FIG. 20 shows the anisotropy of thermal conductivity in the ED and TD directions for extruded material after heat treatment and chip-formed material after heat treatment of $Mg_{99.98-3x}Al_{2x}Ca_x Mn_{0.02}$ alloy. The heat-treated and extruded materials (HT-EX) of $Mg_{99.98-3x}Al_{2x}Ca_xMn_{0.02}$ alloy are prepared after heat-treatment at 623 K for 8 hours, followed by extrusion at 523K extrusion temperature with an extrusion ratio of 10 and an extrusion speed of 2.5 mm/s. Heat-treated chip-formed material (HT-chip) consolidated materials of $Mg_{99.98-3x}Al_{2x}Ca_xMn_{0.02}$ alloy are prepared with casting and heat-treatment at 673 K for 2.5 hours, cutting to form chip material, and this chip material is then pressed chip-formed solid material. The anisotropy of thermal conductivity of the heat-treated extruded material and heat-treated chip-formed material was measured in the same way as in Example 1 described below.

The ED direction is the extrusion direction, and the TD direction is the transverse direction (direction perpendicular to the extrusion direction).

According to FIG. 20, anisotropy was confirmed in the thermal conductivity of the heat-treated extruded material and heat-treated chip-formed material, respectively, and it is thought that heat-treated extruded material and heat-treated chip-formed material with high thermal conductivity can be produced by using this anisotropy.

The composition range of the magnesium alloys according to this embodiment may be modified as follows. Only the points different from the composition range of the magnesium alloy described above will be described.

A magnesium alloy comprising "a" atomic % of Al, "b" atomic % of Ca, "c" atomic % of Mn, "d" atomic % of D element atomic %, and a residue Mg and unavoidable impurities.

The D elements are at least one of RE (rare earth elements), Sr, Sn Li, Zn, Ag, Be and Sc.

The range of Al and Ca content is surrounded by the straight line shown in FIG. 2, and the details are as follows.

The coordinates "a", the Al content (atomic %), is taken on the vertical axis and b, the Ca content (atomic %), is taken on the horizontal axis. The Al content in a and Ca content in b are expressed by the following (1)~(9) below.

(1) If "b" is in the range of Equation 1a below, the straight line of Equation 1b below.

$$2.5 \leq b \leq 3.5 \tag{Equation 1a}$$

$$a = 1.5 \tag{Equation 1b}$$

(2) If "b" is in the range of Equation 2a below, the straight line of Equation 2b below.

$$3.5 \leq b \leq 7 \tag{Equation 2a}$$

$$a = 9b/7 - 3 \tag{Equation 2b}$$

(3) If "b" is in the range of Equation 3a below, the straight line of Equation 3b below.

$$7 \leq b \leq 8 \tag{Equation 3a}$$

$$a = 4b - 22 \tag{Equation 3b}$$

(4) If "a" is in the range of Equation 4a below, the straight line of Equation 4b below.

$$10 \leq a \leq 12 \tag{Equation 4a}$$

$$b = 8 \tag{Equation 4b}$$

(5) If "b" is in the range of Equation 5a below, the straight line of Equation 5b below.

$$4 \leq b \leq 8 \tag{Equation 5a}$$

$$a = 12 \tag{Equation 5b}$$

(6) If "a" is in the range of Equation 6a below, the straight line of Equation 6b below.

$$10 \leq a \leq 12 \tag{Equation 6a}$$

$$b=4 \tag{Equation 6b}$$

(7) If "b" is in the range of Equation 7a below, the straight line of Equation 7b below.

$$1.25 \leq b \leq 4 \tag{Equation 7a}$$

$$a=2b+2 \tag{Equation 7b}$$

(8) If "a" is in the range of Equation 7a below, the straight line of Equation 8b below.

$$1.25 \leq a \leq 2.5 \tag{Equation 8a}$$

$$a=4.5 \tag{Equation 8b}$$

(9) If "a" is in the range of Equation 9a below, the straight line of Equation 9b below.

$$1.5 \leq a \leq 4.5 \tag{Equation 9a}$$

$$b=2.5 \tag{Equation 9b}$$

The composition range of the magnesium alloy in this embodiment may be changed as follows. Only the points different from the composition range of the magnesium alloy above are explained.

Comprising "a" atomic % of Al, "b" atomic % of Ca, "c" atomic % of Mn, "d" atomic % of D elements, and a residue of Mg and unavoidable impurities.

The range of Al and Ca content is surrounded by the straight line shown in FIG. 17.

The thermal conductivity of the above magnesium alloy is 100 W/m-K or higher.

The composition range of the above magnesium alloys can be combined with each modification.

In this embodiment, the composition range of the magnesium alloy is within the above-mentioned range, but impurities may be included to the extent that they do not affect the alloy properties. For example, unavoidable impurities may be included in the magnesium alloy within the composition range described above.

<Phases in Magnesium Alloys>

Magnesium alloy of the present embodiment consists of an α-Mg phase and a C36-type intermetallic compound phase ((Mg,Al)$_2$Ca phase), or consists of α-Mg phase, C36 type intermetallic phase and a C15 type intermetallic compound phase (Al$_2$Ca phase), and contains the C36-type intermetallic compound phase more than 5 volume % and less than 40 volume %. These constituent phases are formed in cast materials, cast and heat-treated materials, cast and plastic-formed materials (e.g., extruded materials, extruded materials after heat treatment, cast chip solid-formed materials), and rapidly solid-formed materials. The α-Mg phase also includes single-crystalline α-Mg and polycrystalline α-Mg.

In addition, the magnesium alloy according to this embodiment is composed of multiple α-Mg grains and eutectic lamellar phase comprising α-Mg phase and C 36-type intermetallic compound phase. Said multiple α-Mg grains are preferably connected to each other by said eutectic lamellae. This allows the α-Mg grains to be networked with each other through the α-Mg phase of the eutectic lamella. α-Mg has a higher thermal conductivity than the intermetallic compounds and improves the thermal conductivity of the alloys. These constituent phases are produced in cast materials and cast and heat-treated materials. The α-Mg grains are considered to be single-crystal α-Mg and are considered to be primary crystals of α-Mg grains.

In the α-Mg matrix phase within the α-Mg grains, there are 0.5 to 2.5 atoms of Al. Al content is between 0.5 and 2.5 atomic % (preferably between 0.7 and 2.0 atomic %), and Ca should be contained at more than 0.0 atomic % and less than 1.0 atomic %. The width at half maximum of the X-ray diffraction peak of the α-Mg phase should be less than 1.5 times the width at half maximum of the X-ray diffraction peak of pure Mg. It is recommended that the width at half maximum of the X-ray diffraction peak of the α-Mg phase is less than 1.5 times the width at half maximum of the X-ray diffraction peak of pure Mg. The width at half maximum of the X-ray diffraction peak of the α-Mg phase should be less than 1.5 times the width at half maximum of the X-ray diffraction peak of pure Mg. The width at half maximum of the X-ray diffraction peak of the α-Mg phase should be reduced by 10% or more compared to the width at half maximum of the X-ray diffraction peak of the α-Mg phase of the cast material immediately after production by the casting method with the alloy compositions shown in FIGS. 1, 2 and 17. It is recommended that the peak width of the α-Mg phase be reduced by more than 10%. This is considered to improve the thermal conductivity of the α-Mg phase.

It is also recommended that a linear or plate-like compound is precipitated in the α-Mg grains described above. This linear or plate-like compound should be a C15-type intermetallic compound phase. the C15-type intermetallic compound phase is Al$_2$Ca phase, so that the C15-type intermetallic compound phase can precipitate in the α-Mg grains by precipitating in the α-Mg grains, and the α-Mg grains in the α-Mg matrix phase. Al and Ca content in the α-Mg grains can be reduced. As a result, the Mg concentration in the α-Mg grains can be increased, which may help improve thermal conductivity.

The half-widths of the X-ray diffraction peaks of the C36-type intermetallic compound described above are the same as those in FIGS. 1, 2, and 1 The width at half maximum of the X-ray diffraction peak of the C36-type intermetallic compound should be reduced by more than 1 It should be reduced by more than 1.0%. This is due to a decrease in the concentration of solute elements in the α-Mg phase, and as a result, the thermal conductivity is considered to have improved FIG. 1 or FIG. 2, the composition range is further defined by adding the following limitations to the composition range shown in FIG. 1 or FIG. 2. In detail, a and b can be expressed by the following Equations 5 and 6, Equations 7 and 8, Equations 9 and 10, and Equations 11 and 12 below.

$$2.0 \leq a \leq 12.5 \tag{Equation 5}$$

$$1.0 \leq b < 3 \tag{Equation 6}$$

$$2.0 \leq a \leq 12.5 \tag{Equation 7}$$

$$7 < b \leq 7.5 \tag{Equation 8}$$

$$2.0 \leq a < 4.5 \tag{Equation 9}$$

$$1.0 \leq b \leq 7.5 \tag{Equation 10}$$

$$12.0 \leq a \leq 12.5 \tag{Equation 11}$$

$$1.0 \leq b \leq 7.5 \tag{Equation 12}$$

Also, a and b satisfy Equations 13 and 14 below and within the composition range satisfying Equations 15 or 16 below.

$$2.0 \leq a \leq 12.5 \qquad \text{(Equation 13)}$$

$$3.0 \leq b \leq 7.0 \qquad \text{(Equation 14)}$$

$$a/b < 1.2 \qquad \text{(Equation 15)}$$

$$3.0 < a/b \qquad \text{(Equation 16)}$$

According to the present embodiment, the thermal conductivity of the material is 75 W/m·K or higher and high specific strength can be obtained. This high specific strength means that the alloy has a specific strength higher than that of commercial magnesium alloys and high thermal conductivity aluminum alloy ACD12.

In addition to the Mg—Al—Ca alloys described above, carbon, ceramics and particles or fibers of metals or intermetallic compounds and the Mg—Al—Ca alloy of this form. It is also applicable to composite materials. In detail, it is also applicable to composite materials in which at least one of particles and fibers is composited with the magnesium alloy of this form, wherein said particles are at least one of carbon particles, ceramic particles, metal particles and intermetallic compound particles, and said fibers are carbon fibers, ceramic fibers and metal The fiber is at least one of carbon fiber, ceramic fiber and metal fiber.

Embodiment 3

<Casting Method>

The magnesium alloy in the composition range according to the first or second embodiment is melted at a predetermined temperature in a flame-proof gas atmosphere, cast at a solidification rate of less than 1000 K/sec.

The ingot of the magnesium alloy after the above casting is cut into a predetermined shape. This produces a cast material. When the A element is Al and the B element is Ca, this cast material is composed of the α-Mg phase and the C15-type compound phase (Al₂Ca phase) and C14-type intermetallic phase (Mg₂Ca), or composed of α-Mg phase, C15-type intermetallic phase, C14-type intermetallic phase and C36-type intermetallic phase ((Mg, Al)₂Ca phase), or composed of α-Mg phase and C36-type intermetallic phase, or composed of α-Mg phase and C36-type intermetallic phase/and C15-type intermetallic phase. The cast materials contain C36-type intermetallic compound phase between 5% and 40% by volume. In the cast materials also Al and Ca in the α-Mg crystal grains become C15-type Al₂Ca compounds, and the purity of α-Mg within the α-Mg grains is increased.

Next, the above cast material is subjected to a temperature of between 200° C. and 510° C. (preferably between 300° C. and 450° C.). The cast material is then subjected to the above process at a temperature between 200° C. and 510° C. (preferably between 300° C. and 450° C.) for 0 hours to 200 hours (preferably 100 hours or less, preferably 0.5 hours to 24 hours or less) at a temperature between 200° C. and 510° C. (preferably between 300° C. and 450° C.). A elements and B elements present in the α-Mg crystal grains are formed into a compound comprising A and B elements (e.g. C15 type Al₂Ca compound), and the α-Mg A-B compounds in Mg crystal grains (e.g., C15-type Al₂Ca compounds) to form cast and heat-treated materials with increased content of A-B compounds. This increases the purity in the α-Mg crystal grains more and improves the thermal conductivity. The thermal conductivity of this casting heat treatment material should be 100 W/K-m or higher. The cast and heat-treated material is composed of α-Mg phase, C15-type intermetallic compound phase and C14-type intermetallic compound phase and should also have the same compounds as the cast material described above.

Next, the cast and heat-treated material described above is subjected to plastic working. This plastic forming includes extrusion, rolling, forging, drawing, and giant strain forming. Gigantic straining includes ECAE (equal-channel-angular-ECAE (equal-channel-angular-extrusion) processing. Extrusion processing conditions are, for example, an extrusion temperature of 250° C. to 500° C. and a cross-sectional reduction rate of 5% or more due to extrusion. or more. Even after plastic working, the α-Mg phase, C15-type intermetallic compound phase, and C14-type intermetallic compound phase, and should also have the same compounds as the cast material described above.

In this embodiment, plastic working is performed on the cast and heat-treated material, but plastic working may be performed on the above-mentioned cast material, or the above-mentioned heat treatment may be performed after such plastic working. Even after this heat treatment, the material should have the same compounds as the above-mentioned cast materials.

The cast material, cast and heat-treated material, and plastic-formed material may have a C15-type intermetallic compound phase, or a C14-type intermetallic compound phase (Mg₂Ca phase) by 5 volume %.

In addition, each of the above cast and cast and heat-treated materials should have a Mg—B compound, or a Mg-A-B compound and the α-Mg phase, and the A-B compound and α-Mg grains encapsulating the A-Mg phase. For example, the eutectic lamellar structure of multiple α-Mg grains, α-Mg phase and C36-type intermetallic compound phase, and the interconnections between multiple α-Mg grains are eutectic. Mg grains are connected to each other by the eutectic lamellar structure, and the α-Mg grains are networked with each other through the α-Mg phase of the eutectic lamellar structure. Mg phase of the eutectic lamellar structure.

In the α-Mg matrix phase within the above α-Mg grains, Al 0.5 atomic % to 2.5 atomic % (preferably 0.7 atomic % to 2.0 atomic (%) and Al atomic % or less) and Ca is preferably contained at more than 0 atomic % and less than 1.0 atomic %.

Linear or plate-like compounds are precipitated in the above α-Mg grains, and the linear or plate-like compounds are C15-type intermetallic compound phases. The linear or plate-like compounds should be Cl 5-type intermetallic compound phases.

FIGS. 19(a) and 19(b) show the Mg₈₇.₉₈Al₈Ca₄Mn₀.₀₂ alloy castings at 623 K for 8 hours heat treatment, followed by extrusion at 523K extrusion temperature with an extrusion ratio of 10 and an extrusion speed of 2.5 mm/s. This photograph shows the microstructure of the extrudate that was extruded at an extrusion ratio of 10 and extrusion speed of 2.5 mm/s at 523K. As shown in this FIG. 19, it can be seen that linear or plate-like C15-type intermetallic compound phases remain even after extrusion.

The width at half maximum of the X-ray diffraction peak of the α-Mg phase in each of the above cast and cast and heat-treated materials is the same as that of the pure Mg It is recommended that the half width of the X-ray diffraction peak of the α-Mg phase of each of the above cast and cast and heat-treated materials be less than 1.5 times the width of the X-ray diffraction peak of pure Mg.

The width at half maximum of the X-ray diffraction peak of the α-Mg phase of the above cast and heat-treated materials should be less than 1.5 times the width at half maximum of the X-ray diffraction peak of the α-Mg phase of the cast and heat-treated material described above should be reduced by 10% or more compared to the width at half maximum of the X-ray diffraction peak of the α-Mg phase of the cast material immediately after casting.

In addition, the width at half maximum of the X-ray diffraction peak of the C36-type intermetallic compound in the above cast and heat-treated material should be at least 10% less than the width at half maximum of the X-ray diffraction peak of the C36-type intermetallic compound in the above cast and heat-treated material should be reduced by 10% or more compared to the width at half maximum of the X-ray diffraction peak of the C3

In addition, each of the above cast material, cast and heat-treated material, and plastic working material has a thermal conductivity of 75 W/m-K or higher and a high specific strength.

<Casting Chip Solid-Formation>

A cast material is prepared in the same manner as the casting method described above. Next, the cast material is machined to form chips of 1~2 mm in size, for example. Next, the chip material is pressurized and molded at room temperature to form a solid-forced material.

The solid-formed material may be plastic-deformed, and the above heat treatment may be performed after this plasticization.

The same heat treatment as the casting method described above may be performed on the cast material before or after forming the chip material. The same heat treatment as the casting method described above may be performed on the chip material or solid-formed material before or after solid-forming. The thermal conductivity of the solid-formed material after this heat treatment should be 100 W/K-m or higher.

Each of the above chip material, heat-treated chip heat-treated material, heat-treated chip material and solidified material should have a C15-type intermetallic compound phase, or a C14-type intermetallic compound phase by 5% by volume.

In addition, each of the above chip material, heat-treated chip heat-treated material, heat-treated chip material, and solidified compacted material should have a Mg—B compound, or a Eutectic structure of Mg-A-B compound and α-Mg phase, and the heat-treated and solidified compacts should have an Mg-A-B compound, or an eutectic structure of the Mg-A-B compound and the α-Mg phase, and α-Mg grains encapsulating the A-B compound. Mg grains and a eutectic lamellar structure of the α-Mg phase and C36-type intermetallic compound phase. The α-Mg grains are connected to each other by the eutectic lamellar structure, and the α-Mg grains are networked through the α-Mg phase of the eutectic lamellar structure. Mg grains are networked through the α-Mg phase of the eutectic lamellar structure.

In the α-Mg matrix phase within the above α-Mg grains, Al 0.5 atomic % to 2.5 atomic % (preferably 0.7 atomic % to 2.0 atomic % or less) and Ca is preferably contained at more than 0 atomic % and less than 1.0 atomic %.

Linear or plate-like compounds are precipitated in the above α-Mg grains; and the linear or plate-like compounds are C15-type intermetallic compound phases. It is recommended that the linear or plate-like compounds are C15-type intermetallic compound phases.

The width at half maximum of the X-ray diffraction peak of the α-Mg phase for each of the above chip material, heat-treated chip heat-treated material, and heat-treated chip material is The width at half maximum of the X-ray diffraction peak of pure Mg should be less than 1.5 times the width at half maximum of the X-ray diffraction peak of pure Mg.

The width at half maximum of the X-ray diffraction peak of the α-Mg phase of the chip heat-treated materials subjected to the above heat treatment should be less than 1.5 times the width at half maximum of the α-Mg phase of the chip material immediately after chipping. Mg phase of the chip heat-treated material after the above heat treatment should be reduced by 10% or more compared to the width at half maximum of the X-ray diffraction peak of the α-Mg phase of the chip material immediately after the chip fabrication.

In addition, the width at half maximum of the X-ray diffraction peak of the C36-type intermetallic compound in the chip heat-treated material subjected to the above heat treatment should be less than the width at half maximum of the C 36-type intermetallic compound in the chip heat-treated material should be reduced by 10% or more compared to the width at half maximum of the X-ray diffraction peak of the C36-type intermetallic compound in the chip material just after the chip conversion.

In addition, each of the above chip material, heat-treated chip heat-treated material, heat-treated chip material, and solid-formed material has a thermal conductivity of 75 W/m-K or higher and a high specific strength. The above chip material, heat-treated chip material, heat-treated chip material, heat-treated chip material and solidified material each have a thermal conductivity of 75 W/m K or higher and high specific strength.<

The magnesium alloy in the composition range according to the first or second embodiment is heated and melted at a predetermined temperature in a flame-proof gas atmosphere, and the molten magnesium alloy is injected into a metal mold, which is then cooled and solidified. The molten magnesium alloy is then injected into the mold, cooled, and solidified to produce the injection-molded material. The cooling rate should be less than 1000 K/sec.

When the A element is Al and the B element is Ca, the above injection-molded material will have a α-Mg phase and a C15-type intermetallic phase. Mg phase and C15-type intermetallic compound phase ($Al_2Ca$ phase) and C14-type intermetallic compound phase ($Mg_2Ca$), or α-Mg phase and C15-type intermetallic phase and C14-type intermetallic phase and C36-type intermetallic phase (($Mg$, $Al)_2Ca$ phase), or α-Mg phase and C36-type intermetallic phase, or α-Mg phase and C36-type intermetallic phase and C15-type intermetallic phase, or α-Mg phase and C36-type intermetallic phase and C15-type intermetallic phase. The C36-type intermetallic compound phase should contain between 5% and 40% by volume. In addition, this injection-molded material should have Al and Ca in the α-Mg crystal grains with a C 15-type $Al_2Ca$ compound, and the α-Mg crystal grains The purity of α-Mg within the α-Mg crystal grains is increased.

Next, the injection-molded material is subjected to heat treatment similar to the casting method described above, whereby the A and B elements present in the α-Mg crystal grains form A and B elements become a compound comprising the A and B elements (e.g., C15-type $Al_2Ca$ compound), and the α A-B compounds within α-Mg grains (e.g., C15-type $Al_2Ca$ compounds) to form injection-molded heat-treated materials with increased content. This increases the purity within the α-Mg crystal grains more and improves the thermal conductivity. The thermal conductivity of this injection molding heat treatment material should be 100 W/K-m or higher.

In addition, each of the above injection molding and injection molding heat treatment materials should have a C15-type intermetallic compound phase and a C14-type intermetallic compound phase. The injection molding material and the injection molding heat treatment material described above may have a C15-type intermetallic compound phase and a C14-type intermetallic compound phase of 5 volume %.

Each of the above injection molding and injection molding heat-treated materials should have a Mg—B compound, or a Mg-A-B compound and an α-Mg—Mg—B compound. A-B compound and the α-Mg phase, and the A B compound and α-Mg grains encapsulating the A-Mg phase. For example, the eutectic lamellar structure of multiple α-Mg grains, α-Mg phase and C36-type intermetallic compound phase, and the interconnections between multiple α-Mg grains are eutectic. Mg grains are connected to each other by the eutectic lamellar structure, and the α-Mg grains are networked with each other through the α-Mg phase of the eutectic lamellar structure. Mg phase of the eutectic lamellar structure.

In the α-Mg matrix phase within the above α-Mg grains, Al 0.5 atomic % to 2.5 atomic % (preferably 0.7 atomic % to 2.0 atomic %) and Al atomic % or less) and Ca is preferably contained at more than 0 atomic % and less than 1.0 atomic %.

Linear or plate-like compounds are precipitated in the above α-Mg grains, and the linear or plate-like compounds are C15-type intermetallic compound phases. The linear or plate-like compounds should be C15-type intermetallic compound phases.

The width at half maximum of the X-ray diffraction peak of the α-Mg phase of the above injection-molded and injection heat-treated materials, respectively, should be less than the width at half maximum of the X-ray diffraction peak of pure Mg. The width at half maximum of the X-ray diffraction peak of the α-Mg phase of each of the above injection molded and injection heat treated materials should be less than 1.5 times the width at half maximum of the X-ray diffraction peak of pure Mg.

In addition, the half width of the X-ray diffraction peak of the α-Mg phase of the above injection molding heat treated materials should be less than 1.5 times the half width of the α-Mg phase of the injection molded material immediately after injection molding. Mg phase of the above injection-molded heat-treated material should be reduced by 10% or more compared to the width at half maximum of the X-ray diffraction peak of the α-Mg phase of the injection-molded material immediately after injection molding.

In addition, the width at half maximum of the X-ray diffraction peak of the C36-type intermetallic compound in the above injection-molded heat-treated material should be less than the width at half maximum of the C36-type intermetallic compound in the above injection-molded heat-treated material should be reduced by 10% or more compared to the width at half maximum of the X-ray diffraction peak of the C3

In addition, each of the above injection-molded and injection-molded heat-treated materials has a thermal conductivity of 75 W/m-K or higher and a high specific strength.<

The magnesium alloy in the composition range according to the first or second embodiment is heated and melted at a predetermined temperature in a flame-proof gas atmosphere, and the molten magnesium alloy is press-fitted into a die to produce the die-cast material.

The molten magnesium alloy is then press-fitted into a mold to produce the die cast material. The cooling rate in this process should be less than 1000 K/sec. The die casting method is a casting method to mass-produce castings of high dimensional accuracy in a short time.

When the A element is Al and the B element is Ca, the above die-cast material is composed of α-Mg phase and C15-type intermetallic compound phase (Al₂Ca phase) and C14-type intermetallic compound phase (Mg₂Ca), or α-Mg phase and C15-type intermetallic phase and C14-type intermetallic phase and C36-type intermetallic phase ((Mg, Al)₂Ca phase), or α-Mg phase and C36-type intermetallic phase, or α-Mg phase and C36-type intermetallic phase and C15-type intermetallic phase, or α-Mg phase and C36-type intermetallic phase and C15-type intermetallic phase. The C36-type intermetallic compound phase should contain between 5% and 40% by volume. The die-cast material should also have Al and Ca in the α-Mg crystal grains with a C15-type Al₂Ca compound, and the purity of α-Mg in the α-Mg crystal grains is increased. The purity of α-Mg within the α-Mg crystal grains is increased.

Next, by subjecting the above die-cast material to heat treatment similar to the casting method described above, the A and B elements present in the α-Mg crystal grains become A and B elements become a compound comprising the A elements and the B elements (e.g., C15-type Al₂Ca compound), and the α A-B compounds within α-Mg grains (e.g., C15-type Al₂Ca compounds) to form die-cast and heat-treated materials with increased content of A-B compounds (e.g., Cl 5-type Al Ca compounds). This increases the purity in the α-Mg crystal grains more and improves the thermal conductivity. The thermal conductivity of this die cast and heat treatment material should be 100 W/K-m or higher.

Each of the above die-cast and die-cast and heat-treated materials should have a C15-type intermetallic compound phase and a C14-type intermetallic compound phase. It is also recommended that the above die cast materials and die cast and heat treatment materials contain 5% by volume of C14 type intermetallic compound phase.

Each of the above die-casting and die-casting heat-treating materials should have a Mg—B compound, or a Mg-A-B compound and an α-Mg—Mg—B compound. A-B compound and the α-Mg phase, and the α-Mg phase encompassing the A B compound and α-Mg grains encapsulating the A-Mg phase. For example, the eutectic lamellar structure of multiple α-Mg grains, α-Mg phase and C36-type intermetallic compound phase, and the interconnections between multiple α-Mg grains are eutectic. Mg grains are connected to each other by the eutectic lamellar structure, and the α-Mg grains are networked with each other through the α-Mg phase of the eutectic lamellar structure. Mg phase of the eutectic lamellar structure.

In the α-Mg matrix phase within the above α-Mg grains, Al 0.5 atomic % to 2.5 atomic % (preferably 0.7 atomic % to 2.0 atomic %) and Al atomic % or less) and Ca is preferably contained at more than 0 atomic % and less than 1.0 atomic %.

Linear or plate-like compounds are precipitated in the above α-Mg grains, and the linear or plate-like compounds are C15-type intermetallic compound phases. It is desirable that the linear or plate-like compounds are C15-type intermetallic compound phases.

The width at half maximum of the X-ray diffraction peak of the α-Mg phase in each of the above die-cast and die-cast and heat-treated materials is the same as that of pure Mg. The width at half maximum of the X-ray diffraction peak of the α-Mg phase of each of the above die-cast and die-cast and heat-treated materials should be less than 1.5 times the width at half maximum of the X-ray diffraction peak of pure Mg.

In addition, the half width of the X-ray diffraction peak of the α-Mg phase of the above die-cast and heat-treated materials should be less than 1.5 times the half width of the α-Mg phase of the die-cast materials immediately after die-casting. Mg phase of the above die-cast heat-treated material should be reduced by 10% or more compared to the width at half maximum of the X-ray diffraction peak of the α-Mg phase of the die-cast material immediately after die casting.

In addition, the half value width of the X-ray diffraction peak of the C36-type intermetallic compound in the above die-cast heat-treated material should be less than the half value width of the C36-type intermetallic compound in the above die-cast heat-treated material should be reduced by 10% or more compared to the width at half maximum of the X-ray diffraction peak of the C3 Each of the above die-cast and die-cast heat-treated materials has a thermal conductivity of 75 W/m-K or higher and a high specific strength.
<Quenching Method> A
magnesium alloy in the composition range according to the first or second embodiment is melted at a predetermined temperature in a flame-proof gas atmosphere, and the molten magnesium alloy is cooled to 1,000~1,000,000° C.

The molten magnesium alloy is then cooled at a solidification rate of 1,000~1,000,000 The molten magnesium alloy is quenched and solidified at a solidification rate of 1,000~1,000,000 K/s to produce a quenched material (powder, ribbon or wire). Quenched materials are, for example, powder made by the RS-P/M method (or RS-P/M powder made by the RS-PIM method) or wire made by the RS-P/M method. PIM method (or flakes, thin strips or thin wires made by the RS-P/M method, or thin wires made by the molten metal extraction method).

The above quenched material may be made of a material in which the A element is Al and the B element is Ca, in which case the α-Mg
phase and C15-type intermetallic compound phase (Al₂Ca phase) and C14-type intermetallic compound phase (Mg₂Ca), or α-Mg phase and C15-type intermetallic phase and C14-type intermetallic phase and C36-type intermetallic phase ((Mg, Al)₂Ca phase), or α-Mg phase and C36-type intermetallic phase, or α-Mg phase and C36-type intermetallic phase and C15-type intermetallic phase, or α-Mg phase and C36-type intermetallic phase and C15-type intermetallic phase. The C36-type intermetallic compound phase should contain between 5% and 40% by volume. The quenched material should also have Al and Ca in the α-Mg crystal grains with a C15-type Al₂Ca compound, and the α-Mg crystal grains The purity of α-Mg within the α-Mg crystal grains is increased.

Next, by performing a heat treatment similar to the casting method described above on the above quenched material, the A and B elements present in the α-Mg crystal grains become A and B elements become a compound comprising the A elements and the B elements (e.g., C15-type Al₂Ca compound), and the α A-B compounds within α-Mg grains (e.g., C15-type Al₂Ca compounds) to form a quench heat-treated material with increased content of A-B compounds (e.g., C15-type Al Ca compounds). This increases the purity in the α-Mg crystal grains more and improves the thermal conductivity. The thermal conductivity of this quench heat-treated material should be 100 W/K-m or higher. The quench heat-treated material is composed of α-Mg phase, C15-type intermetallic compound phase and C14-type intermetallic compound phase, and should also have the same compounds as the cast material described above.

Next, the above quenched and heat-treated material is solidified and formed by extrusion, rolling, forging, or hot pressing to form solidified and formed material.

In this embodiment, the quenched heat-treated material is solidified and formed. However, the solidified and formed material may be formed by solidifying and forming the quenched material before heat treatment, or the above heat treatment may be performed on the solidified and formed material.

The solidified and formed material may also be subjected to plastic forming, or the above heat treatment may be performed after the plastic forming without heat treatment prior to the solidification and forming.

Each of the above quenched material, quenched heat-treated material, and solidification-molded material should have a C15-type intermetallic compound phase, and a C14-type intermetallic compound phase containing 5% by volume. The above quenched material, quenched heat-treated material, and solidified compacting material should each have a C15-type intermetallic compound phase and should contain 5% by volume of C14-type intermetallic compound phase.

Each of the above quenched material, quench heat-treated material and solidified compacting material has a thermal conductivity of 75 W/m-K or higher and a high specific strength.

The first through third embodiments above may be implemented in combination as appropriate.

The magnesium alloys of each of the first to third embodiments above have a thermal conductivity of 75 W/m-K The magnesium alloys of each of the first to third embodiments above are suitable to be applied to parts requiring thermal conductivity of 75 W/m-K or higher or 100 Wm-K.

Example 1

FIG. 3 shows the thermal conductivity of the magnesium alloy castings of the plurality of samples in Example 1. The plurality of samples contains Al and Ca with the composition shown in FIG. 3, and the remainder consists of Mg and unavoidable impurities. magnesium alloy.

Ingots of magnesium alloys of the samples with the compositions shown in FIG. 3 were melted in an argon atmosphere using a high-frequency melting furnace, and from these ingots, φ32×70 The cast materials were cut out from these ingots into a shape of φ32×70 mm. The results of measuring the thermal conductivity of these castings are shown in FIG. 3. The method of measuring thermal conductivity is as follows.

Samples were cut into 5 mm dia.×1-3 mm or 5×5×1-3 mm³. After measuring the sample dimensions and weight, blacken the sample surface with dry carbon spray. After the blackening process, the sample is weighed again and the thermal diffusivity of the sample is measured using the laser flash method. The product of the thermal diffusivity, the specific gravity of the sample, and the specific heat capacity is the thermal conductivity. Also, for the sample Mg₈₅Al₁₀Ca₅ alloy castings of Example 1. IPF maps were obtained by EBSD. The results are shown in FIG. 4(a)~(d). The IPF map is an inverse pole figure crystallographic orientation map by EBSD (electron beam backscatter diffraction).

FIGS. 4(*a*)~(d) show the $Mg_{85}Al_{10}Ca_5$ alloy castings, FIG. 4(*a*) is the image quality (FIG. 4(*a*) is an image quality (IQ value) map and FIG. 4(*b*) is an IPF map showing the α-Mg phase. IPF map, and FIG. 4(*c*) shows the C36-type intermetallic phase ((Mg,Al)$_2$Ca phase, and FIG. 4(*d*) is an IPF map showing the C14-type intermetallic compound phase ((Mg, Al) Ca phase), and $_2$Ca phase) IPF map showing the C14 intermetallic phase ((Mg, Al) Ca phase).

Next, the castings of the Example 1 sample with the composition shown in FIG. 3 were subjected to a heat treatment at 673 K for 2.5 hours. The cast and heat-treated materials were heat-treated for 5 hours. The results of measuring the thermal conductivity of these cast and heat-treated materials are shown in FIG. 5.

FIG. 6 shows the cast material of the $Mg_{85}Al_{10}Ca_5$ alloy of the sample of Example 1. TEM (Transmission Electron Microscope (Transmission Electron Microscope) photograph and SAED (Selected area electron diffraction) images. As shown in FIG. 6, it was confirmed that C15-type intermetallic compound phases were formed in this cast material.

FIG. 7 shows a microstructural observation of the cast materiel of the
$Mg_{85}Al_{10}Ca_5$ alloy of the
above sample. SEM photograph. The cast material shows multiple α-Mg grains in the black areas, and a C36-type intermetallic compound phase, and this eutectic lamellar structure connects multiple α-Mg grains. Therefore, it was confirmed that the α-Mg grains are networked with each other through the α-Mg phase of the eutectic lamellar structure.

FIG. 8(*a*) shows the sample of Example 1 with $Mg_{85}Al_{10}Ca_5$ alloy castings, and FIG. 8(*b*) is an SEM photograph of the 1 sample of $Mg_{85}Al_{10}Ca_5$ alloy, where the microstructure of the cast and heat-treated material was observed. SEM photograph. The heat treatment conditions for the cast and heat-treated material shown in FIG. 8(*b*) were 623 K for 8 hours. The heat treatment conditions of the cast and heat-treated material shown in FIG. 8(*b*) were 623 K for 8 hours.

The cast material shown in FIG. 8(*a*) and the cast and heat-treated material shown in FIG. 8(*b*) each have the same microstructure as the cast material shown in FIG. 7. In other words, multiple α-Mg grains, α-Mg phase and C36-type intermetallic compound phase, and this eutectic lamellar structure connects the plurality of α-Mg grains.

Linear or plate-like compounds are precipitated in the α-Mg grains of the cast and heat-treated material shown in FIG. 8(*b*), and the linear or plate-like compounds are C15-type intermetallic compound phase.

FIG. 8 shows that a C15-type intermetallic compound phase (Al$_2$Ca phase) precipitates in the α-Mg grains by heat treatment. This results in a decrease in the Al and Ca in the α-Mg grains, which is thought to decrease the total content of Ca and increase the thermal conductivity of the α-Mg grains.

FIG. 9 shows the effect of heat treatment time on the solute concentration in the α-Mg matrix phase within the α-Mg grains. 1 sample of Mg-8Al-4 Ca-0.02Mn alloy (atomic %) castings were subjected to a 6 Al in the α-Mg matrix and the heat treatment time when the cast material was heat treated at a temperature of 23 K. The figure shows the relationship between the heat treatment time and the Al and Ca concentrations in the α-Mg matrix when the cast material was heat-treated at a temperature of 623K.

As shown in FIG. 9, the Al concentration decreases as the heat treatment time increases. However, the Ca concentration increases slightly, but the total content of Al and Ca decreases. From this, it can be said that the thermal conductivity of the α-Mg grains improves.

FIG. 10(*a*) shows the X-ray diffraction (XRD: XRD of pure Mg X-Ray Diffraction analysis of pure Mg (FIG. 10(*b*)), and FIG. 10(*c*) shows the results of the analysis of the sample of Example 1, $Mg_{85}Al_{10}Ca_5$ alloy castings, and FIG. 10(*c*) shows the results of the XRD analysis of the sample of Example 1, $Mg_{85}Al_{10}Ca_5$ alloy, and the figure shows the results of XRD analysis of the cast and heat-treated material.

The width at half maximum of the X-ray diffraction peak of the α-Mg phase of the cast material shown in FIG. 10(*b*) (0.5 mm). 12) is 1.5 times wider than the width at half maximum of the X-ray diffraction peak of pure Mg shown in FIG. 10(*a*) (0.06), which is less than 1.5 times wider than the peak of pure Mg shown in FIG. 10(*a*).

In addition, the width at half maximum of the X-ray diffraction peak of the α-Mg phase of the cast and heat-treated material shown in FIG. 10(*c*) (0.08) of the α-Mg phase of the cast material shown in FIG. 10(*b*) is less than 1.5 times larger than that of the α-Mg phase of the cast material shown in FIG. 10(*c*). Mg phase in the cast material shown in FIG. 10(*b*). It was confirmed that the peak width of the α-Mg phase in the cast material shown in FIG. 10(*b*) was reduced by more than 10%.

In addition, the width at half maximum of the X-ray diffraction peak of the C36-type intermetallic compound in the cast and heat-treated material shown in FIG. 10(*c*) ((0.12) is the same as that of the C3 The width at half maximum (0.12) of the C36-type intermetallic compound in the cast and heat-treated material shown in FIG. 10(*c*) is more than 10% less than the width at half maximum (0.16) of the C3 The peak width of the peak that appears in the XRD pattern is 0.16. The width at half maximum of the peaks appearing in the XRD pattern increases or decreases as affected by solute element concentration, strain, etc. $Mg_{85}Al_{10}Ca_5$ alloy castings are heat-treated to precipitate needle-like compounds, which is thought to dilute the concentration of solute elements in the α-Mg phase, resulting in a decrease in the width at half maximum. This is consistent with the above XRD measurement results. It is also consistent with the results of the thermal conductivity increase due to the dilution of the solute element concentration in the α-Mg phase by heat treatment.

The castings of the Example 1 sample with the composition shown in FIG. 3 above were heat-treated at 673 K for 2.5 hours. The cast and heat-treated material was formed by heat-treating the cast material at 673 K for 2.5 hours, and then the cast and heat-treated material was extruded to form the extruded material. The extrusion conditions for this process are an extrusion ratio of 10, an extrusion temperature of 523 K, and an extrusion speed of 2.5 mm/s. The extrusion speed is 2.5 mm/s. The results of measuring the thermal conductivity of these extrusions are shown in FIG. 11. In other words, FIG. 11 shows the thermal conductivity of the extrudates after cast and heat treatment of several samples of magnesium alloy in Example 1. The method of measuring thermal conductivity is the same as the method described above.

FIG. 12 shows the thermal conductivity of the extrudate of the plurality of samples of magnesium alloy of Example 1 after casting. In other words, after the castings of the multiple samples of Example 1 were made, the castings were extruded without heat treatment. The extrusion conditions for this process were an extrusion ratio of 10, an extrusion temperature of 523 K, and an extrusion speed of 2.5 mm/s. 5 mm/s. The thermal conductivity of these extrusions was measured and the results are shown in FIG. 12. The method of measuring thermal conductivity is the same as the method described above.

The composition ranges shown in FIGS. 1 and 2 are based on the measurement results of FIGS. 3, 5, 11, and 12. FIGS. 13 and 14 are based on the results of the measurements used in FIG. 11.

FIG. 13 shows the mechanical properties of the sample used in FIG. 11 (extrudate after casting heat treatment) and FIG. 12 (extrudate after casting), respectively. properties (0.2% proof stress: $\sigma_{0.2}$), and FIG. 13($a$) shows the $Mg_{97-x}Al_xCa_3$ alloys, and FIG. 13($a$) shows the effect of Al additions in the Mg Al Ca alloys. b) shows the effect of Ca addition in the $Mg_{94-x}Al_6Ca_x$ alloy. FIG. 13($b$) shows the effect of Ca addition in Mg Al Ca alloys.

As shown in FIG. 13($a$), the 0.2% proof stress of the extrudate after casting heat treatment is higher than that of the $Mg_{93}Al_4Ca_3$ alloy is 260 MPa approximately, $Mg_{92}Al_5Ca_3$ alloy is about 320 MPa, $Mg_{91}Al_6Ca_3$ alloy is about 345 MPa, $Mg_{89}Al_8Ca_3$ alloy was about 240 MPa. The 0.2% proof stresses of the extrusions after casting were about 0.2% for the $Mg_{93}Al_4Ca_3$ alloy, about 340 MPa and $Mg_{92}Al_5Ca_3$ alloy was about 315 MPa approximately, $Mg_{91}Al_6Ca_3$ alloy is about 360 MPa, $Mg_{89}Al_8Ca_3$ alloy was about 390 MPa about 390 MPa for the $Mg_{91}Al_6Ca_3$ alloy.

As shown in FIG. 13($b$), the 0.2% proof stress of the extrusions after casting heat treatment was about 0.2% for $Mg_{91.5}Al_6Ca_{2.5}$ alloy was 275 MPa approximately, $Mg_{91}Al_6Ca_3$ alloy was about 350 MPa, $Mg_{90.5}Al_6Ca_{3.5}$ alloy is about 400 MPa, $Mg_{91}Al_6Ca_3$ alloy is about 390 MPa, $Mg_{89}Al_6Ca_5$ alloy is about 400 MPa, $Mg_{88}Al_6Ca_6$ alloy is about 425 MPa, $Mg_{87.5}I_6Ca_{6.5}$ alloy was about 460 MPa. The 0.2% proof stresses of the extrusions after casting were about 0.2 MPa for the $Mg_{91.5}Al_6Ca_{2.5}$ alloy and about 300 MPa and $Mg_{91}Al_6Ca_3$ alloy was about 360 MPa for the Mg Al Ca alloy.

FIGS. 13($a$) and 13($b$) show that the magnesium alloy of Example 1 has high specific strength.

FIG. 14 shows the mechanical properties (0.2% proof stress: $\sigma_{0.2}$) of the samples used in FIG. 11 ($a$) and FIG. 12 ($b$), respectively, where $Mg_{100-3x}Al_{2x}Ca_x$ alloys, and FIG. 13 ($b$) shows the effect of Ca addition in the Mg Al Ca alloys. b) shows the effect of Ca addition in $Mg_{98-2x}Al_{x+2}Ca_x$ alloy. The figure shows the effect of Ca addition in Mg Al Ca alloys.

As shown in FIG. 14($a$), the 0.2% proof stress of the extrudate after cast heat treatment is higher than that of the $Mg_{97}Al_2Ca_1$ alloy is 340 MPa approximately, $Mg_{94}Al_4Ca_2$ alloy is about 345 MPa, $Mg_{92.5}Al_5Ca_{2.5}$ alloy is about 340 MPa, $Mg_{89.5}Al_7Ca_{3.5}$ alloy is about 345 MPa, $Mg_{97}Al_2Ca_1$ alloy is about 345 MPa, $Mg_{88}Al_8Ca_4$ alloy is about 350 MPa, $Mg_{85}Al_{10}Ca_5$ alloy was about 400 MPa. The 0.2% proof stresses of the extrusions after casting were about 0.2% for the $Mg_{97}Al_2Ca_1$ alloy, about 320 MPa and $Mg_{94}Al_4Ca_2$ alloy was about 350 MPa approximately, $Mg_{92.5}Al_4Ca_{2.5}$ alloy is about 355 MPa, $Mg_{89.5}Al_7Ca_{3.5}$ alloy is about 360 MPa, $Mg_{88}Al_8Ca_4$ alloy is about 340 MPa, $Mg_{85}Al_{10}Ca_5$ alloy was about 395 MPa about 395 MPa for the Mg Al Ca alloy.

As shown in FIG. 14($b$), the 0.2% proof stress of the extrusions after cast heat treatment was about 0.2% for the $Mg_{98}Al_2$ alloy was about 170 MPa, and the 275 for the $Mg_{96}Al_3Ca_1$ alloy. MPa, $Mg_{94}Al_4Ca_2$ alloy is about 325

MPa, $Mg_{92}Al_5Ca_3$ alloy is about 320 MPa, $Mg_{90}Al_6Ca_4$ alloy is about 390 MPa, $Mg_{86}Al_8Ca_6$ alloy is about 430 MPa, $Mg_{84}Al_9Ca_7$ alloy is about 450 MPa, $Mg_{82}Al_{10}Ca_8$ alloy was about 480 MPa for the Mg Al Ca alloy was about 480 MPa. The 0.2% proof stresses of the extrusions after casting were 17% for the Mg Al, alloy, 17 about 0 MPa, and $Mg_{96}Al_3Ca_1$ alloy was about 310 MPa, the $MB_{94}Al_4Ca_2$ alloy is about 350 MPa, $Mg_{92}Al_5Ca_3$ alloy is about 315 MPa, Mg about 315 MPa, $Mg_{88}Al_7Ca_5$ alloy was about 440 MPa for the Mg Al Ca alloy and 440 MPa for the Mg Al Ca alloy.

FIGS. 14($a$) and 14($b$) show that the magnesium alloys of Example 1 have high specific strength.

Example 2

FIG. 15 shows the thermal conductivity and yield strength of Example 2 $Mg_{99.98-3x}Al_{2x}Ca_xMn_{0.02}$ The figure shows the thermal conductivity and yield strength of the alloy chip solidification and molding material.

FIG. 15 shows the "HT chip-C consolidated alloys" is a series of alloys with x=2, 2, 3, 4, and 5 compositions. Magnesium alloys with compositions of 3, 4, and 5 were cast in the same manner as in Example 1, and the cast material was prepared at 673 The castings were heat-treated at 673 K for 2.5 hours. The cast and heat-treated material was then machined to form a chip material with a chip size of 1~2 mm. The chip material was then solidified and formed at room temperature by pressure molding. The thermal conductivity of these chip solid-formed materials was measured in the same way as in Example 1. The yield strength $\sigma_{vs}$ of these chip solid-formed materials was also measured.

In addition, the "chip-consolidated alloys" are the same as those in the case of x=2, 2, 3, 4, and 5 composition magnesium alloys. 3, 4, and 5 composition magnesium alloys were cast in the same manner as in Example 1, and chip-solid-formed materials were formed in the same manner as above without heat treatment. The thermal conductivity and yield strength $\sigma_{vs}$ of these chip solidified and formed materials were then measured in the same manner as above.

FIG. 15 shows that the chip solid-formed materials have a thermal conductivity of 75 W/m-K or higher and a high yield strength. It was confirmed.

Example 3

FIG. 16 shows the thermal conductivity and yield strength of Example 3 $Mg_{99.98-3x}Al_{2x}Ca_xMn_{0.02}$ The figure shows the thermal conductivity and yield strength of the rapidly solid-formed material. $Mg_{99.98-3x}Al_{2x}Ca_xMn_{0.02}$. The rapid solidification molding material is prepared as follows.

FIG. 16 shows the "RS ribbon-consolidated alloys" shown in FIG. 16 are castings with compositions of x=2, 3, 4, and 5. Cast alloy ingots with compositions of x=2, 3, 4, and 5 are remelted in a single roll liquid quenching apparatus, and the molten metal is fed into a copper roll rotating at a peripheral speed of 40 m/s. The molten metal is injected onto a rotating copper roll at a peripheral speed of 40 m/s to produce a rapidly solidified thin strip (1-2 mm wide, 30-40 μm thick). The rapidly solidified thin strip (width 1-2 mm, thickness 30-40 μm) was prepared. The rapidly solidified strip was sealed in a copper tube under an Ar atmosphere in a glove box, and then vacuum heated and degassed to produce copper billets for solidification molding. The copper billets were hot extruded to obtain rapidly solidified compacts.

FIG. 16 shows the "HT RS ribbon-consolidated alloys (67 3K×2.5H)" is a cast alloy ingot with x=2, 3, 4, and 5 compositions are cast alloy ingots with "RS ribbon-consolidated alloys" were made from cast alloy ingots with compositions of x=2, 3, 4, and 5 by the same method as that for "RS ribbon-consolidated Then, after heat treatment at 673 K for 2.5 hours, "RS ribbon-consolidated After heat treatment at a temperature of 673 K for 2.5 hours, copper billets for solidification molding were made in the same way as for "RS ribbon-consolidated alloys" to obtain rapidly solidified moldings.

FIG. 16 shows the "HT RS ribbon-consolidated alloys (57 3K×100H)" ( ◇ ) is a cast alloy ingot with a composition of x=3, which was solidified by the same method as that used for "HT RS ribbon-consolidated The thin strips were made by the same method as that for "RS ribbon-consolidated alloys" ( ◇ ). Then, after heat treatment at a temperature of 573K for 100 hours, "RS ribbon-consolidated After heat treatment at a temperature of 573 K for 100 hours, copper billets for solidification molding were made in the same way as for "RS ribbon-consolidated alloys," and the rapidly solid-formed materials were obtained.

FIG. 16 shows that the rapidly solidified and solidified compacted material has a thermal conductivity of 75 W/m-K or higher and a high yield strength. FIG. 16 shows that the rapidly solid-formed material has a thermal conductivity of 75 W/m K or higher and high yield strength.

Example 4

FIG. 18 shows the ignition of Example 4, Mg-4Al-2Ca atomic %) with Be or Yb in Example 4. FIG. 18 shows that adding Be or Yb to the Mg-4Al-2Ca atomic %) in Example 4 improved the ignition temperature. According to this FIG. 18, it was confirmed that the addition of Be or Yb improved the ignition temperature.

Example 5

FIG. 24 shows the results of the $Mg_{98-2x}Al_{x+2}Ca_x$ alloy cast material, showing the results of XRD analysis. This cast material was prepared in the same way as in Example 1.

FIG. 25 shows the $Mg_{98-2x}Al_{x+2}Ca$ of the sample of Example $5_x$ alloy cast material that was heat treated at a temperature of 400° C. for 2.5 hours. The figure shows the results of XRD analysis.

FIG. 26 shows the results of XRD analysis of extruded material that was extruded from the heat-treated material of the sample in Example 5 above. The extrusion conditions were an extrusion ratio of 10, an extrusion temperature of 523 K, and an extrusion speed of 2.5 mm/s.

The extrudate shown in FIG. 26 has better thermal conductivity than the heat-treated material in FIG. 25 because C15 is still present.

Example 6

FIG. 27 shows the relationship between the Mg—Al—Ca alloy of the sample in Example 6, showing the relationship between the concentration of solute elements in the α-Mg phase and the thermal conductivity of the Mg—Al—Ca alloy. The composition of the Mg—Al—Ca alloy is $Mg_{98-x}$ $Al_{x+2}$ $Ca_x$ (at %) alloy.

The Mg—Al—Ca alloy of the sample in Example 6 was measured for castings made by a general casting method and heat-treated materials made by heat-treating the castings at 400° C. for 2.5 hours.

As shown in FIG. 27, the lower the concentration of solute elements, the higher the concentration of α-Mg, and thus the higher the thermal conductivity.

TABLE 1

| Alloy Composition | Phase Constitution | |
| --- | --- | --- |
| (at %) | As cast | Heat-treated |
| Mg—2Al | α-Mg | α-Mg |
| Mg—3Al—1Ca | α-Mg + C36 + C14 | α-Mg + C36 + C14 + C15 |
| Mg—3Al—2.5Ca | α-Mg + C36 + C14 | α-Mg + C36 + C14 + C15 |
| Mg—3Al—4Ca | α-Mg + C14 + (C36) | α-Mg + C14 + (C36) |
| Mg—4Al—2C3 | α-Mg + C36 + C14 | α-Mg + C36 + C14 + C15 |
| Mg—5Al—3Ca | α-Mg + C36 + C14 | α-Mg + C36 + C14 + C15 |
| Mg—5Al—4Ca | α-Mg + C36 + C14 | α-Mg + C36 + C14 + C15 |
| Mg—6Al—4Ca | α-Mg + C36 + C14 | α-Mg + C36 + C14 + C15 |
| Mg—7Al—2.5Ca | α-Mg + C36 | α-Mg + C36 + C15 |
| Mg—7Al—5Ca | α-Mg + C36 + C14 | α-Mg + C36 + C14 + C15 |
| Mg—8Al—6Ca | α-Mg + C36 + C14 | α-Mg + C36 + C14 + C15 |
| Mg—9Al—7Ca | α-Mg + C36 + C14 | α-Mg + C36 + C14 + C15 |
| Mg—10Al—5Ca | α-Mg + C36 + C14 | α-Mg + C36 + C14 + C15 |
| Mg—10Al—8Ca | α-Mg + C36 + C14 | α-Mg + C36 + C14 + C15 |

Table 1 shows the alloy compositions and the phase compositions of each of the cast and post-cast and heat-treated materials. The castings were prepared in the same manner as in Example 1. The heat treatment was performed at a temperature of 400° C. for 2.5 hours.

FIG. 28 shows a sample of the extruded material used in FIG. 26 ($Mg_{98-2x}Al_{x+2}$ $Ca_x$ cast alloy heat-treated extrudate), showing the measured mechanical properties (0.2% proof stress: $\sigma_{0.2}$, elongation: δ).

FIG. 28 shows that the presence of more than 1.5 atomic % of Ca resulted in a 28 It was confirmed that a high 0.2% proof stress of 28.0 MPa or higher can be obtained with a Ca content of 1.5 atomic % or higher.

Example 7

FIG. 29 shows an Example 7 sample of $Mg_{97.98-2x}Al_{x+2}$ $Ca_xMn_{0.02}$ alloy chip solidified and formed material and the chip solidified and formed material was heat treated at 400° C. for 2.5 hours. The figure shows the measured mechanical properties (0.2% proof stress: $\sigma_{0.2}$, elongation: δ) of the chip solidified and formed heat treated material. This sample of chip solidified and formed material was prepared in the same way as in Example 2.

FIG. 29 shows that the Ca content of 1.5 atomic % or more resulted in a 28 It was confirmed that a high 0.2% proof stress of higher than 0.0 MPa was obtained.

Example 8

FIG. 30 shows the mechanical properties of the sample of Example 8, $Mg_{97.98-2x}Al_{x+2}Ca_xMn_{0.02}$ alloy, and the mechanical properties (0.2% proof stress: σ0.2, elongation: δ) of the quenched and heat-treated alloys. The samples of this quenched material were prepared in the same way as in Example 3.

According to FIG. 30, the presence of more than 1.5 atomic % of Ca resulted in a 29 It was confirmed that a high 0.2% proof stress of higher than 0.0 MPa was obtained.

Example 9

FIG. 31 shows a sample of Example 9 $Mg_{97.98-2x}Al_{x+}$ $_2Ca_xMn_{0.02}$ alloy, and shows the results of a salt water immersion test on a sample of that quenched material to determine its corrosion resistance. The vertical axis in FIG. 31 is the corrosion rate and the horizontal axis is the Ca content.

The sample of the quenched material was prepared in the same way as in Example 3.

The saltwater immersion test was performed at a temperature of 298 K with the atmosphere opened to 0.17 M NaCl aq. of salt water at a temperature of 298 K. The sample was immersed in the salt water and the corrosion rate of the sample was measured. The test is to measure the corrosion rate of the sample.

FIG. 31 shows that $Mg_{97.98-2x}Al$ with trace amounts of $Mn_{x+2}Ca_xMn_{0.02}$ alloy quenched material was confirmed to have high corrosion resistance.

Example 10

FIG. 32 shows the sample of Example 10 $Mg_{90.98}Al_6Ca_3Mn_{0.02}$ alloys to show the effect of the timing of heat treatment on the thermal conductivity properties when making the chip solidification molding material. This sample of chip solidified and formed material was prepared in the same way as in Example 2, but the timing of heat treatment was changed to one in which heat treatment was performed on the cast material before it was made into chips (pre-chip heat treatment), one in which heat treatment was performed after forming chips (post-chip heat treatment), and one in which heat treatment was performed on solidified and formed material after chips were solidified and formed. (post-chip heat treatment), and heat treatment of solid-formed chip material (post-solidification heat treatment).

FIG. 32 shows that the post-chip heat treatment and post-solidification heat treatment have higher thermal conductivity properties than the pre-chip heat treatment.

Example 11

FIG. 33 shows the heat treatment conditions for the sample in Example 11, Mg-5 Al-3Ca-0.02Mn alloy, showing the effect of heat treatment time on thermal conductivity properties. The samples were prepared by the usual casting method and heat treatment of the castings.

As the heat treatment time was increased, it was found that the increase in thermal conductivity stopped after up to 100 hours.

The invention claimed is:

1. A magnesium alloy:

comprising A element in an amount of "a" atomic %, B element in an amount of "b" atomic %, and a balance of Mg and unavoidable impurities, wherein the A element is Al, wherein the B element is Ca, wherein "a" and "b" are within a range bounded by straight lines represented by (1) to (4) below in coordinates (b, a) with "b" being on the horizontal axis and "a" being on the vertical axis, wherein the magnesium alloy has an α-Mg phase, wherein the magnesium alloy contains:

an area fraction X % of a compound comprising the A element and the B element, wherein the X % satisfies Equation 41 below, an area fraction Y % of a compound comprising Mg and the A element in terms of area fraction, wherein the Y % satisfies Equation 42 below, an area fraction Z % of a compound comprising Mg and the B element, wherein the Z % satisfies Equation 43 below, and an area fraction W % of a compound comprising Mg, the A element, and the element B, wherein the W % satisfies Equation 44 below, and wherein a total content of the X %, the Y %, the Z %, and the W % satisfies Equation 45 below, and wherein the magnesium alloy has a thermal conductivity of 75 W/m-K or more;

(1) if "b" satisfies Equation 1a below, a straight line of Equation 1b below is also satisfied:

(Equation 1a) $1 \leq b \leq 2$ (Equation 1b) $a=2$ (2) if "b" satisfies Equation 2a below, a straight line of Equation 2b below is also satisfied:

(Equation 2a) $2 \leq b \leq 5/2$ (Equation 2b) $a=2b-2$ (3) if "b" satisfies Equation 3a below, a straight line of Equation 3b below is also satisfied:

(Equation 3a) $b=5/2$ (Equation 3b) $a=3 \leq a \leq 43/8$ wherein if "a" is in the range of Equation 3a, then b=3 is excluded (4) if "b" satisfies Equation 10a below, a straight line of Equation 10b below is also satisfied:

(Equation 10a) $1 \leq 5/2$ (Equation 10b) $a=9b/4-1/4$ (Equation 41) $0 < X \% \leq 10$ (Equation 42) $Y \% = 0$ (Equation 43) $0 < Z \% \leq 5$ (Equation 44) $5 \leq W \% \leq 40$ (Equation 45) $5 \leq X \% + Y \% + Z \% + W \% \leq 45$.

2. The magnesium alloy according to claim 1:

further optionally comprising C element in an amount of "c" atomic %, and D element in an amount of "d" atomic %, wherein the C element is Mn or Zr, wherein the D element is one or more selected from the group consisting of RE, Sn, Li, Zn, Ag, Be, and Sc, wherein RE is a rare earth element, wherein "c" satisfies Equation 34 below, and wherein "d" satisfies Equation 35 below, (Equation 34) $0 < c \leq 0.1$ (Equation 35) $0 < d \leq 1$.

* * * * *